(12) United States Patent
Kawano

(10) Patent No.: US 12,233,549 B2
(45) Date of Patent: Feb. 25, 2025

(54) ACTION CONTROL APPARATUS, METHOD AND PROGRAM FOR THE SAME

(71) Applicant: NIPPON TELEGRAPH AND TELEPHONE CORPORATION, Tokyo (JP)

(72) Inventor: Hiroshi Kawano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 322 days.

(21) Appl. No.: 17/785,351

(22) PCT Filed: Dec. 16, 2019

(86) PCT No.: PCT/JP2019/049212
§ 371 (c)(1),
(2) Date: Jun. 14, 2022

(87) PCT Pub. No.: WO2021/124410
PCT Pub. Date: Jun. 24, 2021

(65) Prior Publication Data
US 2023/0018658 A1    Jan. 19, 2023

(51) Int. Cl.
*B25J 9/16*    (2006.01)
(52) U.S. Cl.
CPC ... *B25J 9/1617* (2013.01); *G05B 2219/40302* (2013.01)
(58) Field of Classification Search
CPC combination set(s) only.
See application file for complete search history.

(56) References Cited

U.S. PATENT DOCUMENTS

2016/0184993 A1* 6/2016 Brandwijk ............... B25J 9/101
463/31

FOREIGN PATENT DOCUMENTS

| JP | 2016146159 A | * | 8/2016 |
| JP | 2017129954 A | * | 7/2017 |

(Continued)

OTHER PUBLICATIONS

Machine translation of JP 2017129954 A (Kawano) (Year: 2017).*

(Continued)

*Primary Examiner* — Adam R Mott
*Assistant Examiner* — James Miller Watts, III

(57) ABSTRACT

An action control device controls movement of a plurality of control subjects. In particular, the present technology relates to a cooperative control of robots. The cooperative control comprises determining an action plan for each of a plurality of robots for respective movements. Given the action plan, the present case enables movements of the respective robots cooperatively from a state of rank formation in starting positions and cause the respective robots to form a rank in target position. In particular, the action plan comprises a set of operations where a plurality of robots extracted by deconstruction of parts of intermediate positions of robots are moved simultaneously to the locations to which the robots are to be added during construction of a subsequent intermediate positions of robots. The set of operations with simultaneous movements enables an increase in the speed of transformation of ranks formed by the plurality of robots.

5 Claims, 19 Drawing Sheets

(56) References Cited

FOREIGN PATENT DOCUMENTS

JP          2017142738 A * 8/2017
JP            6489923 B2 * 3/2019

OTHER PUBLICATIONS

Machine translation of JP-2017142738-A (Year: 2017).*
Machine translation of JP-6489923-B2 (Year: 2019).*
Machine translation of JP-2016146159-A (Year: 2016).*
H. Kawano, "Full-resolution reconfiguration planning for heterogeneous cube-shaped modular robots with only sliding motion primitive," 2016 IEEE International Conference on Robotics and Automation (ICRA), Stockholm, Sweden, 2016, pp. 5222-5229, doi: 10.1109/ICRA.2016.7487730. (Year: 2016).*
Fitch et al. (2003) "Reconfiguration Planning for Heterogeneous Self-Reconfiguring Robots" IEEE International Conference on Intelligent Robots and Systems, Oct. 2003, pp. 2460-2467.
Wong et al. (2013) "Deterministic Distributed Algorithm for Self-Reconfiguration of Modular Robots from Arbitrary to Straight Chain Configurations" IEEE International Conference on Robotics and Automation (ICRA), May 6, 2013, pp. 537-543.
Rubenstein et al. (2014) "Programmable self-assembly in a thousand-robotswarm" SCIENCE, vol. 345, No. 6198, pp. 795-799.
Hiroshi Kawano (2016) "Full-resolution Reconfiguration Planning for Heterogeneous Cube-shaped Modular Robots with only Sliding Motion Primitive" IEEE International Conference on Robotics and Automation (ICRA), May 16, 2016, pp. 5222-5229.

* cited by examiner

ACTION CONTROL APPARATUS, METHOD AND PROGRAM FOR THE SAME

CROSS-REFERENCE TO RELATED APPLICATIONS

This application is a U.S. National Stage Application filed under 35 U.S.C. § 371 claiming priority to International Patent Application No. PCT/JP2019/049212, filed on 16 Dec. 2019, the disclosure of which is hereby incorporated herein by reference in its entirety.

TECHNICAL FIELD

The present invention relates to a technique for controlling the actions of a plurality of control subjects. For example, the present invention relates to a robot cooperative control technique in which an action plan is determined for each of a plurality of robots in order to move the robots cooperatively from a state of rank formation in starting positions and cause the robots to form a rank in target positions.

BACKGROUND ART

In recent years, active research is being conducted into efficiently controlling large numbers of autonomous mobile robots. The content of this task is various, including monitoring locations which people cannot enter, transporting goods, and so on, but there is a need for technology that enables efficient rank formation through the coordinated motions of a large number of robots, and research into this technology is actively being undertaken (see NPL 1, for example). To realize efficient rank formation by a large number of robots, it is important to plan the arrangement, operation order, and so on of the robots in advance. Depending on the shape of the robot and differences in conditions pertaining to connection states to be maintained, which are prerequisites for solving this problem, various solutions have been proposed (see NPL 2 and NPL 3, for example).

For example, in the techniques disclosed in NPL 1 and NPL 4, an action plan for transforming a rank of rectangular parallelepiped-shaped robots is created. In NPL 2, research into rank formation control executed on hexagonal robots is reported. Further, in NPL 3, research relating to rank formation control executed on circular robots is reported.

CITATION LIST

Non Patent Literature

[NPL 1] Robert Fitch, Zack Butler, Daniel Rus, "Reconfiguration Planning for Heterogeneous Self-Reconfiguring Robots", Proceedings of the 2003 IEEE International Conference on Intelligent Robots and Systems, Las Vegas Nevada, 2003, pp. 2460-2467

[NPL 2] Stanton Wong and Jennifer Walter, "Deterministic Distributed Algorithm for Self-Reconfiguration of Modular Robots from Arbitrary to Straight Chain Configurations", Proceedings of the 2013 IEEE International Conference on Robotics and Automation, Karlsruhe, Germany, May 6-10 2013, pp. 537-543

[NPL 3] Michael Rubenstein, Alejandro Cornejo, Radhika Nagpal, "Programmable self-assembly in a thousand-robot swarm", SCIENCE, August 2014, Vol. 345, Issue 6198, pp. 795-799

[NPL 4] H. Kawano, "Full-resolution Reconfiguration Planning for Heterogeneous Cube-shaped Modular Robots with only Sliding Motion Primitive", in Proceedings of 2016 IEEE International Conference on Robotics and Automation, pp. 5222-5229, Stockholm, Sweden, May 2016

SUMMARY OF THE INVENTION

Technical Problem

In a conventional method for transforming a rank consisting of a large number of rectangular parallelepiped-shaped robots while keeping the robots joined, as disclosed in NPL 1, when a robot moves, it is assumed that the robot moves along (moves around) a wall formed by the other robots. In order to realize a motion for moving around the periphery of one rectangular parallelepiped-shaped robot, for example, the mechanisms required by the robot become complicated.

In consideration of these current circumstances, NPL 4 succeeds in providing a control subject cooperative rank formation technique with which it is possible to realize rank control on the premise that when a control subject moves, the control subject does not move around the periphery of other control subjects, and instead, the control subjects only move by sliding over the surfaces of other control subjects while remaining in a connected state, and as a result, NPL 4 makes it possible, without the need for complicated mechanisms, to perform a transformation operation from a rank formation state in which the control subjects are in arbitrary starting positions to a rank formation state in which the control subjects are in different arbitrary target positions while maintaining the control subjects in a state of mutual contact.

In these methods, however, rank transformation requires an amount of time proportionate to the square of the number of control subjects, and therefore the transformation time is long.

An object of the present invention is to provide an action control device and a method and program therefor with which the time required for rank transformation can be shortened.

Means for Solving the Problem

To solve the problem described above, according to an aspect of the present invention, an action control device performs action control for moving p control subjects, where p is set as any integer of 20 or more, from a set of p starting positions to a set of p target positions. The action control device sets a direction that is not parallel to a first direction as a second direction, sets an opposite direction to the first direction as a third direction, sets an opposite direction to the second direction as a fourth direction, sets a direction that is not parallel to a plane formed by the first direction and the second direction as a fifth direction, and sets an opposite direction to the fifth direction as a sixth direction, each starting position and each target position being adjacent to another starting position or another target position in at least one of the first to sixth directions, and the p control subjects arranged in the set of target positions and the p control subjects arranged in the set of starting positions respectively forming blocks of arbitrary shapes, the control subjects being controlled so as to either remain stationary or to move to any one of a first position to a sixth position on a three-dimensional space of the control subjects, the first position being set as an adjacent position in the first direction, a second position being set as an adjacent position in the second direction, a third position being set as an adjacent position in the third direction, a fourth position being set as an adjacent position in the fourth direction, a fifth position being set as an adjacent position in the fifth direction, and the sixth position being set as an adjacent position in the sixth direction, and among the positions included in the set of starting positions and the set of target positions, the maximum coordinate value in the first direction being set as Xthresh, the maximum coordinate value in the second direction being set as Ythresh, and the minimum coordinate value in the fifth direction being set as Zthresh. The action control device includes: a compression process processing unit that envisages a first virtual plane that is perpendicular to the first direction and fixed at a coordinate value of Xthresh+1 in the first direction, and a second virtual plane on which movement is performed in the first direction from infinity in the third direction, pushes control subjects that are arranged or control subjects that were arranged in the set of starting positions and that abut the second virtual plane in a movement direction of the second virtual plane, thereby compressing the control subjects such that none of the control subjects exceeds the first virtual plane and such that the coordinate values thereof in the first direction remain at or below Xthresh, envisages a third virtual plane that is perpendicular to the second direction and fixed at a coordinate value of Ythresh+1 in the second direction, and a fourth virtual plane on which movement is performed in the second direction from infinity in the fourth direction, pushes the control subjects that are included in the compressed shaped acquired using the first and second virtual planes and that abut the fourth virtual plane in a movement direction of the fourth virtual plane, thereby compressing the control subjects such that none of the control subjects exceeds the third virtual plane and such that the coordinate values thereof in the second direction remain at or below Ythresh, and determines the positions of the control subjects included in the compressed shape as a set of intermediate positions M1; an expansion process processing unit that pushes virtual control subjects that are arranged or virtual control subjects that were arranged in the set of target positions and that abut the second virtual plane, thereby compressing the virtual control subjects such that none of the virtual control subjects exceeds the first virtual plane and such that the coordinate values thereof in the first direction remain at or below Xthresh, pushes the virtual control subjects that are included in the compressed shaped acquired using the first and second virtual planes and that abut the fourth virtual plane in the movement direction of the fourth virtual plane, thereby compressing the virtual control subjects such that none of the virtual control subjects exceeds the third virtual plane and such that the coordinate values thereof in the second direction remain at or below Ythresh, determines the positions of the virtual control subjects included in the compressed shape as a set of intermediate positions M3, and determines a process for moving each control subject in an opposite direction to the movement direction used when determining the set of intermediate positions M3 from the virtual control subjects arranged in the set of target positions in reverse order to the order used when determining the set of intermediate positions M3 from the set of target positions; and an intermediate transformation process processing unit that determines a process Middle Transform for transforming the shape formed by the control subjects arranged in the set of intermediate positions M1 into the shape formed by the control subjects arranged in the set of intermediate positions M3. In the process Middle Transform, a plurality of control subjects are moved simultaneously.

Effects of the Invention

The time required for rank transformation can be shortened.

DESCRIPTION OF EMBODIMENTS

Figure 1:
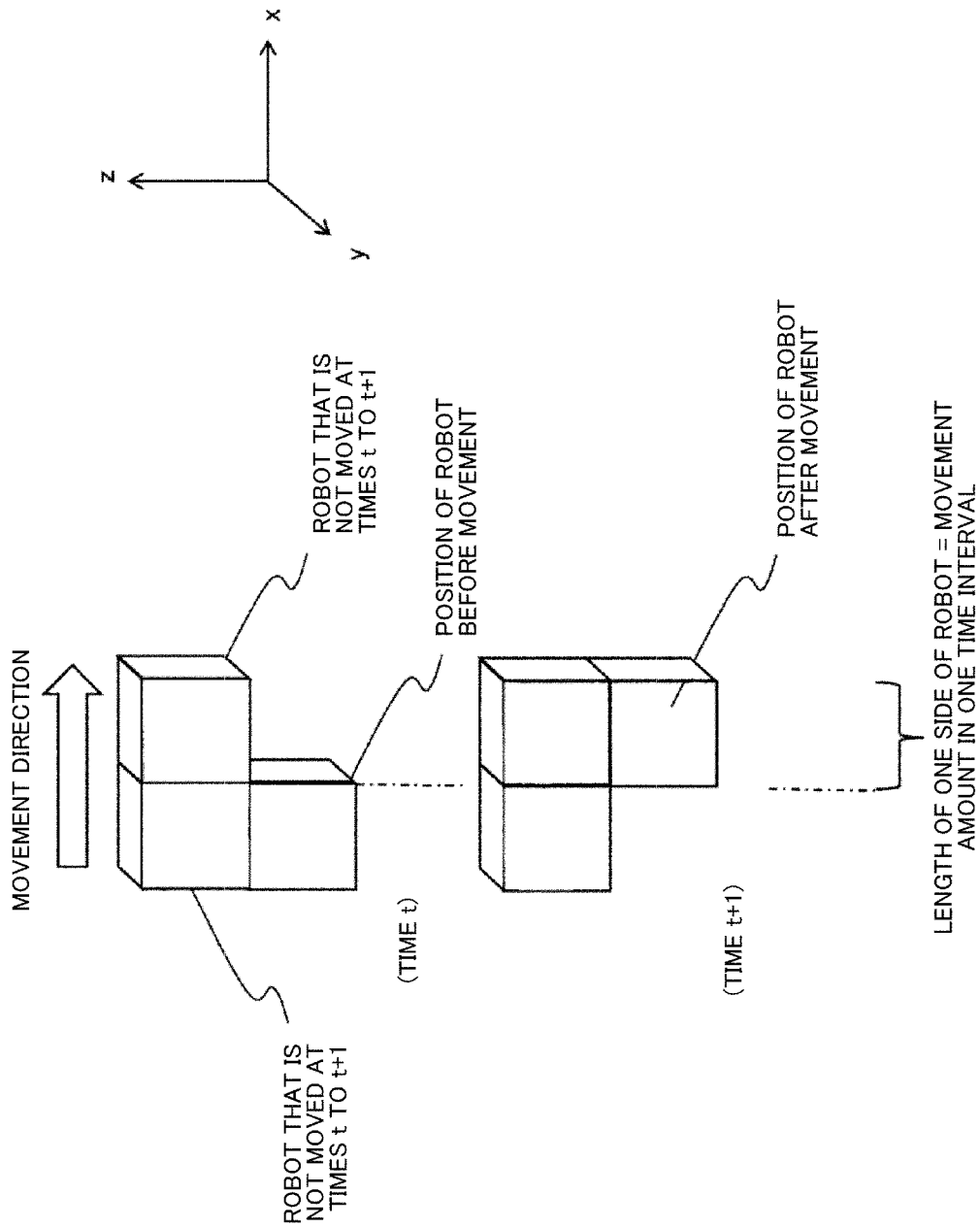
FIG. 1 is a view illustrating an example of robot movement.

Embodiments of the present invention will be described below. Note that in the figures used in the following description, constituent parts having identical functions and steps in which identical processing is performed have been allocated identical reference numerals, and duplicate description thereof has been omitted.

First Embodiment

First, the theoretical background to the action control device and method will be described. A case in which the control subject serving as the action control subject is a robot will be described below as an example, but the control subject is not limited to a robot and may be any object that can be subjected to control.

[Problem Setting]

Figure 2:
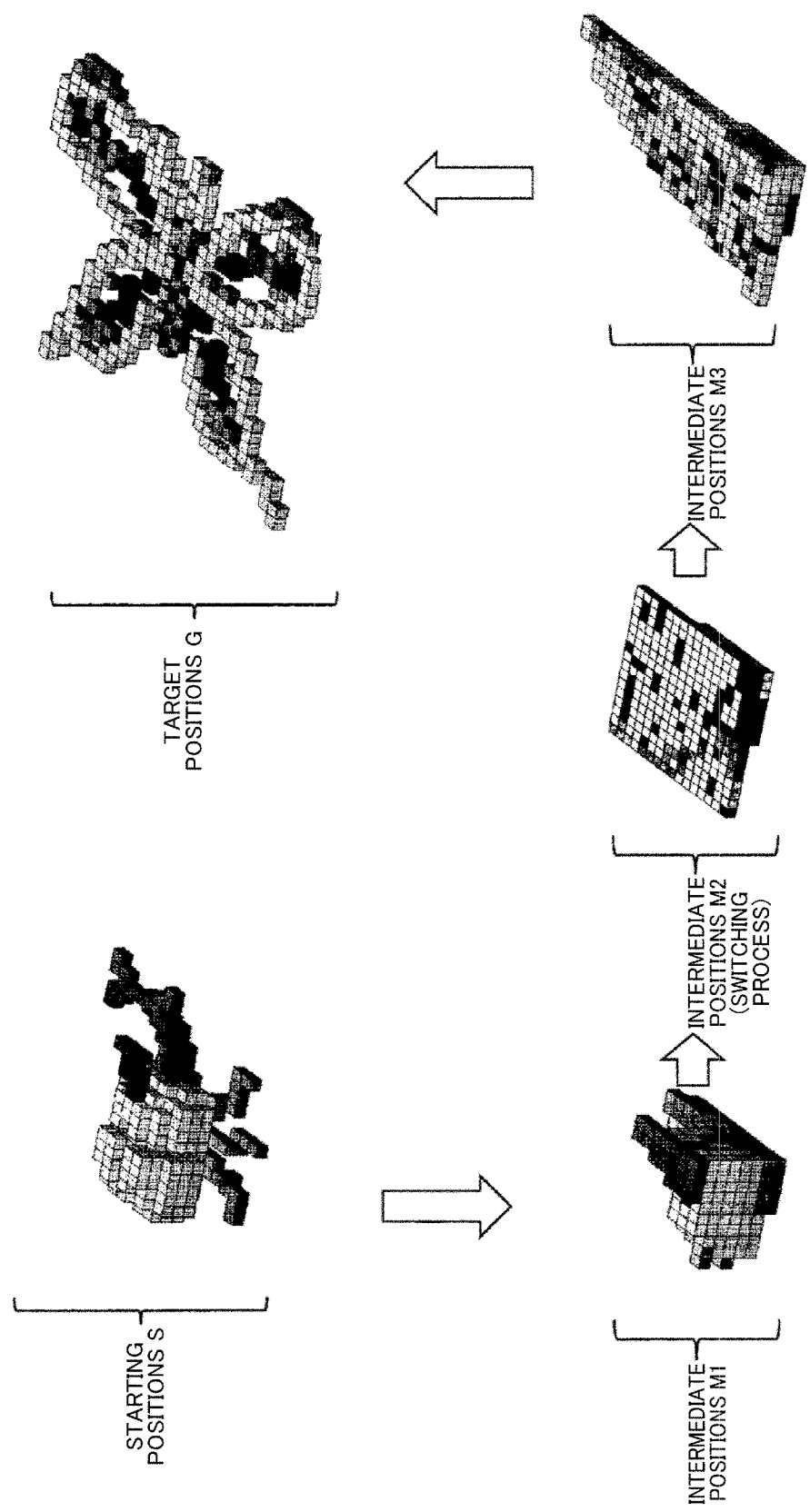
FIG. 2 is a view illustrating an example of a starting rank.

In a task in which a large number of robots cooperatively form a rank in target positions by moving while remaining in contact with each other from a state of rank formation in starting positions, the use of rectangular parallelepiped-shaped robots capable of moving by sliding over mutual contact surfaces, as shown in FIG. 1, for example, is envisaged, and as shown in FIG. 2, this task is realized by moving a plurality of robots from a set of starting positions S to a set of target positions G.

In this embodiment, during rank formation in the set of target positions G from the set of starting positions S, rank formation is performed by passing through three sets of intermediate positions M1, M2, M3.

Further, in this embodiment, it is assumed that in the set of starting positions S and the set of target positions G, the positions to be taken by each robot are determined for each robot. Hence, when a group of robots that have been transformed into the set of intermediate positions M2 from the set of starting positions S via the set of intermediate positions M1 are transformed from the form thereof into the set of target positions G via the set of intermediate positions M3, the group of robots also perform switching motions for switching the positions of the robots while maintaining the form thereof in the set of intermediate positions M2 so that each robot can arrive at the appropriate target position within the set of target positions G.

Figure 3:
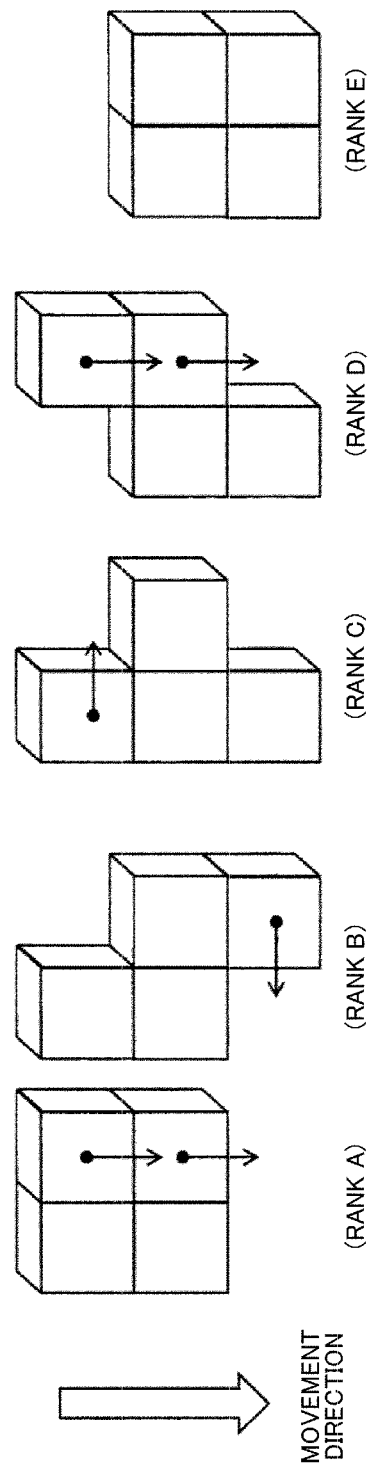
FIG. 3 is a view illustrating robot movement.

As shown in FIG. 1, for example, the robot is assumed to move while maintaining a state in which another robot exists in one of six squares upward, downward, leftward, rightward, frontward, and rearward of the robot. This method has an advantage in that by moving one robot by a distance corresponding to the size of a single robot, the movement amount of a single motion can be measured accurately. Further, by measuring the relative positions of adjacent robots sharing a single plane, the positions of all of the robots in a robot group can easily be ascertained. As a result, a problem in which the rank collapses due to an error in the movement amount of the robots is unlikely to occur. Furthermore, as shown in FIG. 3, a plurality of robots can be moved simultaneously as if the robots were connected. In FIG. 3, when a rank A is transformed into a rank B and when a rank D is transformed into a rank E, two robots move simultaneously as if connected. Note that the robot is assumed to be capable of ascertaining whether or not another robot exists in a position adjacent thereto and whether or not the robot itself is in the target position. For example, it is assumed that all of the robots can communicate with other robots existing in the squares on the periphery of the robot, and by providing at least one robot with a GPS or, when at least one robot does not move during a single action control operation, by communicating with an adjacent robot using the robot having the GPS or the robot that did not move as a reference, each robot can easily ascertain the absolute position thereof. Alternatively, as long as the absolute position of at least one robot in the starting position is known in advance, this knowledge can be used to ascertain the absolute position of each robot at each time without a GPS.

In this method, it is assumed that prior to the start of a robot operation, the action control device calculates a sequence of robot motions in advance and operates the robots in accordance therewith.

The number of robots performing the task is p (where p is any integer no smaller than 20), and each robot is assumed to be capable of moving in X-Y-Z axis directions (in this example, six directions, namely upward, downward, leftward, rightward, frontward, and rearward directions on the paper surface of the figure) within a three-dimensional space while sharing at least one plane with an adjacent robot. Note that the p robots are assumed to form a single group. Only one robot can exist in each cell. It is assumed that when another robot exists in a direction in which a robot is attempting to move, the robot stops. In FIG. 2, the cells indicate the positions in which the robots exist. Further, the beetle figure indicates the set of starting positions S, while the butterfly figure indicates the set of target positions G (hereafter, this region will also be referred to as the "target rank area G").

There are no particular limitations on the shapes formed by the set of starting positions S and the set of target positions G as long as adjacent target positions are connected to each other upward, downward, leftward, rightward, frontward, or rearward. In other words, each target position and each starting position is adjacent to another target position or starting position in at least one direction among the upward, downward, leftward, rightward, frontward, and rearward directions, and the shapes of the ranks formed by the sets of target positions and starting positions of the robots are respectively arbitrary block shapes.

It is assumed that in the set of starting positions S, the sets of intermediate positions M1, M2, M3, and the set of target positions G, the robots as a whole invariably form a three-dimensional shape. In other words, it is assumed that there are robots having different values for each of the values of an X coordinate, a Y coordinate, and Z coordinate of the position of each robot. For example, it is assumed to be impossible for all of the robots to have the same Z coordinate value. In other words, when the Z coordinate value of an arbitrary robot is a, at least one robot with at least a Z coordinate value of a+1 or a−1 exists. This applies likewise to the X coordinate values and Y coordinate values. To put it another way, in the set of starting positions S, the sets of intermediate positions M1, M2, M3, and the set of target positions G, the robots are set so as never to form a one-dimensional shape (i.e., a shape in which any two coordinate values, among the X coordinate, Y coordinate, and Z coordinate of the position of each robot, are identical in all of the robots) or a two-dimensional shape (i.e., a shape in which any one coordinate value, among the X coordinate, Y coordinate, and Z coordinate of the position of each robot, is identical in all of the robots) as a whole.

[Robot Coordinate Setting]

Figure 4:
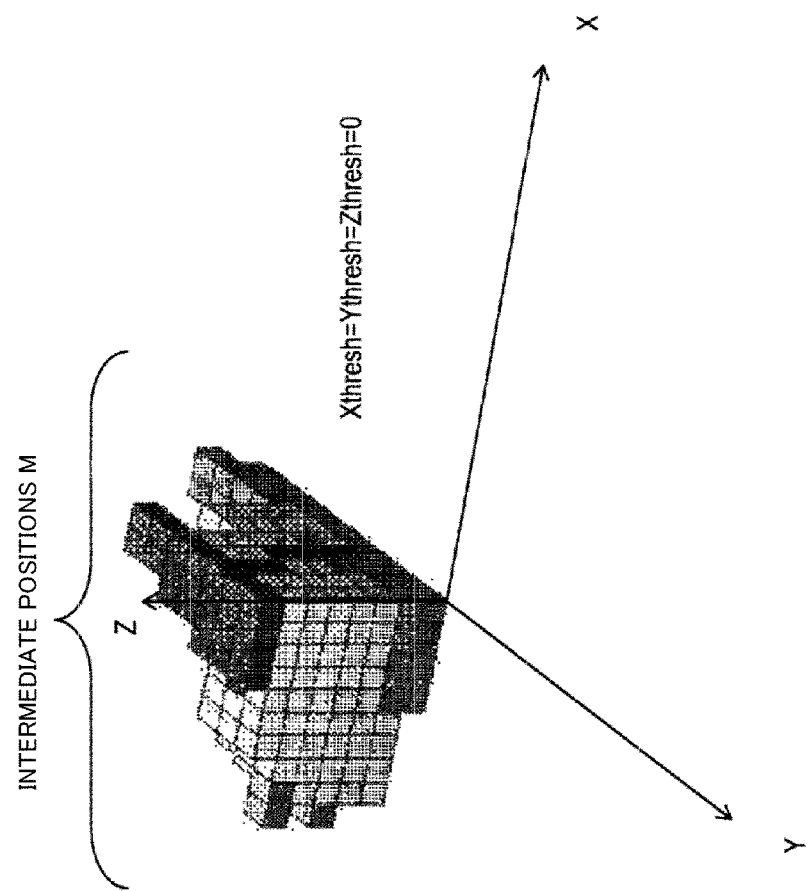
FIG. 4 is a view illustrating shapes of sets of intermediate positions M1 and M3.

The positions of respective robots i (where i denotes the robot number, and i=0, 1, 2, 3, . . . , p−1) are set as (Xr[i], Yr[i], Zr[i]), the positions included in the set of starting positions S are set as (Xrs[j], Yrs[j], Zrs[j]), and the positions included in the set of target positions G are set as (Xrg[j], Yrg[j], Zrg[j]) (where j denotes a target position number, and j=0, 1, 2, 3, . . . , p−1). The positions included in the set of intermediate positions M1 are set as (Xm1[j], Ym1[j], Zm1[j]), the positions included in the set of intermediate positions M2 are set as (Xm2[j], Ym2[j], Zm2[j]), and the positions included in the set of intermediate positions M3 are set as (Xm3[j], Ym3[j], Zm3[j]), and among the positions included in the set of starting positions S, the set of target positions G, and the sets of intermediate positions M1, M2, M3, a position having the maximum X and Y coordinates and the minimum Z coordinate is set as a point (Xthresh, Ythresh, Zthresh). In other words, the X coordinate value of the positions, among the positions included in the sets S, G, M1, M2, M3, having the maximum X coordinate is set as Xthresh, the Y coordinate value of the positions, among the positions included in the sets S, G, M1, M2, M3, having the maximum Y coordinate is set as Ythresh, and the Z coordinate value of the positions, among the positions included in the sets S, G, M1, M2, M3, having the minimum Z coordinate is set as Zthresh. Furthermore, the robots in the sets of intermediate positions M1, M2, M3 satisfy the following conditions [Intermediate position conditions 1] (see FIG. 4).

[Intermediate position conditions 1] are constituted by the following conditions (1) to (6).
(1) The X coordinate of all of the robots takes a value no larger than a certain constant value Xthresh.
(2) The Y coordinate of all of the robots takes a value no larger than a certain constant value Ythresh.
(3) The Z coordinate of all of the robots takes a value no smaller than a certain constant value Zthresh.
(4) All of the robots in which the X coordinate value is not Xthresh are contacted by a robot in an X axis positive direction.
(5) All of the robots in which the Y coordinate value is not Ythresh are contacted by a robot in a Y axis positive direction.
(6) All of the robots in which the Z coordinate value is not Zthresh, the X coordinate value is Xthresh, and the Y coordinate value is Ythresh are contacted by a robot in a Z axis negative direction.

Figure 5:
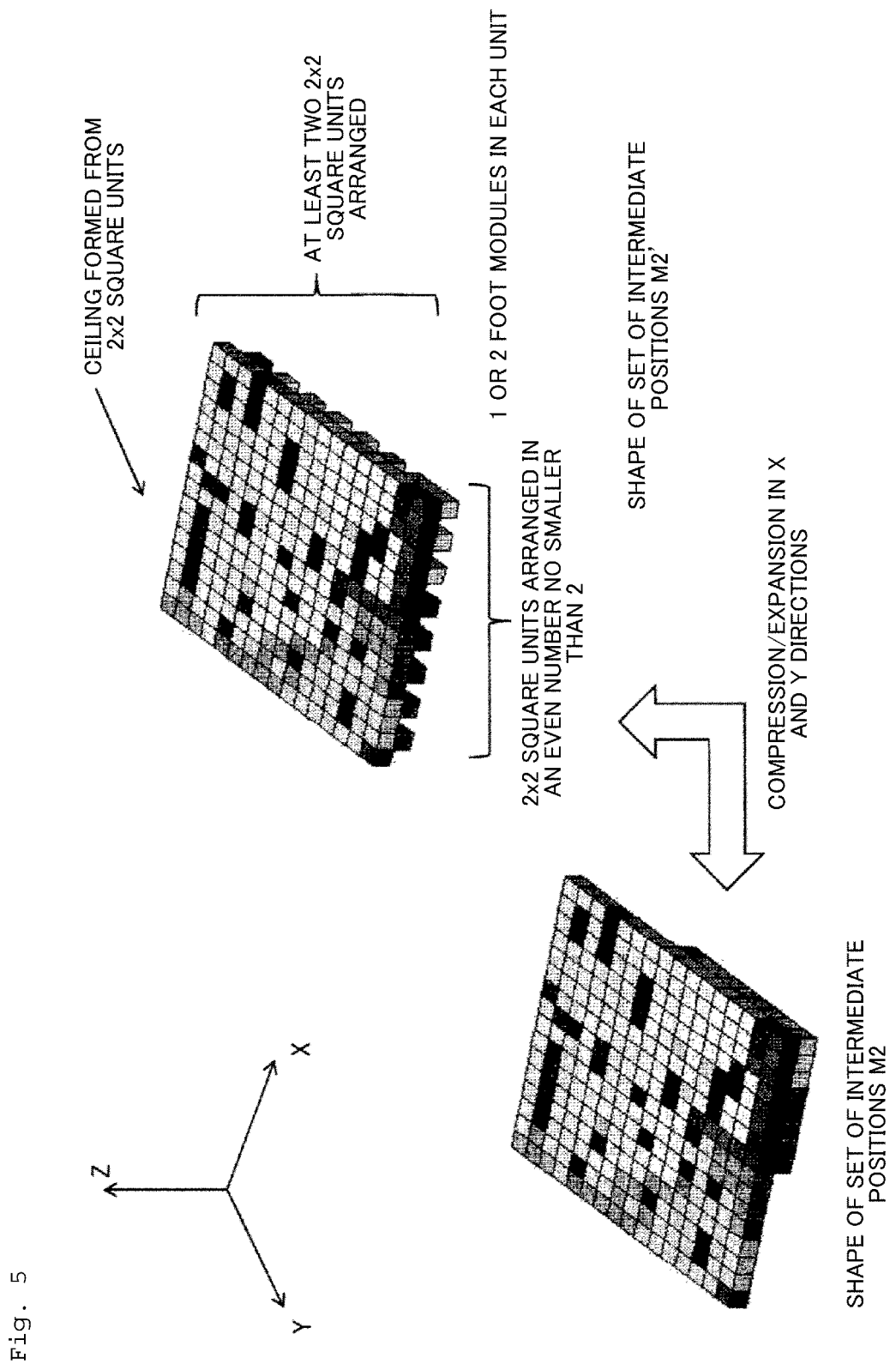
FIG. 5 is a view illustrating the shape of a set of intermediate positions M2.

In addition to the above conditions, the robots in the set of intermediate positions M2 satisfy the following conditions [intermediate position conditions 2] (see FIG. 5).

[Intermediate position conditions 2] are constituted by the following conditions (1) and (2).
(1) The robots having the maximum Z coordinate value form a rectangle in the X, Y plane with a length that is a multiple of 4 in either the X axis direction or the Y axis direction and a length that is an even number no smaller than 4 in the other of the X axis direction and the Y axis direction. Hereafter, this rectangle will also be referred to as a ceiling. As a result, the lengths of all sides take even numbers, and therefore the ceiling may be said to be constituted by a block of 2×2 squares. This block of 2×2 squares will be referred to as a square unit. As regards the shape of the ceiling, the square units may be arranged in any shape as long as a trajectory that allows a robot moving over the ceiling to pass over all of the square units constituting the ceiling one at a time in a unicursal fashion without crossing a square unit exists. In other words, a rectangle in the X, Y plane with a length that is a multiple of 4 in either the X axis direction or the Y axis direction and a length that is an even number no smaller than 4 in the other of the X axis direction and the Y axis direction is an example of a ceiling shape on which this unicursal trajectory exists. To put it another way, the shape of the ceiling may be any shape having a trajectory that allows a robot moving over the ceiling to pass over all of the square units from a certain position and return to the original position without duplication or crossing.

(2) The robots not having the maximum Z coordinate value each contact a square unit of the ceiling, and when a state in which the number thereof is 1 or 2 for each square unit of the ceiling is set as M2', M2 denotes a state in which M2' has been compressed in the X and Y directions.

[Definitions of Robot Motions]

The motion subjects are robots disposed in a room. A motion a of the robot i is any one of a total of 7 types, namely remaining stationary and moving in upward, downward, leftward, rightward, frontward, and rearward directions by a distance corresponding to one cell. For example, 0: remaining stationary
1: movement by one cell within a three-dimensional space in a direction (the rightward direction) in which the X coordinate value increases
2: movement by one cell within a three-dimensional space in a direction (the frontward direction) in which the Y coordinate value increases
3: movement by one cell within a three-dimensional space in a direction (the leftward direction) in which the X coordinate value decreases
4: movement by one cell within a three-dimensional space in a direction (the rearward direction) in which the Y coordinate value decreases
5: movement by one cell within a three-dimensional space in a direction (the upward direction) in which the Z coordinate value increases, and
6: movement by one cell within a three-dimensional space in a direction (the downward direction) in which the Z coordinate value decreases, are set as a $[i] \in \{0, 1, 2, 3, 4, 5, 6\}$.

[Problems in Search Calculation]

The state space in this type of task environment includes a number of states corresponding to the number of robots x three dimensions, and the number of selectable actions corresponds to the number of robot actions (=7) to the power of the number of robots. For example, when the number of robots is 50 and the number of cells in the vertical, horizontal, and height directions of the room is 20 each, the number of states is 20 to the power of 150, and therefore a massive amount of resources is required for search calculations. Moreover, each time the number of robots increases by 1, the number of states increases 8000 times.

Even after adopting the constraint condition that the robots contact each other, as described in the [Problem setting] section, reducing the basic calculation amount is difficult and remains a significant problem in cases where a plurality of robots are used.

More specifically, in the problem of guiding a large number of robots to a plurality of target positions, for example, even when it is possible to determine the route to be taken by one robot to a certain position by means of a search calculation, allocating a target position to each robot remains a significant problem. If the target positions are not allocated skillfully, a robot that reaches the target position early remains sitting in a position obstructing the movement of a later robot, making it difficult for the robots as a whole to forma rank. When calculating a way of allocating target positions to the robots by means of searching is considered in order to avoid this problem, the number of ways of allocating the target positions corresponds to the factorial of the number of robots, and therefore the calculation load increases dramatically together with the number of robots.

Further, in a case where search calculations for causing the robots to move while sharing a single plane are considered, the search calculations are performed in consideration of the mutual movements of the robots, and therefore the required calculation amount increases exponentially in relation to the number of robots.

[Introduction of Three Motion Processes]

In this embodiment, as a measure for solving these problems related to the calculation load, the motion process of the robot is considered in three stages. The first stage is a compression and expansion process from the set of starting positions S to the set of intermediate positions M1 and from the set of intermediate positions M3 to the set of target positions G, the second stage is an intermediate transformation process from the set of intermediate positions M1 to the set of intermediate positions M2 and from the set of intermediate positions M2 to the set of intermediate positions M3, and the third stage is a switching process within the set of intermediate positions M2.

[Compression and Expansion Process]

First, the compression process of the compression and expansion process will be described. The expansion process is calculated by regenerating the compression process in reverse in temporal terms. The compression process includes two processes.

Figure 6:
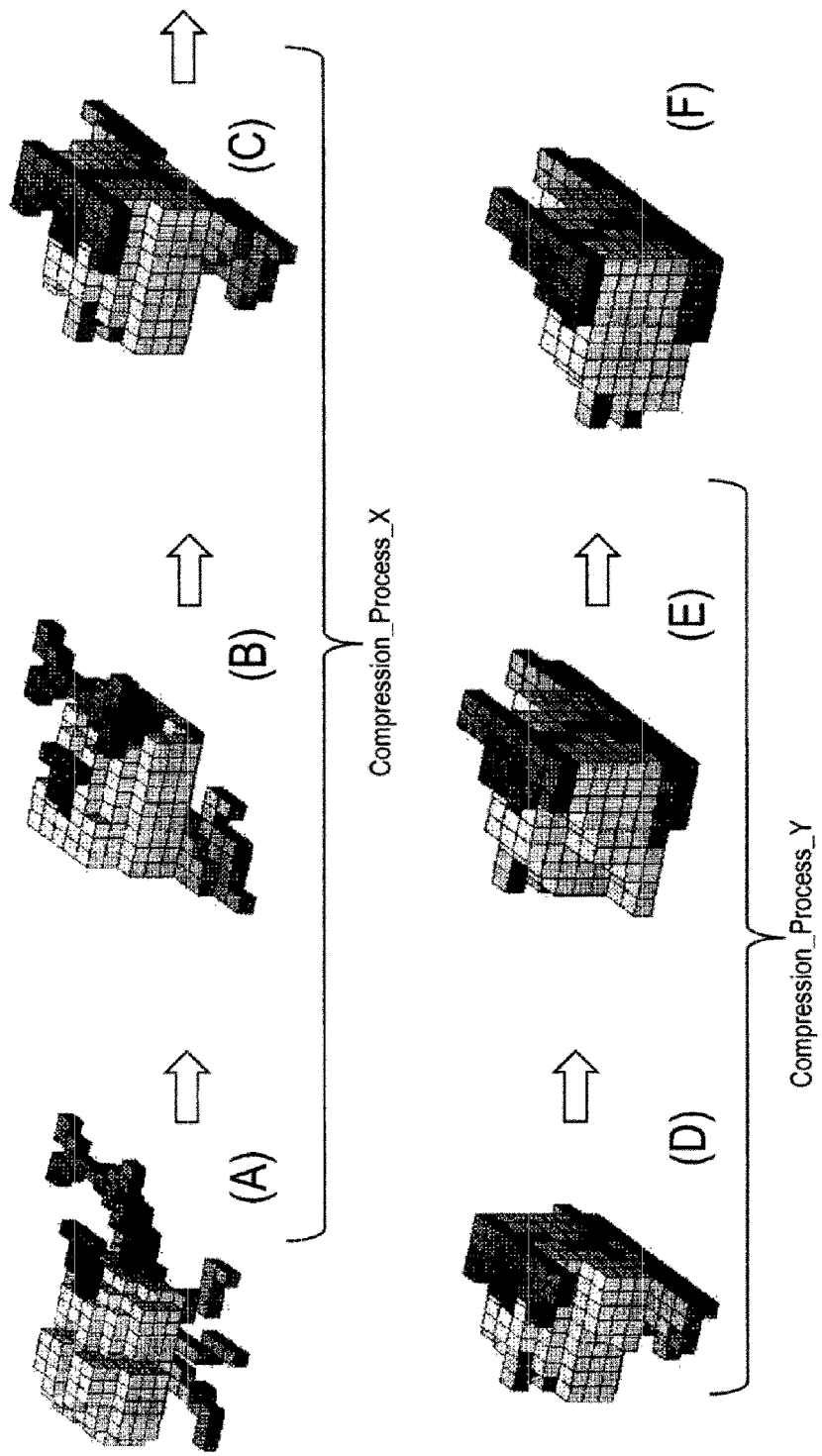
FIG. 6 is a view illustrating a compression process.

In the first process, a first virtual plane that is perpendicular to the X axis and fixed in a position of X=Xthresh+1, and a second virtual plane on which virtual robots (also referred to hereafter as the "virtual robots" or simply "the robots") in the starting positions (Xrs[j], Yrs[j], Zrs[j]) move in the X axis positive direction from infinity in the X axis negative direction are envisaged, and the robots abutting the second virtual plane are pushed and thereby compressed such that that none of the robots exceeds the first virtual plane and such that the X coordinate values thereof remain at or below Xthresh. This is realized by Compression_Process_X, described below (see FIG. 6). Here, when a robot being pushed by the second virtual plane is unable to move due to already being supported by the first virtual plane, support by the first virtual plane is prioritized in relation to that robot.

In the second process, a third virtual plane that is perpendicular to the Y axis and fixed in a position of Y=Ythresh+1, and a fourth virtual plane on which the virtual robots in the positions (Xr[i], Yr[i], Zr[i]) reached after the first compression process described above move in the Y axis positive direction from infinity in the Y axis negative direction are envisaged, and the robots abutting the fourth virtual plane are pushed and thereby compressed such that that none of the robots exceeds the third virtual plane and such that that the Y coordinate values thereof remain at or below Ythresh. This is realized by Compression_Process_Y, described below (see FIG. 6). Here, when a robot being pushed by the third virtual plane is unable to move due to already being supported by the fourth virtual plane, support by the third virtual plane is prioritized in relation to that robot.

[Motion_Data_Update]

(1) The positions of the robots i at the current time tm are stored in variables (motion_x[tm][i], motion_y[tm][i], motion_z[tm][i]) (i=0, 1, . . . , p−1).

(2) tm is incremented.

[Compression_Process]

(1) tm is set at tm=0. The positions of the robots i are set as the positions (Xrs[i], Yrs[i], Zrs[i]) included in the set of starting positions S. [Motion_Data_Update] is executed.

(2) [Compression_Process_X], described below, is executed.

(3) [Compression_Process_Y], described below, is executed.

(4) In the positions of the robots i at the current time tm, the maximum value of the Z coordinate is stored in Zmax[1], the number of robots with an X coordinate of _x at each Z coordinate value _z (in other words, the number of robots arranged in the Y axis direction in _x, _z) is stored in _y_num[1][_x][_z], and the number of robots with a Y coordinate of _y at each Z coordinate value _z and (in other words, the number of robots arranged in the X axis direction in _y, _z) is stored in _x_num[1][_y][_z]. Note that _x_num[a][y][z] is a variable indicating the number of robots with a Y coordinate value of y and a Z coordinate value of z in a set of intermediate positions Ma (a being any of 1, 2, and 3). Further, y_num[a][y][z] is a variable indicating the number of robots with an X coordinate value of x and a Z coordinate value of z in the set of intermediate positions Ma. Zmax[a] is a variable indicating the maximum value of the Z coordinate in the set of intermediate positions Ma.

(5) The positions (motion_x[t][i], motion y[t][i], motion_z[t][i]) of the robots i at each time t during the robot motions described above are stored in variables (motion_x_s_m1[t][i], motion_y_s_m1[t][i], motion_z_s_m1[t][i]). The value of tm−1 is stored in t_s_m1. (motion_x_s_m1[t][i], motion_y_s_m1[t][i], motion_z_s_m1[t][i])←(motion_x[t][i], motion y[t][i], motion_z[t][i]).

t_s_m1←tm−1.

Note that a-b indicates that a value b is inserted into a variable a. As a result of this processing, the set of starting positions S is transformed (compressed) into the set of intermediate positions M1. Note that motion_x_a_b[t][i], motion_y_a_b[t][i], and motion_z_a_b[t][i] are respectively variables indicating the X coordinate values, Y coordinate values, and Z coordinate values of the robots i at the time t when the robots are moved and transformed from a set of positions a (where a is any of S, M1, M2, and M3) to a set of positions b (where b is any of M1, M2, M3, and G).

[Extension_Process]

(1) tm is set as tm=0. The positions of the robots i are set as positions (Xrg[i], Yrg[i], Zrg[i]) included in the set of target positions G. [Motion_Data_Update] is executed.

(2) [Compression_Process_X], described below, is executed.

(3) [Compression_Process_Y], described below, is executed.

(4) In the positions of the robots i at the current time tm, the maximum value of the Z coordinate is stored in Zmax[3], the number of robots with an X coordinate of _x at each Z coordinate value _z is stored in _y_num[3][_x][_z], and the number of robots with a Y coordinate of y at each Z coordinate value _z is stored in _x_num[3][_y][_z].

(5) The positions (motion_x[t][i], motion y[t][i], motion_z[t][i]) of the robots i at each time t during the robot motions described above are stored in variables (motion_x_m3_g[(tm−1)−t][i], motion_y_m3_g[(tm−1)−t][i], motion_z_m3_g[(tm−1)−t][i]). The value of tm−1 is stored in t_m3_g.

(motion_x_m3_g[(tm−1)−t][i], motion_y_m3_g [(tm−1)−t][i], motion_z_m3_g[(tm−1)−t][i])←(motion_x[t][i], motion_y[t][i], motion_z[t][i]).

t_m3_g←tm−1.

As a result of this processing, the set of intermediate positions M3 is transformed (expanded) into the set of target positions G. Examples of Compression_Process_X and Compression_Process_Y are described below.

[Compression_Process_X]

(1) The minimum value of the X coordinate in the virtual robot positions at the current time tm is set as Xmin, _xw=Xmin is set, and (2) to (4) are repeated for a period in which _xw<Xthresh.

(2) A variable destination_to_be_compressed[i]=0 is set for all of the robots i. _flg_c=0 is set. destination_to_be_compressed[i] is a variable indicating whether or not the robots i are to be moved (compressed) (at 1, the robots are moved, and at 0, the robots are not moved), while _flg_c is a variable indicating whether or not there are any robots to be moved (compressed) (at 1, there are robots to be moved, and at 0, there are no robots to be moved).

(3) The following is executed in relation to the virtual robots i with the X coordinate value _xw.

(3-1) When there are no robots with the X coordinate Xthresh among all robots in that are directly adjacent to the robots i in the X axis positive direction, the value of destination_to_be_compressed in these adjacent robots i-in is set at 1.

(3-2) _flg_c=1 is set.

(4) When flg_c=1, the X coordinate value of all of the robots in which destination_to_be_compressed[i]=1 is incremented, whereupon [Motion_Data_Update] is executed. _xw is incremented.

As a result of this processing, compression is performed such that the X coordinate values do not exceed Xthresh, as described above. (see FIGS. 6(A), (B), and (C))

[Compression_Process_Y]

(1) The minimum value of the Y coordinate in the virtual robot positions at the current time tm is set as Ymin, _yw=Ymin is set, and (2) to (4) are repeated for a period in which _yw<Ythresh.

(2) The variable destination_to_be_compressed[i] is set at variable destination to be compressed[i]=0 for all of the robots i. _flg_c=0 is set.

(3) The following is executed in relation to the virtual robots i with the Y coordinate value _yw.

(3-1) When there are no robots with the Y coordinate Ythresh among all robots in that are directly adjacent to the robots i in the Y axis positive direction, the value of destination_to_be_compressed in these adjacent robots i-in is set at 1.

(3-2) _flg_c=1 is set.

(4) When _flg_c=1, the Y coordinate value of all of the robots in which destination_to_be_compressed[i]=1 is incremented, whereupon [Motion_Data_Update] is executed. _yw is incremented.

As a result of this processing, compression is performed such that the Y coordinate values do not exceed Ymin, as described above. (see FIGS. 6(D) and (E))

Next, the processing of an intermediate transformation process for calculating motions by which the robots in the set of intermediate positions M1 are moved by rank control to the set of intermediate positions M2 will be described. Note that variables describing the calculated set of intermediate positions M2 are stored in the form of Zmax[2], _y_num[2][_x][_z], _x_num[2][_y][_z], rather than as positions of the robots i. The positions of the robots are acquired only as a result of transformation from the intermediate positions M1 and are not determined in advance prior to transformation.

[Transform_from_M1_to_M2]

(1) tm=0 is set. [Motion_Data_Update] is executed.
(2) Seed_Generation is executed.
(3) Middle_Transform is executed.
(4) Seed_UnGeneration is executed.

(5) The values (motion_x[t][i], motion y[t][i], motion_z[t][i]) of the positions of the robots i at each time t are stored in variables (motion_x_m1_*m2*[t][i], motion_y_m1_*m2*[t][i], motion_z_m1_*m2*[t][i]). The value of tm−1 is stored in t_m1_*m2*. (motion_x_m1_*m2*[t][i], motion_y_m1_*m2*[t][i], motion_z_m1_*m2*[t][i])←(motion_x[t][i], motion y[t][i], motion z[t][i]).

t_m1_*m2*←tm−1.

Figure 7:
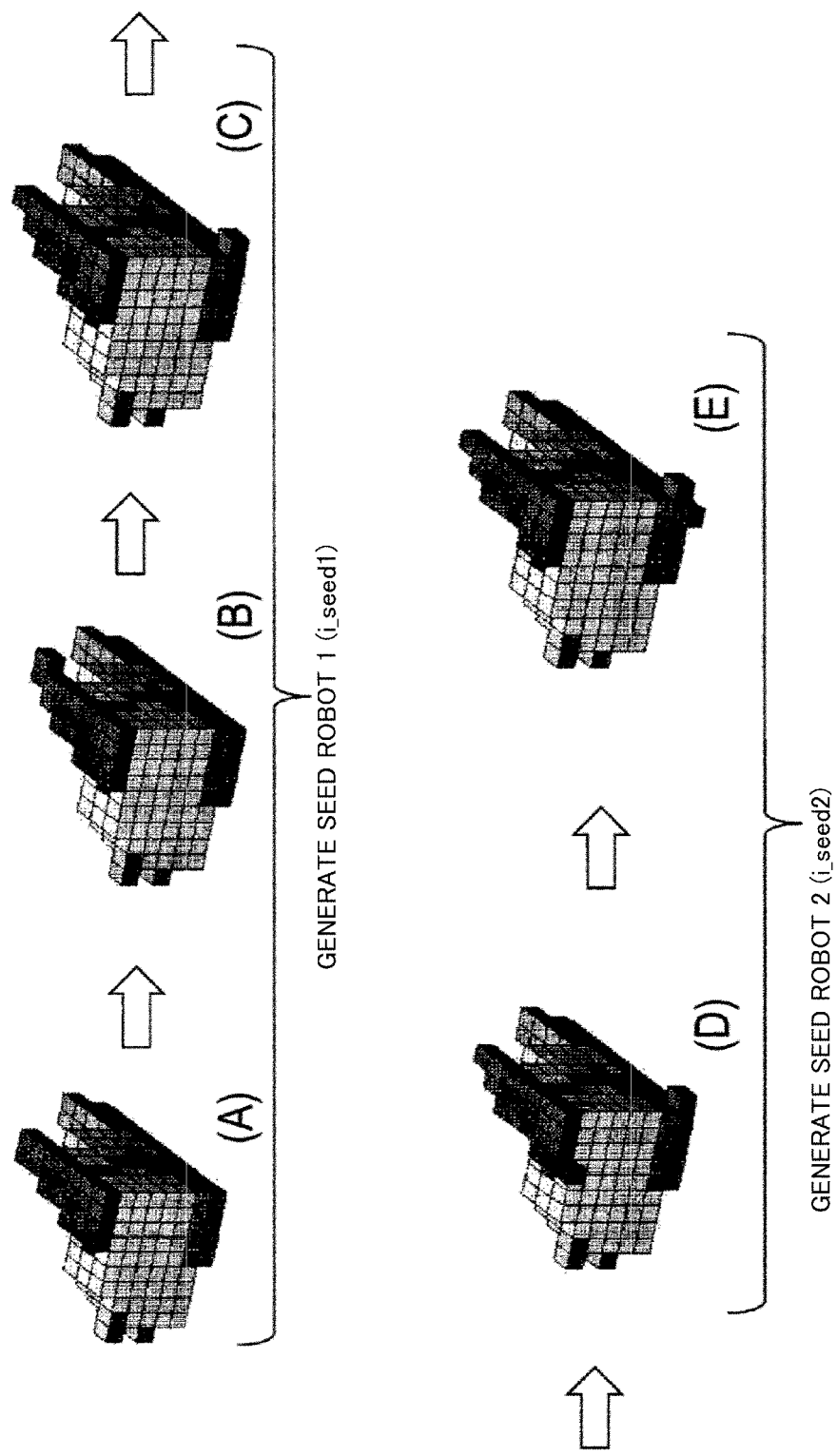
FIG. 7 is a view illustrating a seed robot generation method.

In Seed_Generation, two robots are selected as seed robots from the robots in the set of intermediate positions M1 and moved to seed robot standby positions (see FIG. 7). The seed robots are used to deconstruct and construct a pole part, a flag part, and a floor part during Middle_Transform, to be described below, and are used to maintain an adjacency state during movement of the other robots. Further, Zmax[1], _y_num[1][_x][_z], _x_num[1][_y][_z] after excluding the positions of the seed robots are calculated from the set of intermediate positions M1. Also, once the transformation processing [Middle_Transform] is complete, the positions, within the set of intermediate positions M2, to which the seed robots are to be returned are calculated, whereupon Zmax[2], _y_num[2][_x][_z], _x_num[2][_y][_z] after excluding these positions are calculated from the set of intermediate positions M2.

[Seed Generation]

(1) A robot i in which Xr[i]=Xthresh−(_x_num[1][Yr[i]][Zr[i]]−1) and Xr[i]!=Xthresh and in which Yr[i] has the minimum value satisfying _x_num[1][Yr[i]][Zr[i]]>1 is selected, whereupon _x_num[1][Yr[i]][Zr[i]], _y_num[1][Xr[i]][Zr[i]] are decremented.

(2) All of the robots having the same Y and Z coordinate values as the robot i are moved one step in the X axis positive direction, and the robot with the X coordinate Xthresh+1 is set as a robot i_seed1 (see FIGS. 7(A) and (B)). [Motion_Data_Update] is executed.

(3) A process of moving the robot i_seed1 one step in the Y axis positive direction and then executing [Motion_Data_Update] is repeated until the Y coordinate reaches Ythresh.

(4) A process of moving the robot i_seed1 one step in the Z axis negative direction and then executing [Motion_Data_Update] is repeated until the Z coordinate reaches Zthresh (see FIGS. 7(B) and (C)).

(5) A robot i in which Yr[i]=Ythresh−(_y_num[1][Xr[i]][Zr[i]]−1) and Yr[i]!=Ythresh and in which Xr[i] has the minimum value satisfying y_num[1][Xr[i]][Zr[i]]>1 is selected, whereupon _y_num[1][Xr[i]][Zr[i]], _x_num[1][Yr[i]][Zr[i]] are decremented.

(6) All of the robots having the same X and Z coordinate values as the robot i are moved one step in the Y axis positive direction, and the robot with the Y coordinate Ythresh+1 is set as a robot i_seed2. [Motion_Data_Update] is executed. (see FIG. 7(D))

(7) A process of moving the robot i_seed2 one step in the X axis positive direction and then executing [Motion_Data_Update] is repeated until the X coordinate reaches Xthresh.

(8) A process of moving the robot i_seed2 one step in the Z axis negative direction and then executing [Motion_Data_Update] is repeated until the Z coordinate reaches Zthresh (see FIG. 7(E)).

(9) A position i, within the set of intermediate positions M2, in which the X coordinate value Xm2[*i*] is Xthresh−(_x_num[2][Ym2[*i*]][Zm2[*i*]]−1) and Xm2[*i*] !=Xthresh and in which Ym2[*i*] has the minimum value satisfying _x_num

[2][Ym2[i]][Zm2[i]]>1 is selected, whereupon _x_num[2] [Ym2[i]][Zm2[i]], _y_num[2][Xm2[i]][Zm2[i]] are decremented.

Xseed[1]←Xm2[i], Yseed[1]←Ym2[i], Zseed[1]←Zm2[i]. Note that Xma[i], Yma[i], Zma[i] are variables respectively indicating the X coordinate values, Y coordinate values, and Z coordinate values of the robots i in the set of intermediate positions Ma (where a is any of 1, 2, and 3). Xseed[a], Yseed[a], Zseed[a] (where a is 1 or 2) are variables respectively indicating the X coordinate values, Y coordinate values, and Z coordinate values of the two seed robots i_seeda.

(10) A position i, within the set of intermediate positions M2, in which the X coordinate value Xm2[i] is Ythresh−(_y_num[2][Xm2[i]][Zm2[i]]−1) and Ym2[i] !=Ythresh and in which Xm2[i] has the minimum value satisfying y_num [2][Xm2[i]][Zm2[i]]>1 is selected, whereupon x_num[2] [Ym2[i]][Zm2[i]], y_num[2][Xm2[i]][Zm2[i]] are decremented.

Xseed[2]←Xm2[i], Yseed[2]←Ym2[i], Zseed[2]←Zm2[i].

Figure 8:
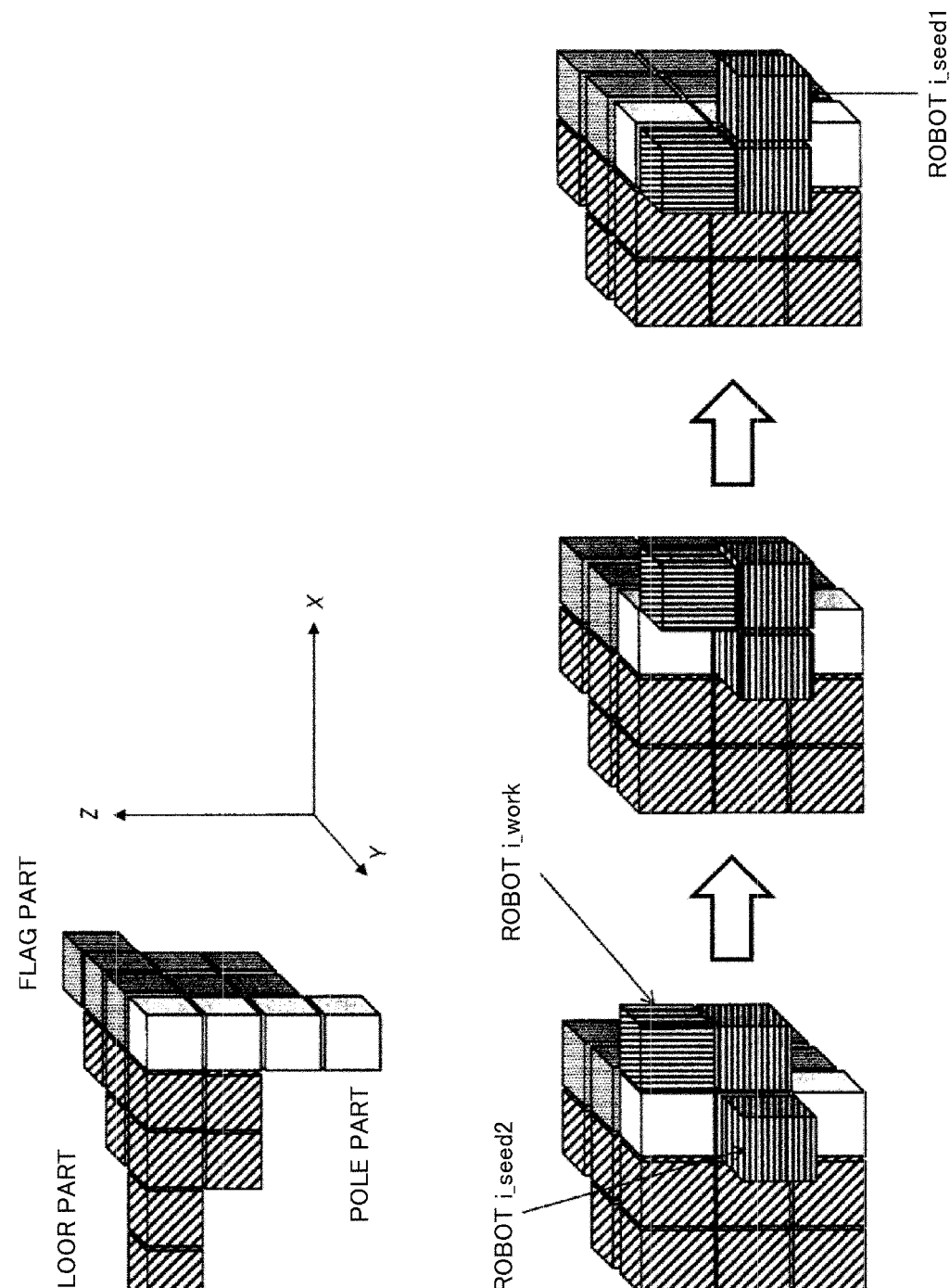
FIG. 8 is a view illustrating a seed robot operation method.

In Middle_Transform, the sets of intermediate positions M1 and M2 are respectively divided into the following three parts (see FIG. 8).

Pole part (Pole): A part constituted by the robots in the positions Xr[i]=Xthresh and Yr[i]=Ythresh.

Flag part (Flag): A part constituted by the robots in the positions Xr[i]=Xthresh and Yr[i] !=Ythresh.

Floor part (Floor): All of the other parts not belonging to the pole part and the flag part.

In Middle_Transform, the set of intermediate positions M1 is deconstructed into the floor part, the flag part, and the pole part in that order. Deconstruction of the floor part is performed by moving robots having the same Y coordinate and Z coordinate values one step in the X axis positive direction and pushing out the robots belonging to the flag part or the pole part to positions where the X coordinate is Xthresh+1 (see Floor_To_Pole, Floor_To_Flag, and Floor_To_Floor, to be described below). Deconstruction of the flag part is performed by moving robots having the same X coordinate and Z coordinate values one step in the Y axis positive direction and pushing out the robots belonging to the pole part to positions where the Y coordinate is Ythresh+1 (see Flag_To_Pole, Flag_To_Flag, and Flag_To_Floor, to be described below). The seed robots are used in deconstruction of the pole part (see Pole_To_Flag and Pole_To_Floor, to be described below). The robots deconstructed from the set of intermediate positions M1 are used to construct the set of intermediate positions M2, and construction of the set of intermediate positions M2 is performed in order of the pole part, the flag part, and the floor part. The seed robots are used to construct the pole part. Construction of the flag part is performed by moving the robots to be added to positions where the Y coordinate is Ythresh+1 and the X (=Xthresh) and Z coordinate values are the same as those of the positions to which the robots are to be added, and moving all of the robots having the same X (=Xthresh) and Z coordinates as these positions one step in the Y axis negative direction. Construction of the floor part is performed by moving the robots to be added to positions where the X coordinate is Xthresh+1 and the Y coordinate and Z coordinate values are the same as those of the positions to which the robots are to be added, and moving all of the robots having the same Y coordinate and Z coordinate as these positions one step in the X axis negative direction.

Here, during deconstruction and construction of the floor part, flag part, and pole part, in NPL 4 serving as prior art, an operation for extracting a single robot by deconstruction and adding the extracted robot during construction is performed one robot at a time. In other words, in NPL 4, only one robot is operated at a time. As a result, transformation takes a long time. Hence, in this embodiment, a plurality of robots extracted by deconstruction are moved simultaneously to the locations to which the robots are to be added during construction, and in so doing, an increase in the speed of transformation is achieved.

[Middle_Transform]
(1) Floor_To_Pole is executed.
(2) Floor_To_Flag is executed.
(3) Floor_To_Floor is executed.
(4) Flag_To_Pole is executed.
(5) Flag_To_Flag is executed.
(6) Flag_To_Floor is executed.
(7) Pole_To_Flag is executed.
(6) Pole_To_Floor is executed.

[Floor_To_Pole]
(1) A process for moving the robot i_seed1 and the robot i_seed2 one step in the Z positive direction and then executing [Motion_Data_Update] is repeated until the Z coordinate reaches Zmax[1]−1.
(2) The robot i_seed1 is moved one step in the Y positive direction. [Motion_Data_Update] is executed.
(3) The following processes (4)-(13) are executed continuously until either the Z coordinate of the robot in the uppermost part of the Pole reaches Zmax[2] or there are no more robots that can be deconstructed in the floor part.
(4) When there is no robot in the position (Xr[i]+1, Yr[i], Zr[i]) among all of the robots i in the flag part and when _x_num[1][Yr[i]][Zr[i]]>_x_num[2][Yr[i]][Zr[i]], all of the robots having the same Y coordinate value and Z coordinate value as the robots i are moved one step in the X positive direction. _x_num[1][Yr[i]][Zr[i]]−−. Note that "x−−" means that x is decremented (x←x−1) and "x++" means that x is incremented (x←x+1) The robots i newly having the X coordinate X_thresh+1 are set as j-th work robots work_robot[j]←i (see FIG. 8).
(5) [Motion_Data_Update] is executed.
(6) Of all of the robots i in which Xr[i]=X_thresh+1, the robots that can be moved in the Y positive direction are moved one step in the Y positive direction. (When either the Y coordinate value of the robot at the end of the path traced by the robot contacting the subject robot in the Y positive direction is not Y_thresh or when there is no robot contacting the subject robot in the Y positive direction.)
(7) [Motion_Data_Update] is executed.
(8) Of all of the robots i in which Xr[i]=1, the robots that can be moved in the Z positive direction are moved one step in the Z positive direction. (When either the Z coordinate value of the robot at the end of the path traced by the robot contacting the subject robot in the Z positive direction is not Zmax[1] or when there is no robot contacting the subject robot in the Z positive direction after movement, and in addition to these conditions, when there is a robot contacting the robot i in the flag part before and after movement.)
(9) [Motion Data Update] is executed.
(10) Among the work robots work_robot[j], the robot in the position (X_thresh+1, Y_thresh, Zmax[1]) is set as a robot _m_into, the robot in the position (X_thresh, Y_thresh+1, Zmax[1]) is set as a robot _n_into, the robot that contacts the robot _m_into in the Y negative direction is set as a robot _y_into, and the robot that contacts the robot _m_into in the Z negative direction is set as a robot _z_into.
(11) The following processes (11-1)-(11-3) are executed only when there are no robots that have yet to pass over the robot i_seed1.

(11-1) When the robot _m_into and the robot _y_into exist, all of the robots in which the Z coordinate is Zmax[1] and the X coordinate is 1 are moved one step in the Y positive direction, whereupon [Motion_Data_Update] is executed. Next, the robot _m_into is moved one step in the X negative direction, whereupon [Motion_Data_Update] is executed.

(11-2) When the robot _y_into does not exist but the robot _m_into and the robot _z_into exist, the robot _m_into is moved one step in the Y positive direction, whereupon [Motion Data Update] is executed. Next, all of the robots in which the Y coordinate is Y_thresh and the X coordinate is 1 are moved one step in the Z positive direction, whereupon [Motion_Data_Update] is executed. Next, the robot _m_into is moved one step in the X negative direction, whereupon [Motion_Data_Update] is executed.

(11-3) When neither the robot _y_into nor the robot _z_into exist but the robot _m_into exists, the robot i_seed1 is moved one step in the Y negative direction, whereupon [Motion Data Update] is executed. Next, all of the robots in which the Z coordinate is Zmax[1] and the X coordinate is 1 and the robot i_seed1 are moved one step in the Y positive direction, whereupon [Motion_Data_Update] is executed. Next, the robot _m_into is moved one step in the X negative direction, whereupon [Motion_Data_Update] is executed.

(12) The following processes (12-1) and (12-2) are executed only when (11-1)-(11-3) are not executed and the robots have passed over the robot i_seed1 only once.

(12-1) When the robot _n_into and the robot _m_into exist and there are still work robots that have yet to pass over the robot i_seed1, all of the robots in which the Z coordinate is Zmax[1] and the X coordinate is 1 are moved one step in the Y positive direction, whereupon [Motion_Data_Update] is executed. Next, the robot _n_into, the robot m_into, the robot i_seed1, and the robot i_seed2 are moved one step in the Z positive direction, whereupon [Motion_Data_Update] is executed. Next, the robot _n into is moved one step in the Y negative direction, whereupon [Motion_Data_Update] is executed. Next, the robot _m_into is moved one step in the X negative direction, whereupon [Motion_Data_Update] is executed. When, at this point in time, there are still work robots that have yet to pass over the robot i_seed1, a process for moving the robot i_seed1, the robot i_seed2, and the robot _m_into one step in the Z negative direction and then executing [Motion_Data_Update] is repeated until the Z coordinate value of the robot i_seed1 and the robot i_seed2 reaches Zmax[1]–1. Once all of the work robots have passed over the robot i_seed1, the robot i_seed1, the robot i_seed2, and the robot _m_into are moved one step in the Z positive direction, whereupon [Motion_Data_Update] is executed. Next, the robot _m_into is moved one step in the Y negative direction, whereupon [Motion_Data_Update] is executed.

(12-2) When only the robot _n_into exists and all of the work robots have passed over the robot i_seed1, the robot _ n_into, the robot i_seed1, and the robot i_seed2 are moved one step in the Z positive direction, whereupon [Motion_ Data_Update] is executed. Next, the robot _n_into is moved one step in the Y negative direction, whereupon [Motion_ Data_Update] is executed.

(13) When (11) and (12) are not executed, the following process (13-1) is executed.

(13-1) When the robot _m_into exists, all of the robots in which the Z coordinate is Zmax[1] and the X coordinate is 1 are moved one step in the Y positive direction, whereupon [Motion_Data_Update] is executed. Next, all of the robots having the same X and Y coordinates as the robot i_seed2 are moved one step in the Z positive direction, whereupon [Motion Data Update] is executed. The robot _m_into is then moved one step in the X negative direction, whereupon [Motion_Data_Update] is executed. Next, the robot in which the X and Y coordinates are the same as those of the robot _ i_seed2 and the Z coordinate value is the Z coordinate of the uppermost part of the pole at the current time+1 is moved one step in the Y negative direction, whereupon [Motion_ Data_Update] is executed. When, at this point in time, all of the work robots have passed over the robot _i_seed1, a process for moving the robot that contacts the robot i_seed2 from above together with the robot _ i_seed1 and the robot _i_seed2 one step in the Z positive direction and then executing [Motion_Data_Update] is repeated until the Z coordinate value thereof reaches the Z coordinate of the uppermost part of the pole at the current time+1. Next, the robot that contacts the robot _i_seed2 from above is moved one step in the Y negative direction, whereupon [Motion_ Data_Update] is executed.

(14) The robot _i_seed1 is moved one step in the Y negative direction. [Motion_Data_Update] is executed. The value of Zmax[1] is updated to the current value.

[Floor_To_Flag]

(1) A process for moving the robot i_seed1 and the robot i_seed2 one step in the Z positive direction and then executing [Motion_Data_Update] is repeated until the Z coordinate reaches Zmax[1]–1. iw=0 is set.

The following calculations are performed to determine the destination Z coordinate_flag_parts_z[j] of the j-th robot to be moved.

(1-1) j←Q is set.

At all _z values from all of _z=0 to Zmax[2],

```
if (_z>Zmax[1]){
    at all _y values from all of _y=Y_thresh-1 to
    Y_thresh- (_y_num[2] [X_thresh [_z] -1] ,
        _flag_parts_z [ j ] =_Z;
    j++;
}
else {
    at all _y values from all of
    _y=Y_thresh-(_y_num[1] [X_thresh] [_z]-1)-1 to
    Y_thresh-(_y_num[2] [X_thresh] [_z]-1),
    _flag_parts_z[j]=_z ;
    j++;
}
```

(2) The robot _i_seed1 is moved one step in the Y positive direction. [Motion_Data_Update] is executed.

(3) The following processes (4)-(12) are executed continuously either until the rank formed by the robots in the flag part encompasses or becomes identical to the rank of the flag part of M2 or until there are no more robots that can be deconstructed in the floor part.

(4) When there is no robot in the position (Xr[i]+1, Yr[i], Zr[i]) among all of the robots i in the flag part and when _ x_num[1][Yr[i]][Zr[i]]>x_num[2][Yr[i]][Zr[i]], all of the robots having the same Y coordinate value and Z coordinate value as the robots i are moved one step in the X positive direction. x_num[1][Yr[i]][Zr[i]]--.

(5) [Motion_Data_Update] is executed.

(6) Of all of the robots i in which Xr[i]=X_thresh+1, the robots that can be moved in the Y positive direction are moved one step in the Y positive direction. (When either the Y coordinate value of the robot at the end of the path traced by the robot contacting the subject robot in the Y positive direction is not Y_thresh or when there is no robot contacting the subject robot in the Y positive direction.)

(7) [Motion Data Update] is executed.

(8) Of all of the robots i in which Xr[i]=1, the robots that can be moved in the Z positive direction are moved one step in the Z positive direction. (When either the Z coordinate value of the robot at the end of the path traced by the robot contacting the subject robot in the Z positive direction is not Zmax[1] or when there is no robot contacting the subject robot in the Z positive direction after movement, and in addition to these conditions, when there is a robot contacting the robot i in the flag part before and after movement.)

(9) [Motion Data Update] is executed.

(10) Among the work robots work_robot[j], the robot in the position (X_thresh+1, Y_thresh, Zmax[1]) is set as the robot _m_into, the robot in the position (X_thresh, Y_thresh+1, Zmax[1]) is set as the robot _n_into, the robot that contacts the robot _m_into in the Y negative direction is set as the robot _y_into, and the robot that contacts the robot _m_into in the Z negative direction is set as the robot _z_into. The robot _m_into is set as an iw-th work robot work_robot[iw]←i. iw++.

(11) The following processes (11-1)-(11-3) are executed.

(11-1) When the robot _m_into and the robot _y_into exist, all of the robots in which the Z coordinate is Zmax[1] and the X coordinate is 1 are moved one step in the Y positive direction, whereupon [Motion_Data_Update] is executed. Next, the robot m into is moved one step in the X negative direction, whereupon [Motion_Data_Update] is executed.

(11-2) When the robot _y_into does not exist but the robot _m_into and the robot _z_into exist, the robot _m_into is moved one step in the Y positive direction, whereupon [Motion_Data_Update] is executed. Next, all of the robots in which the Y coordinate is Y_thresh and the X coordinate is 1 are moved one step in the Z positive direction, whereupon [Motion_Data_Update] is executed. Next, the robot _m_into is moved one step in the X negative direction, whereupon [Motion_Data_Update] is executed.

(11-3) When neither the robot _y_into nor the robot _z_into exist but the robot _m_into exists, the robot i_seed1 is moved one step in the Y negative direction, whereupon [Motion_Data_Update] is executed. Next, all of the robots in which the Z coordinate is Zmax[1] and the X coordinate is 1 and the robot i_seed1 are moved one step in the Y positive direction, whereupon [Motion_Data_Update] is executed. Next, the robot m into is moved one step in the X negative direction, whereupon [Motion_Data_Update] is executed.

(12) The following processing (12-1)-(12-3) is performed on all of the robots having the same X and Y coordinates as the robot i_seed2 (work_robot[j]j=0 to iw-1).

(12-1) When _flag_parts_z[j] is at Zmax[1]-1, the robot i_seed1 is moved one step in the Z positive direction, whereupon [Motion_Data_Update] is executed. Next, the robot i_seed1 is switched with the robot work_robot[j] and the robot work_robot[j] is switched with the robot _i_seed1 (_i_seed1↔work_robot[j]). Next, all of the robots in which the Z coordinate is Zmax[1]-1 and the X coordinate is 0 are moved one step in the Y negative direction, whereupon [Motion_Data_Update] is executed. The robot _i_seed1 and the robot _i_seed2 are then moved one step in the Z negative direction, whereupon [Motion Data Update] is executed.

(12-2) When _flag_parts_z[j]>Zmax[1]-1 and the Z coordinate of the robot work_robot[j] is smaller than _flag_parts_z[j], the robot work_robot[j] is moved one step in the Z positive direction, whereupon [Motion_Data_Update] is executed. When the Z coordinate of the robot work_robot[j] is identical to _flag_parts_z[j], all of the robots in which the Z coordinate is _flag_parts_z[j] and the X coordinate is 0 are moved one step in the Y negative direction, whereupon [Motion_Data_Update] is executed.

(12-3) When _flag_parts_z[j]<Zmax[1]-1 and the Z coordinate of the robot work_robot[j] is larger than _flag_parts_z[j], the robot work_robot[j] is moved one step in the Z negative direction, whereupon [Motion_Data_Update] is executed. When the Z coordinate of the robot work_robot[j] is identical to _flag_parts_z[j], all of the robots in which the Z coordinate is _flag_parts_z[j] and the X coordinate is 0 are moved one step in the Y negative direction, whereupon [Motion_Data_Update] is executed.

(13) The robot _i_seed1 is moved one step in the Y negative direction. [Motion_Data_Update] is executed. The value of Zmax[1] is updated to the current value.

[Floor To Floor]

(1) A process for moving the robot i_seed1 and the robot i_seed2 one step in the Z positive direction and then executing [Motion_Data_Update] is repeated until the Z coordinate reaches Zmax[1]-1. The robot i_seed1 is moved one step in the Y positive direction. [Motion_Data_Update] is executed. iw=0 is set.

The following calculations are performed to determine the destination Z coordinate_flag_parts_z[j] and Y coordinate flag_parts_y[j] of the j-th robot to be moved.

(1-1) j←0 is set.

At all _z values from all of _z=Zmax[2] to _z=0, at all _y values from all of

_y=Y_thresh−(y_num[2][X_tresh][_z]−1) to Y_thresh, at all values from _x=x_num[1][_y][_z] to _x_num[2][_y][_z], _flag_parts_z[j]=_z;

_flag_parts_y[j]=_y;

j++;

(2) _group=0 is set. iw=0 is set. A variable storing the movement direction of the j-th work robot at the time t is set as work_trajectory[j][t]. A variable storing the group value of the j-th work robot is set as work group[j].

(3) In all _z values from all of _z=0 to Zmax[1], at all _y values from all of _y=Y_thresh−(_y_num[1][0][_z]−1) to Y_thresh, the following processing is performed.

(3-1) When _x_num[1][_y][_z]>_x_num[2][_y][_z], _group++.

(3-2) At all _k values from k=0 to k=x_num[1][_z][_y]−_x_num[2][_z][_y], (3-2-1) the robot in the position where the X coordinate is _k, the Y coordinate is y, and the Z coordinate is _z is set as work_robot[iw], and work group [iw]←group. iw++.

(3-2-2) When work group[iw−2]!=work group[iw−1], the work robot work_robot[iw−2] is moved for the first time in the X+ direction along work trajectory[iw−2][tp], and (3-2-3) if the Z coordinate of the robot work_robot[iw−2] is _z,

```
if the Y coordinate&& of
(_floor_parts_y [iw-2] <work_robot [iw-2]
_floor_parts_y [iw-1] <_y&&
_floor_parts_z [iw-2] ==_z&&_floor_parts_z [iw-1] ==_z) {
    the Y coordinate of tp+=−work_robot [iw-2] +_y−1
}
else{
    the Y coordinate of tp+=−work_robot [iw-2] +_y+1
}
```

```
    if (the Z coordinate of the robot work_ robot [iw-2] is not
_z) &&
    the Z coordinate of work_robot [iw-2] > _floor_parts_ z[iw-2] ) {
        the Y coordinate of tp+=-work_robot [iw-2] +_y+l
        the Z coordinate of tp+= (work_robot [iw-2] -_z)
    }
    if (the Z coordinate of the robot work_robot[iw-2] is not _Z &&
        the Z coordinate of work_robot [iw-2]
<=_floor_parts_z [iw-2] ) {
        the Y coordinate of tp+=-work_robot [iw-2] +_y+1
        the Z coordinate of tp+=- (work_robot [iw-2] -_z)
    }
```

(3-2-5) from t=0 to tp−1, work_trajectory[iw−1][t]←0 is set. t=tp is set.

(3-2-6) A process for applying t++ to work_trajectory[iw−1][t]←1 and applying t++ to work_trajectory[iw−1][t]=←0 is repeated _k+1 times. t−−.

```
        if (_floor_parts_z [iw-1] !=_z) {
            work_trajectory [iw-1] [t] ←2 followed by t++.
            execute Y_thresh-_y times.
            if(_floor_parts_z [iw-1] >_z) {
                work_trajectory [iw-1] [t] ←5 followed by t++.
                execute _floor_parts_z [iw-1] -_z times.
            }
            else{
                work_trajectory [iw-1] [t] ←6 followed by t++.
                execute (_floor_parts_z [iw-1] -_z) times.
            }
            work_trajectory [iw-1] [t] ←4 followed by t++ .
            execute (Y_thresh-_floor_parts_y [iw-1] ) times.
        }
        else{
            if(_floor_parts_y [iw-1]) <_y) {
                work_trajectory [iw-1] [t] ←4 followed by t++.
                execute _y-_floor_parts_y [iw-1] times.
            }
            else{
                work_trajectory [iw-1] [t] ←2 followed by t++.
                execute -(_y-_floor_parts_y [iw-1] ) times.
            }
        }
```

(3-2-8) work_trajectory[iw−1][t]←3 followed by t++.

(3-2-9) Increment _x_num[1][_floor_parts_y[iw−1]][_floor_parts_z[iw−1]].

(4) The following is repeated until movement of all of the work robots is complete.

(4-1) t←0. i_resi1←0. i_resi3←0.

(4-2) For all of the work robots work_robot[j],
when work_trajectory[j][t] is 0, the work robots work_robot[j] remain stationary.
when work_trajectory[j][t] is 1 and there are no work robots work_robot[j] having the same Y coordinate and Z coordinate values among all of the sets of y_resist1[i_resi1], z_resist1[i_resi1] values, the Y coordinate values and Z coordinate values of the work robots work_robot[j] are stored in y_resist1[i_resi1], z_resist1[i_resi1]. i_resi1++.
when work_trajectory[j][t] is 2, the work robots work_robot[j] are moved one step in the Y positive direction.
when work_trajectory[j][t] is 3 and there are no work robots work_robot[j] having the same Y coordinate and Z coordinate values among all of the sets of y_resist3[i_resi3], z_resist3[i_resi3] values, the Y coordinate values and Z coordinate values of the work robots work_robot[j] are stored in y_resist3[i_resi3], z_resist3[i_resi3]. i_resi3++.
when work_trajectory[j][t] is 4, the work robots work_robot[j] are moved one step in the Y negative direction.
when work_trajectory[j][t] is 5, the work robots work_robot[j] are moved one step in the Z positive direction.
when work_trajectory[j][t] is 6, the work robots work_robot[j] are moved one step in the Z negative direction.

(4-3) All of the robots having Y coordinate and Z coordinate values that are equal to a set (i=0 . . . i_resi1) of y_resist1[i], z_resist1[i] values are moved one step in the X positive direction. i_resi1←0.

(4-4) All of the robots in which the Y coordinate value and the Z coordinate value are equal to a set (i=0 . . . i_resi3) of y_resist3[i], z_resist3[i] values are moved one step in the X negative direction. i_resi3←0.

(4-5) [Motion_Data_Update] is executed.

(5) The robot i_seed1 is moved one step in the Y negative direction. [Motion_Data_Update] is executed.

[Flag_To_Pole]

(1) A process for moving the robot i_seed1 and the robot i_seed2 one step in the Z positive direction and then executing [Motion_Data_Update] is repeated until the Z coordinate reaches Zmax[1]−1.

(2) The robot i_seed2 is moved one step in the X positive direction. [Motion_Data_Update] is executed.

(3) The following processes (4)-(10) are executed continuously either until the Z coordinate of the robot in the uppermost part of the Pole reaches Zmax[2] or until there are no more robots that can be deconstructed in the flag part (robots in the flag part having a _z value at which (_y_num[1][X_thresh][_z]>_y_num[2][X_thresh][_z]) as a Z coordinate).

(4) When there is no robot in the position (Xr[i]+1, Yr[i], Zr[i]) among all of the robots i in the pole part and when _y_num[1][Xr[i]][Zr[i]]>_y_num[2][Xr[i]][Zr[i]], all of the robots having the same X coordinate value and Z coordinate value as the robots i are moved one step in the Y positive direction. _y_num[1][Yr[i]][Zr[i]]−−. The robots i newly having the Y coordinate Y_thresh+1 are set as the j-th work robots work_robot[j]<←i.

(5) [Motion_Data_Update] is executed.

(6) Of all of the robots i in which Yr[i]=Y_thresh+1, the robots that can be moved in the Z positive direction are moved one step in the Z positive direction. (When either the Z coordinate value of the robot at the end of the path traced by the robot contacting the subject robot in the Z positive direction is not Zmax[1] or when there is no robot contacting the subject robot in the Z positive direction.)

(7) [Motion_Data_Update] is executed.

(8) Among the work robots work robot[j], the robot in the position (X_thresh+1, Y_thresh, Zmax[1]) is set as the robot _m_into and the robot contacting the robot _m_into in the Z negative direction is set as the robot _z_into.

(9) The following processes are executed.

(9-1) When the robot _m_into and the robot _z_into exist, robots having the same X and Y coordinate values as the robot _m_into are moved one step in the Z positive direction, whereupon [Motion_Data_Update] is executed. Next, the robot _m_into is moved one step in the Y negative direction, whereupon [Motion_Data_Update] is executed. The robot i_seed1 and the robot i_seed2 are moved one step in the Z positive direction. The value of Zmax[1] is updated to the Z coordinate value of the current uppermost part of the pole.

(9-2) When the robot _z_into does not exist but the robot _m_into exists, the robot i_seed2 is moved one step in the X negative direction, whereupon [Motion_Data_Update] is executed. Next, the robot _m_into and the robot i_seed2 are moved one step in the Z positive direction, whereupon

[Motion_Data_Update] is executed. Next, the robot _m_into is moved one step in the Y negative direction, whereupon [Motion_Data_Update] is executed. The robot i_seed1 is then moved one step in the Z positive direction, whereupon [Motion_Data_Update] is executed. The robot _i_seed2 is then moved one step in the X positive direction, whereupon [Motion_Data_Update] is executed. The value of Zmax[1] is then updated to the Z coordinate value of the current uppermost part of the pole.

(10) The robot _i_seed2 is moved one step in the X negative direction. [Motion_Data_Update] is executed.

[Flag_To_Flag]

(1) A process for moving the robot i_seed1 and the robot i_seed2 one step in the Z positive direction and then executing [Motion_Data_Update] is repeated until the Z coordinate reaches Zmax[1]−1. The robot _i_seed2 is moved one step in the X positive direction, whereupon [Motion_Data_Update] is executed. iw=0 is set. The value of y_num[1][X_thresh][_z] is copied to y_num_buff[_z]. The following calculations are performed to determine the destination Z coordinate_flag_parts_z[j] and Y coordinate _flag_parts_y [j] of the j-th robot to be moved.

(1-1) j←0 is set.
 At all _z values from all of _z=Zmax[2] to _z=0,
 at all _y values from all of _y=y_num_buff[_z]+1 to _y_num[2]8 X_thresh[_z],
  _flag_parts_z[j]=_z.
 j++.

(2) A variable representing a group of robots having the same Z coordinate value in a departure position and a destination position is set as _group, and _group is set as _group=0. iw=0 is set. The variable storing the movement direction of the j-th work robot at the time t is set as work_trajectory[j][t]. The variable storing the group value of the j-th work robot is set as work group[j]. A time at which the robots in a g-th group are pushed out from the flag part is set as _oshidashi_t[_g]. A wait time until each robot is pushed out from the flag part is set as _tp←0.

(3) In all _z values from all of z=0 to Zmax[1], the following processing is performed.

(3-1) A variable _kugiri[_k] for partitioning the robots according to the destinations of the robots in the flag part that have the same Z coordinate is set as shown below (_k is the partition number).

First, _kugiri[0]←0. _k_num←1 is set. _iw_no←iw.
In all of ic value=1 to _y_num_buff[_z]−_y_num[2][X_thresh][_z]−1,
 if _flag_parts_z[_iw_no+ic]!=_flag_parts_z[_iw_no+ic−1], _kugiri[_k_num]=ic. _k_num++.

(3-2) When _y_num_buff[_z]>_y_num[2][X_thresh][_z], _group++.
 _kugiri[_k]←_y_num_buff[_z]−_y_num[2][X_thresh][_z].
 _k_num++.
 Otherwise, _k_num=0.

(3-3) In all _k values from _k=0 to _k_num−2,
 in all _k values from _y=Y_thresh−_kugiri[_k] to Y_thresh−(_kugiri[_k+1]−1), (3-3-1) the robot in a position where the X coordinate is X_thresh, the Y coordinate is _y, and the Z coordinate is _z is set as work_robot[iw], and work_group [iw]←_group. iw++.

(3-3-2) When work group [iw−2] !=work group [iw−1], the Z coordinate of the work robot work_robot[iw−2] is set as _z_prev, and
 tp+=_oshidashi_t[_group−1]+1.

(3-3-3) if (the Z coordinate _z_prev of the robot work_robot [iw−2]

```
is larger than _flag_parts_z [iw-2] ) {
    tp+=_z_prev-_z+1 .
}
else{
    tp+=-_z_prev+_z+l.
}
```

(3-3-4) Whether the group that departed first has the same destination is determined, and the wait time within the time taken for the robots in the group that departed first to be pushed into the target positions is calculated.

```
if (_f lag_parts_z [iw-2] ==_flag_parts_z [iw-1] ) {
_tp++. _tp++.
In all values from the variable i_comp = iw-3 to 0,
if(_flag_parts_z [iw-1] ==_flag_parts_z [i_comp] ) {
    _tp++.
    }
}
```

(3-3-5) From t=0 to tp=1, work_trajectory[iw−1][t]←0 is set.
 t=tp is set.
 When _k=_k_num−2, _oshidashi_t[_group]←0.
 (The time required to push in the group of robots in the present group is calculated using the last robot in the group.)

(3-3-6) Setting of push-in operation.
 At all values from the variable _kk=0 to _k
 the following is repeated _kugiri[_kk+1]−_kugiri [_kk] times.
 work_trajectory[iw−1][t]−2.
 tc++.

```
if (_k==_num_k-2) {
    _oshidashi_t [_grp] ++;
}
if(_kk != _k) {
work_trajectory [iw-1] [t] ←0 .
tc++ .
_x_k [_kk+1] -_x_k [_kk] times,
{
    work_trajectory [iw-1] [t] ←0. tc++.
    if (_k==_k_num-2) {
        _oshidashi_t [_group]++.
    }
}.
}
```

(3-3-7) Moving to target Z coordinate position

```
if (_floor_parts_z [iw-1] >_z) {
work_trajectory [iw-1] [t] ←5 then t++.
Repeat _floor_parts_z [iw-1] -_z times.
}
else{
work_trajectory [iw-1] [t] ←6 then t++.
Repeat (_floor_parts_z [iw-1] -_z) times.
}
```

(3-3-8) work_trajectory[iw−1][t]←4. t++.
 Repeat _kugiri [_k+1]−_kugiri [_k] times.

(3-3-9) Update number of flag part robots at destination height.
 _y_num[1][X_thresh][_flag_parts_z[iw−1]]++.
 Update number of flag part robots at departure point height.
 _y_num[1][X_thresh][_z]−−.

(4) The following is repeated until movement of all of the work robots is complete.
(4-1) t←0. i_resi2←0. i_resi4←0.
(4-2) For all of the work robots work_robot[j],
    when work_trajectory[j][t] is 0, the work robots work_robot[j] remain stationary.
    when work_trajectory[j][t] is 2 and there are no work robots work_robot[j] having the same X coordinate and Z coordinate values among all of the sets of x_resist2[i_resi2], z_resist2[i_resi2] values, the Y coordinate values and Z coordinate values of the work robots work_robot[j] are stored in y_resist2[i_resi2], z_resist2[i_resi2]. i_resi2++.
    when work_trajectory[j][t] is 4 and there are no work robots work_robot[j] having the same Y coordinate and Z coordinate values among all of the sets of y_resist4[i_resi4], z_resist4[i_resi4] values, the Y coordinate values and Z coordinate values of the work robots work_robot[j] are stored in y_resist4[i_resi4], z_resist4[i_resi4]. i_resi4++.
    when work_trajectory[j][t] is 5, the work robots work_robot[j] are moved one step in the Z positive direction.
    when work_trajectory[j][t] is 6, the work robots work_robot[j] are moved one step in the Z negative direction.
(4-3) All of the robots having Y coordinate and Z coordinate values that are equal to a set (i=0 . . . i_resi2) of y_resist2[i], z_resist2 [i] values are moved one step in the Y positive direction.
i_resi2←0.
(4-4) All of the robots having Y coordinate and Z coordinate values that are equal to a set (i=0 . . . i_resi4) of y_resist4[i], z_resist4 [i] values are moved one step in the Y negative direction. i_resi4←0.
(4-5) [Motion_Data_Update] is executed.
(5) The robot _i_seed2 is moved one step in the X negative direction. [Motion_Data_Update] is executed.
  [Flag_To_Floor]
(1) A process for moving the robot i_seed1 and the robot i_seed2 one step in the Z positive direction and then executing [Motion_Data_Update] is repeated until the Z coordinate reaches Zmax[1]−1. The robot _i_seed2 is moved one step in the X positive direction, whereupon [Motion_Data_Update] is executed. iw=0 is set. The value of _y_num[1][X_thresh][_z] is copied to y_num_buff[_z]. The following calculations are performed to determine the destination Z coordinate_flag_parts_z[j] and Y coordinate _flag_parts_y[j] of the j-th robot to be moved.
(1-1) j←0 is set.
    At all _z values from all of _z=Zmax[2] to _z=0
    At all _y values from all of
y=Y_thresh−(_y_num[2][X_thresh][_z]−1) to Y_thresh,
    At all values from all of _x=x_num[1][y][z] to _x_num[2][_y][_z],
        _flag_parts_z[j]=_z;
        _flag_parts_y[j]=y;
        j++;
(2) In all of the robots i in the pole part, if the number of robots in positions where the Y coordinate is larger than Y_thresh and the X and Z coordinates are identical is smaller than _y_num[ ][Yr[i]][Zr[i]]−_y_num[2][Yr[i]][Zr[i]], a process for moving all of the robots having the same X coordinate value and Z coordinate value as the robots i one step in the Y positive direction and then executing [Motion_Data_Update] is repeated until there are no more robots to be moved by this operation.
(3) A process for moving the robots, among all of the robots i in which Yr[i]>Y_thresh, that can be moved in the Z positive direction one step in the Z positive direction is repeated until there are no more robots to be moved by this operation. (This process is repeated in a state where either the Z coordinate value of the robot at the end of the path traced by the robot contacting the subject robot in the Z positive direction is not Zmax[1] or there is no robot contacting the subject robot in the Z positive direction, and when there is a robot contacting the subject robot in the Y negative direction before and after movement.) _push_z_min←(the smallest Z coordinate value Zr[i] of the Z coordinate values of the robots i in which Yr[i]>Y_thresh).
(4) _group=0 is set. iw=0 is set. The variable storing the movement direction of the j-th work robot at the time t is set as work_trajectory[j][t]. The variable storing the group value of the j-th work robot is set as work group[j]. iw←0 is set.
(5) In all _z values from all of _z=0 to Zmax[1], the following work robot trajectory setting processing is performed.
(5-1) A variable _flg_go←1 is set. A number that is twice the number of robots in which the Z coordinate is z and the Y coordinate is Y_thresh is stored in a variable _duration_enter[_z].
(5-2) The following is repeated for a period in which _flg_go=1. _flg_go←0.
(5-2-1) Of the robots i in positions where the X coordinate is Xthresh, the Y coordinate is larger than Y_thresh, and the Z coordinate is _z, and which have not yet been registered as work robots, the robot with the smallest Y coordinate value is set as work_robot[iw]. iw++. _flg_go←1.

```
(5-2-2) if (_flg_go==1&&_z>_push_z_min) {
  (5-2-1) t=0.
  (5-2-2-2) The wait time for the work robots having larger Z
  coordinates than _z to move to the flag part is calculated.
    For all _wz values from the variable wz=0 to Zmax[1] −_z−1,
    {work_trajectory [iw−1] [t] ←0. t++. }
``` is repeated _duration_enter[Zmax[1]−_wz times.
  work_trajectory[iw−1][t]−5. t++.
(5-2-2-3) work_trajectory[iw−1][t]←1. t++.
(5-2-2-4) When the difference between the Y coordinate value of the robot work_robot[iw−1] and Y_thresh is set as _ycount and _ycount is greater than 1, the following is executed _ycount times.
  work_trajectory[iw−1][t]←4. t++.
  work_trajectory[iw−1][t]←0. t++
(5-2-2-5) work_trajectory[iw−1][t]←4. t++.
(5-2-2-6) Trajectory setting for movement over flag surface.

```
if (Zmax [1] >_floor_parts_z [iw−1] ) {
  if (Zmax[1] −1==_floor_parts_z [iw−1] ) {
    if (_floor_parts_y [iw−1] ==0) {
      work_trajectory [iw−1] [t] ←13. t++.
      work_trajectory [iw−1] [t] ←6. t++.
    }
    else{
      work_trajectory [iw−1] [t] ←14. t++.
      work_trajectory [iw−1] [t] ←64. t++.
    }
  {work_trajectory [iw−1] [t] ←4. t++. }
  Repeat (Y_thresh−_floor_parts _y [iw−1] times.
```

```
        work_trajectory [iw-1] [t] ←3. t++.
        _x_num [1] [_floor_parts_z [iw-1] ]
            [_floor_parts_y [iw-1] ]++.
    }
    else{
        work_trajectory [iw-1] [t] ←16. t++.
        {work_trajectory [iw-1] [t] ←6. t++. }
        repeat Zmax [1]-2-_floor_parts_z [iw-1] times.
        {work_trajectory [iw-1] [t] ←4. t++. }
        Repeat Y_thresh-_floor_parts_y [iw-1] times.
        work_trajectory [iw-1] [t] ←3. t++.
        _x_num [1] [_floor_parts_z [iw-1]
            [_floor_parts_y [iw-1] ] ++.
    }
    else{
        {work_trajectory [iw-1] [t] ←4. t++. }
        Repeat Y_thresh-_floor_parts_y [iw-1] times.
        work_trajectory [iw-1] [t] ←3. t++.
        t_x_num [_floor_parts_z [iw-1] ]
            [_floor_parts_y [iw-1] ] ++.
        }
    }
```

(6) The following is repeated until movement of all of the work robots is complete.
(6-1) t←0. i_resi1←0. i_resi3←0.
(6-2) For all of the work robots work_robot[j],
   when work_trajectory[j][t] is 0, the work robots work_robot[j] remain stationary.
   when work_trajectory[j][t] is 1 and there are no work robots work_robot[j] having the same Y coordinate and Z coordinate values among all of the sets of y_resist1[$i$_resi1], z_resist1[$i$_resi1] values, the Y coordinate values and Z coordinate values of the work robots work_robot[j] are stored in y_resist1[$i$_resi1], z_resist1[$i$_resi1]. i_resi1++.
   when work_trajectory[j][t] is 2, the work robots work_robot[j] are moved one step in the Y positive direction.
   when work_trajectory[j][t] is 3 and there are no work robots work_robot[j] having the same Y coordinate and Z coordinate values among all of the sets of y_resist3[$i$_resi3], z_resist3[$i$_resi3] values, the Y coordinate values and Z coordinate values of the work robots work_robot[j] are stored in y_resist3[$i$_resi3], z_resist3[$i$_resi3]. i_resi3++.
   when work_trajectory[j][t] is 4, the work robots work_robot[j] are moved one step in the Y negative direction.
   when work_trajectory[j][t] is 5, the work robots work_robot[j] are moved one step in the Z positive direction.
   when work_trajectory[j][t] is 6, the work robots work_robot[j] are moved one step in the Z negative direction.
   when work_trajectory[j][t] is 13 and there are no work robots work_robot[j] having the same Y coordinate and Z coordinate values among all of the sets of y_resist3[$i$_resi3], z_resist3[$i$_resi3] values, the Y coordinate values and Z coordinate values of the work robots work_robot[j] are stored in y_resist3[$i$_resi3], z_resist3[$i$_resi3]. i_resi3++.
   The robot _i_seed1 and the work robot work_robot[j] are switched.
   _i_seed1↔work_robot[j]
   when work_trajectory[j][t] is 14, the robot _i_seed1 is moved one step in the Y negative direction.
   when work_trajectory[j][t] is 64, the work robots work_robot[j] are moved one step in the Z negative direction.
   The robot _i_seed1 and the work robot work_robot[j] are switched.
   _i_seed1↔work_robot[j].
   when work_trajectory[j][t] is 16, the work robots work_robot[j] and the robot _i_seed1 are moved one step in the Z negative direction.
   The robot _i_seed1 and the work robot work_robot[j] are switched.
   _i_seed1↔work_robot[j].
   when work_trajectory[j][t] is 21,

```
if (the X coordinate of the robot _i_seed2 is 0) {
   the robot _i_seed2 is moved one step in the X positive
direction.
   }
```

When there are no work robots work_robot[j] having the same Y coordinate and Z coordinate values among all of the sets of y_resist1[$i$_resi1], z_resist1[$i$_resi1] values, the Y coordinate values and Z coordinate values of the work robots work_robot[j] are stored in y_resist1[$i$_resi1], z_resist1[$i$_resi1]. i_resi1++.
   when work_trajectory[j][t] is 23,

```
if (the X coordinate of the robot _i_seed2 is 1) {
   the robot _i_seed2 is moved one step in the X negative
direction.
   }
```

(6-3) All of the robots having X coordinate and Z coordinate values that are equal to a set (i=0 . . . i_resi1) of y_resist1[$i$], z_resist1[$i$] values are moved one step in the X positive direction. i_resi1←0.
(6-4) All of the robots having Y coordinate and Z coordinate values that are equal to a set (i=0 . . . i_resi3) of y_resist3[$i$], z_resist3[$i$] values are moved one step in the X negative direction. i_resi3←0.
(6-5) [Motion_Data_Update] is executed.
(7) The robot _i_seed2 is moved one step in the X negative direction. [Motion_Data_Update] is executed.
   [Pole_To_Flag]
(1) A process for moving the robot i_seed1 and the robot i_seed2 one step in the Z positive direction and then executing [Motion_Data_Update] is repeated until the Z coordinate reaches Zmax[1]-1. iw=0 is set. The following calculations are performed to determine the destination Z coordinate _flag_parts_z[j] and Y coordinate _flag_parts_y[j] of the j-th robot to be moved.
(1-1) j←0 is set.
   At all _z values from all of _z=Zmax[2] to _z=0,
   at all _y values from all of _y=y_num[1][X_thresh][_z]+1 to _y_num[2][X_thresh[_z],
   _flag_parts_z[j]=_z.
   j++.
(2) iw=0. The variable storing the movement direction of the j-th work robot at the time t is set as work_trajectory[j][t]. The variable storing the group value of the j-th work robot is set as work_group[j]. The time at which the robots in the _g-th group are pushed out from the flag part is set as _oshidashi_t[_g]. The wait time until each robot is pushed out from the flag part is set as _tp←0.
(3) In all _z values from all of Zmax[1] to Zmax[2], the following processing is performed.
(3-1) If there are no more robots to be added to the flag part, the processing is terminated.

The robots in positions where the X coordinate is X_thresh, the Y coordinate is Y_thresh, and the Z coordinate is _z are set as work_robot[iw], and work_group[iw] ←_group. iw++.

_wait_z[Zmax[1]−_z]←−3.

(3-2) A variable storing the wait time until the start of the operation is set as _pile_t, and _pile_t+=_wait_z[_tz] is executed for all values from the variable _tz=0 to t_z_max−_z−1. t←0.

(3-3) {work_trajectory[iw−1][t]←0. t++} is repeated _pile_t times.

(3-4) work_trajectory[iw−1][t]−2. t++.

---

```
    if (_floor_parts_z [iw-1] ==Zmax [2] &&_z==Zmax [2] +1) {
       work_trajectory [iw-1] [t] ←26. t++.
    }
else{
   work_trajectory [iw-1] [t] ←16. t++.
   if(_floor_parts_z [iw-1] ==_z-2) {
      _wait_z [t_z_max-_z] =4 ;
   }
   else{
      work_trajectory [iw-1] [t] ←36. t++.
   }
   {work_trajectory [iw-1] [t] ←6. t++. }
   Repeat (_z-3) - (_floor_parts_z [iw-1] ) -1) times.
}
```

---

(3-6)
work_trajectory[iw−1][t]←4. t++.

---

```
    if (_floor_parts_z [iw-1] ==_z-2) {
       work_trajectory [num_of_ work_module-1] [_tc] ←46. t++.
    }
```

--- t_y_num[_floor_parts_z[iw−1]]++;

(4) The following is repeated until movement of all of the work robots is complete.

(4-1) t←0. i_resi2←0. i_resi4←0.

(4-2) For all of the work robots work_robot[j], when work_trajectory[j][t] is 0, the work robots work_robot[j] remain stationary.

when work_trajectory[j][t] is 2, the work robots work_robot[j] are moved one step in the Y positive direction.

when work_trajectory[j][t] is 3, the work robots work_robot[j] are moved one step in the X negative direction.

when work_trajectory[j][t] is 5, the work robots work_robot[j] are moved one step in the Z positive direction.

when work_trajectory[j][t] is 6, the work robots work_robot[j] are moved one step in the Z negative direction.

when work_trajectory[j][t] is 4 and there are no work robots work_robot[j] having the same X coordinate and Z coordinate values among all of the sets (i=0 . . . i_resi4) of x_resist4[i_resi4], z_resist1[i_resi4] values, the X coordinate values and Z coordinate values of the work robots work_robot[j] are stored in x_resist4[i_resi4], z_resist1[i_resi4]. i_resi4++.

when work_trajectory[j][t] is 16, the work robots work_robot[j], the robot _i_seed1, and the robot _i_seed2 are moved one step in the Z negative direction.

The robot _i_seed2 and the work robot work_robot[j] are switched.

_i_seed2↔work_robot[j].

when work_trajectory[j][t] is 26, the work robots work_robot[j], the robot _i_seed1, and the robot _i_seed2 are moved one step in the Z negative direction.

when work_trajectory[j][t] is 36, the work robots work_robot[j] and the robot _i_seed2 are moved one step in the Z negative direction.

when work_trajectory[j][t] is 46, the robot i_seed2 is moved one step in the Z negative direction.

(4-4) All of the robots having Y coordinate and Z coordinate values that are equal to a set (i=0 . . . i_resi4) of x_resist4[i], z_resist4 [i] values are moved one step in the Y negative direction.

i_resi4←0.

(4-5) [Motion_Data_Update] is executed.

(5) The value of Zmax[1] is updated to the Z coordinate value of the current uppermost part of the pole.

[Pole_To_Floor]

(1) A process for moving the robot _i_seed1 and the robot _i_seed2 one step in the Z positive direction and then executing [Motion_Data_Update] is repeated until the Z coordinate reaches Zmax[1]−1. iw=0 is set. The following calculations are performed to determine the destination Z coordinate_flag_parts_z[j] and Y coordinate_flag_parts_y[j] of the j-th robot to be moved.

(1-1) j←0 is set.
At all _z values from all of _z=Zmax[2] to _z=0,
At all _y values from all of
_y=Y_thresh−(_y_num[2][X_tresh][_z]−1) to Y_thresh,
At all values from x=_x_num[1][_y][_z] to _x_num[2][_y][_z],
_flag_parts_z[j]=z;
_flag_parts_y[j]=y;
j++;

(2) iw=0 is set. The variable storing the movement direction of the j-th work robot at the time t is set as work_trajectory[j][t]. The variable storing the group value of the j-th work robot is set as work group[j]. The time at which the robots in the g-th group are pushed out from the flag part is set as _oshidashi_t[_g]. The wait time until each robot is pushed out from the flag part is set as _tp<−0.

(3) In all _z values from all of _z=Zmax[1] to Zmax[2], the following processing is performed.

(3-1) The robots in positions where the X coordinate is X_thresh, the Y coordinate is Y_thresh, and the Z coordinate is _z are set as work_robot[iw], and work_group[iw] ←_group. iw++.

_wait_z[Zmax[1]−_z]−3.

(3-2) The variable storing the wait time until the start of the operation is set as _pile_t, and _pile_t+=wait z[_tz] is executed for all values from the variable _tz=0 to t_z_max−_z−1. t←0.

(3-3) {work_trajectory[iw−1][t]←0. t++} is repeated _pile_t times.

(3-4) work_trajectory[iw−1][t]←1. t++.

---

```
    if (_floor_parts_z [iw-1]==Zmax [2] &&_z==Zmax [2] +1) {
       work_trajectory [iw-1] [t] ←26. t++.
       {work_trajectory [iw-1] [t] ←4. t++. }
       Repeat (Y_thresh-_floor_parts_y [iw-1] ) times.
    }
else{
   work_trajectory [iw-1] [t] ←16. t++.
   if (_floor_parts_z [iw-1] ==_z-2) {
      _wait_z [t_z_max-_z] =4 ;
   }
```

-continued

```
else{
    work_trajectory[ iw-1] [t] ←36. t++.
}
    [work_trajectory [iw-1] [t] ←6. t++. }
Repeat ( (_z-3) − (_floor_parts_z [iw-1] ) −1) times.
    {work_trajectory [iw-1] [t] ←4. t++. }
Repeat (Y_thresh − _floor_parts_y [iw-1] ) times.
if (_floor_parts_z [iw-1] == _z-2) {
    work_trajectory [num_of_work_module-1] [_tc] ←46. t++.
    }
}
```

```
    work_trajectory [num_ of_work_module-1] [_tc] ←3. t++.
if (_floor_parts_z [iw-1] == _z-2&&_floor_parts_y [iw-1] = = 0) {
    work_trajectory [iw-1] [t] ←46. t++.
}
```

_x_num[1][floor_parts_z[iw−1]][floor_parts_y[iw−1]]++;
(4) The following is repeated until movement of all of the work robots is complete.
(4-1) t←0. i_resi2←0. i_resi4←0.
(4-2) For all of the work robots work_robot[j],
  when work_trajectory[j][t] is 0, the work robots work_robot[j] remain stationary.
  when work_trajectory[j][t] is 1 and there are no work robots work_robot[j] having the same Y coordinate and Z coordinate values among all of the sets of y_resist1 [$i$_resi1], z_resist1[$i$_resi1] values, the Y coordinate values and Z coordinate values of the work robots work_robot[j] are stored in y_resist1[$i$_resi1], z_resist1 [$i$_resi1]. i_resi1++.
  when work_trajectory[j][t] is 2, the work robots work_robot[j] are moved one step in the Y positive direction.
  when work_trajectory[j][t] is 3 and there are no work robots work_robot[j] having the same Y coordinate and Z coordinate values among all of the sets of y_resist3 [$i$_resi3], z_resist3[$i$_resi3] values, the Y coordinate values and Z coordinate values of the work robots work_robot[j] are stored in y_resist3[$i$_resi3], z_resist3 [$i$_resi3]. i_resi3++.
  when work_trajectory[j][t] is 4, the work robots work_robot[j] are moved one step in the Y negative direction.
  when work_trajectory[j][t] is 5, the work robots work_robot[j] are moved one step in the Z positive direction.
  when work_trajectory[j][t] is 6, the work robots work_robot[j] are moved one step in the Z negative direction.
  when work_trajectory[j][t] is 16, the work robots work_robot[j], the robot _i_seed1, and the robot _i_seed2 are moved one step in the Z negative direction.
The robot i_seed1 and the work robot work_robot[j] are switched.
_i_seed1↔work_robot[j]
  when work_trajectory[j][t] is 26, the work robots work_robot[j], the robot i_seed1, and the robot _i_seed2 are moved one step in the Z negative direction.
  when work_trajectory[j][t] is 36, the work robots work_robot[j] and the robot _i_seed1 are moved one step in the Z negative direction.
  when work_trajectory[j][t] is 46, the robot _i_seed1 is moved one step in the Z negative direction.
(4-3) All of the robots having X coordinate and Z coordinate values that are equal to a set (i=0 ... i_resi1) of y_resist1[$i$], z_resist1[$i$] values are moved one step in the X positive direction. i_resi1←0.
(4-4) All of the robots having Y coordinate and Z coordinate values that are equal to a set (i=0 ... i_resi3) of y_resist3[$i$], z_resist3[$i$] values are moved one step in the X negative direction. i_resi3←0.
(4-5) [Motion_Data_Update] is executed.
(5) The value of Zmax[1] is updated to the Z coordinate value of the current uppermost part of the pole.
  [Seed_UnGeneration]
(1) For a period in which Zr[i_seed2]>Zseed[2], a process for moving the robot i_seed2 one step in the Z axis negative direction and then executing Motion Data Update is performed repeatedly.
(2) For a period in which Zr[i_seed2]<Zseed[2], a process for moving the robot i_seed2 one step in the Z axis positive direction and then executing Motion Data Update is performed repeatedly.
(3) For a period in which Xr[i_seed2]>Xseed[2], a process for moving the robot i_seed2 one step in the X axis negative direction and then executing Motion Data Update is performed repeatedly.
(4) All of the robots that satisfy Xr[i]=Xseed[2] and Zr[i]=Zseed[2] are moved one step in the Y axis negative direction. Motion_Data_Update is executed.
(5) For a period in which Zr[i_seed1]>Zseed [1], a process for moving the robot i_seed1 one step in the Z axis negative direction and then executing Motion Data Update is performed repeatedly.
(6) For a period in which Zr[i_seed1]<Zseed [1], a process for moving the robot i_seed1 one step in the Z axis positive direction and then executing Motion Data Update is performed repeatedly.
(7) For a period in which Yr[i_seed1]>Yseed [1], a process for moving the robot i_seed1 one step in the Y axis negative direction and then executing Motion Data Update is performed repeatedly.
(8) All of the robots that satisfy Yr[i]=Yseed[1] and Zr[i]=Zseed[1] are moved one step in the X axis negative direction.
Motion_Data_Update is executed.
  As a result of this processing, the seed robots are incorporated into the set of intermediate positions M2.
  An operation for moving the robots in the set of intermediate positions M2 to the set of intermediate positions M3 by rank control can be realized by replacing M1 and M2 in [Transform_from_M1_to_M2], described above, with M2 and M3, respectively.
  [Transform_from_M2_to_M3]
  The variables in [Transform_from_M1_to_M2] described above are switched as follows.
Zmax[1]→Zmax[2], Zmax[2]→Zmax[3].
_x_num[1][_y][_z]→_x_num[2][_y][_z],
_x_num[2][_y][_z]→_x_num[3][_y][_z].
_y_num[1][_x][z]→_y_num[2][_x][_z],
_y_num[2][_x][_z]→_y_num[3][_x][_z].
Xm1→Xm2, Ym1→Ym2, Zm1→Zm2.
Xm2→Xm3, Ym2→Ym3, Zm2→Zm3.
(motion_x_m1_$m2$[$t$][$i$], motion_y_m1_$m2$[$t$][$i$], motion_z_m1_$m2$[$t$][$i$])→ (motion_x_m2_$m3$[$t$][$i$], motion_y_m2_$m3$[$t$][$i$], motion_z_m2_$m3$[$t$][$i$]). t_m1_$m2$→t_m2_$m3$.

[Transform_from_M1_to_M3]

Similarly, the variables in [Transform_from_M1_to_M2] are switched as follows.

Zmax[2]→Zmax[3].
_x_num[2][_y][_z]→_x_num[3][_y][_z].
_y_num[2][_x][_z]→_y_num[3][_x][_z].
Xm2→Xm3, Ym2→Ym3, Zm2→Zm3
(motion_x_m1_$m2[t][i]$, motion_y_m1_$m2[t][i]$, motion_z_m1_$m2[t][i]$)→,
(motion_x_m1_$m3[t][i]$, motion_y_m1_$m3[t][i]$, motion_z_m1_$m3[t][i]$).
t_m1_$m2$→t_m1_$m3$.

Note that the processing [Transform_from_M1_to_M3] is used when the set of intermediate positions M1 is transformed into the set of intermediate positions M3 without passing through the set of intermediate positions M2.

[Homogeneous Rank Transformation from the Set of Starting Positions S to the Set of Target Positions G]

There is demand for a process for transforming the set of starting positions S into the set of target positions G by combining the processing described above.

[Transformation from S to G Homo]

(1) [Compression_Process] is executed.
(2) [Extension_Process] is executed.
(3) [Transform from M1 to M3] is executed.
(4) The values of variables (motion_x_s_m1$[t][i]$, motion_y_s_m1$[t][i]$, motion_z_s_m1$[t][i]$) are stored in t=0 to t_s_m1 of variables (transform_S_to_G_x[t][i], transform_S_to_Gy[t][i], transform_S_to_G_z[t][i]).
(5) The values of variables (motion_x_m1_$m3[t][i]$, motion_y_m1_$m3[t][i]$, motion_z_m1_$m3[t][i]$) are stored in t=t_s_m1+1 to t_s_m1+1+t_m1_$m3$ of the variables (transform_S_to_G_x[t][i], transform_S_to_G_y[t][i], transform_S_to_G_z[t][i]).
(6) With respect to all of the robots i, the value of j at which (motion_x_m1_$m3[t\_m1\_m3][i]$, motion_y_m1_$m3[t\_m1\_m3][i]$, motion_z_m1_$m3[t\_m1\_m3][i]$)= (motion_x_m3_g[0][j], motion_y_m3_g[0][j], motion_z_m3_g[0][j]) is retrieved and stored in match [i]. The indices j of the robots in the set of intermediate positions M3 corresponding to the robots i in the set of intermediate positions M1 are stored in match[i].
(7) The values of variables (motion_x_m3_g[t][match[i]], motion_y_m3_g[t][match[i]], motion_z_m3_g[t][match[i]]) are stored in t=t_s_m1+1+t_m1_m3+1 to t_s_m1+1+t_m1_m3+1+t_m3_g of the variables (transform_S_to_G_x [t][i], transform_S_to_G_y[t][i], transform_S_to_C_z[t][i]).

As a result of this processing, the respective positions of the robots i from the set of starting positions S to the set of target positions G are stored in t=0 to t_s_m1+1+t_m1_m3+1+t_m3_g of (transform_S_to_G_x[t][i], transform_S_to_G_y[t][i], transform_S_to_G_z[t][i]), and therefore the actions of the respective robots can be controlled so as to align with these positions.

Note that by moving a plurality of control subjects simultaneously in [Middle_Transform] included in [Transform_from_M1_to_M3], in which the variables of [Transform_from_M1_to_M2] are replaced in the manner described above, the time required for rank transformation can be shortened in comparison with the prior art.

[Heterogeneous Rank Transformation from the Set of Starting Positions S to the Set of Target Positions G]

It is assumed that the positions j within the set of starting positions S and the positions j within the set of target positions G are occupied by the same robots. In this case, in order to move a robot i in a specific position j within the set of starting positions S to a specific position j determined within the set of target positions G, in addition to the processing of Transformation_from_S_to_G_Homo, described above, it is necessary to switch the positions of the robots in the set of intermediate positions M2. Switching processing performed for this purpose is set as [Transformation_M2_to_M2], and heterogeneous rank transformation processing from the set of starting positions S to the set of target positions G is performed as follows.

[Transformation_from_S_to_G_Hetero]

(1) [Compression_Process] is executed.
(2) [Extension_Process] is executed.
(3) [Transform_from_M1_to_M2] is executed.
(4) [Transform_from_M2_to_M3] is executed.
(5) With respect to all of the robots i, the value of j at which (motion_x_m2_$m3[t\_m2\_m3][i]$, motion_y_m2_$m3$ $[t\_m2\_m3][i]$, motion_z_m2_$m3[t\_m2\_m3][i]$)= (motion_x_m3_g[0][j], motion_y_m3_g[0][j], motion_z_m3_g[0][j]) is retrieved and set as match [j]=i.
(6) [Transformation_from_M2_to_M2] is executed.
(7) The values of the variables (motion_x_s_m1$[t][i]$, motion_y_s_m1$[t][i]$, motion_z_s_m1$[t][i]$) are stored in t=0 to t_s_m1 of the variables (transform_S_to_G_x[t][i], transform_S_to_Gy[t][i], transform_S_to_G_z[t][i]).
(8) The values of the variable (motion_x_m1_$m2[t][i]$, motion_y_m1_$m2[t][i]$, motion_z_m1_$m2[t][i]$) are stored in t=t_s_m1+1 to t_s_m1+1+t_m1_$m2$ of the variables (transform_S_to_G_x[t][i], transform_S_to_G_y[t][i], transform_S_to_G_z [t][i]).
(9) The values of the variables (motion_x_m2_m2$[t][i]$, motion_y_m2_m2$[t][i]$, motion_z_m2_m2$[t][i]$) are stored in t=t_s_m1+1+t_m1_m2+1 to t_s_m1+1+t_m1_m2+1+t_m2_m2 of the variable (transform_S_to_G_x[t][i], transform_S_to_G_y[t][i], transform_S_to_C_z[t][i]).
(10) The values of the variables (motion_x_m2_m3$[t]$[match[i]], motion_y_m2_m3$[t]$[match[i]], motion_z_m2_m3$[t]$[match[i]]) are stored in t=t_s_m1+1+t_m1_m2+1+t_m2_m2+1 to t_s_m1+1+t_m1_m2+1+t_m2_m2+1+t_m2_m3 of the variables (transform_S_to_G_x[t][i], transform_S_to_G_y[t][i], transform_S_to_G_z[t][i]).
(11) The values of the variables (motion_x_m3_g[t][i], motion_y_m3_g[t][i], motion_z_m3_g[t][i]) are stored in t=t_s_m1+1+t_m1_m2+1+t_m2_m2+1+t_m2_m3+1 to t_s_m1+1+t_m1_m2+1+t_m2_m2+1+t_m2_m3+1+t_m3_g of the variables (transform_S_to_G_x[t][i], transform_S_to_ G_y[t][i], transform_S_to_G_z[t][i]).

Note that by moving a plurality of control subjects simultaneously in [Middle_Transform] included in [Transform_from_M2_to_M3], in which the variables of [Transform_from_M1_to_M2] are replaced in the manner described above, the time required for rank transformation can be shortened in comparison with the prior art.

[Transformation_M2_to_M2]

Figure 9:
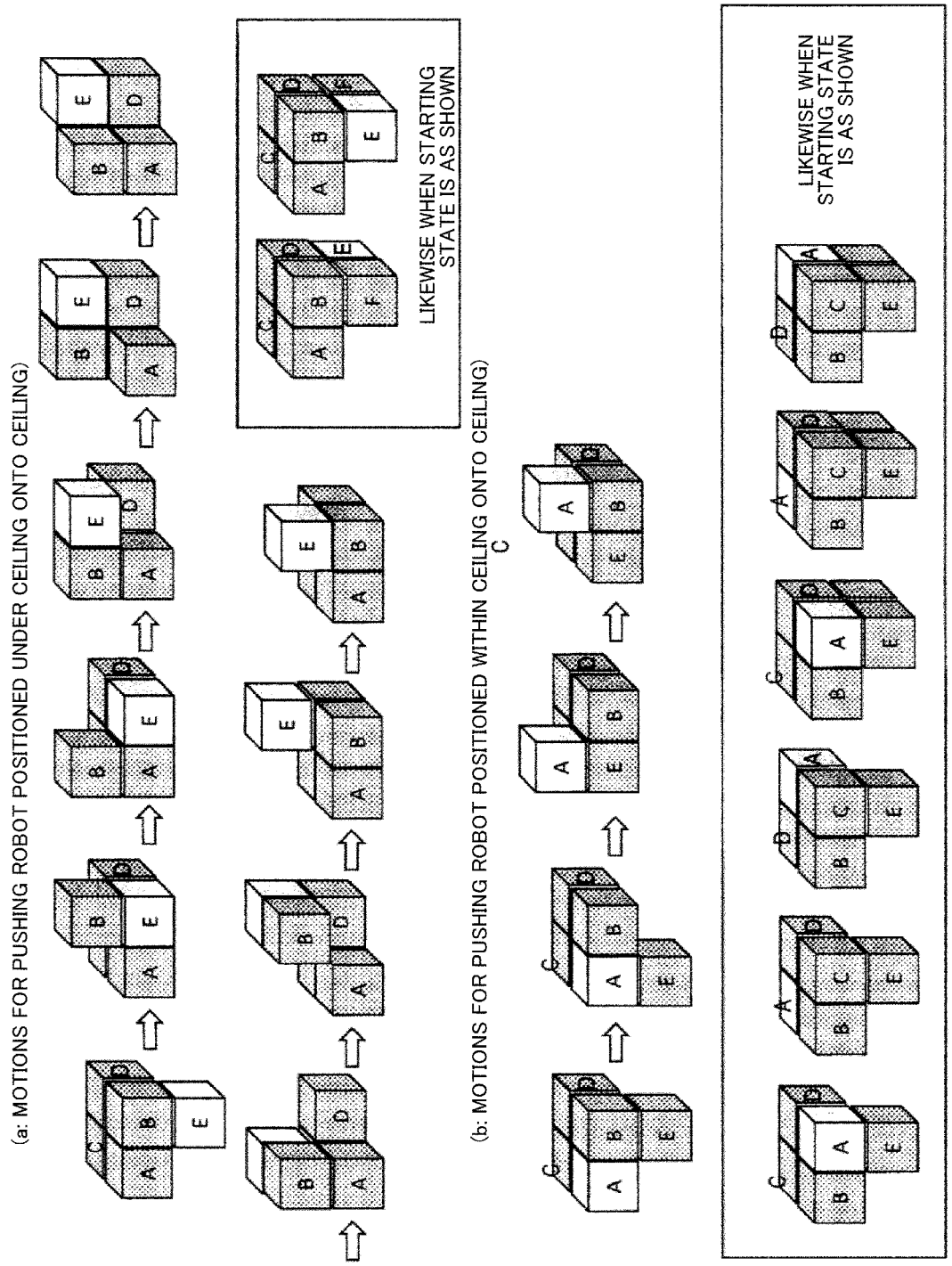
FIG. 9 is a view illustrating an example of motions performed in a process for moving a robot positioned under a ceiling of a square unit onto the ceiling during [Permutation] processing.

In the set of intermediate positions M2, the ceiling forms a rectangle in which the length of the sides in the XY plane is an even number (the length in either the X axis direction or the Y axis direction is a multiple of 4). Hence, the ceiling of the set of intermediate positions M2 is a 2×2 square set. If it is assumed that one robot climbs into the ceiling, the robot on the ceiling and an arbitrary robot within the set of intermediate positions M2 can be switched by operations such as those shown in FIGS. 10-15. Normally, the robots that can be moved from within the ceiling onto the ceiling are robots that are contacted by a robot in the Z axis negative direction within the ceiling, but the robots that have the Z coordinate value Zthresh in the set of intermediate positions M2 are arranged expandably such that one or two robots are disposed under the ceiling in each square unit. Therefore, by appropriately transforming the group of robots that have the Z coordinate value Zthresh in the set of intermediate positions M2, one or two robots can be set as robots (also referred to hereafter as foot robots) contacting the ceiling robots in each square unit. This state will be referred to as M2'. By performing the operation shown in FIG. 9 from the M2' state, at least one robot can be moved onto the ceiling from within each square unit.

Figure 16:
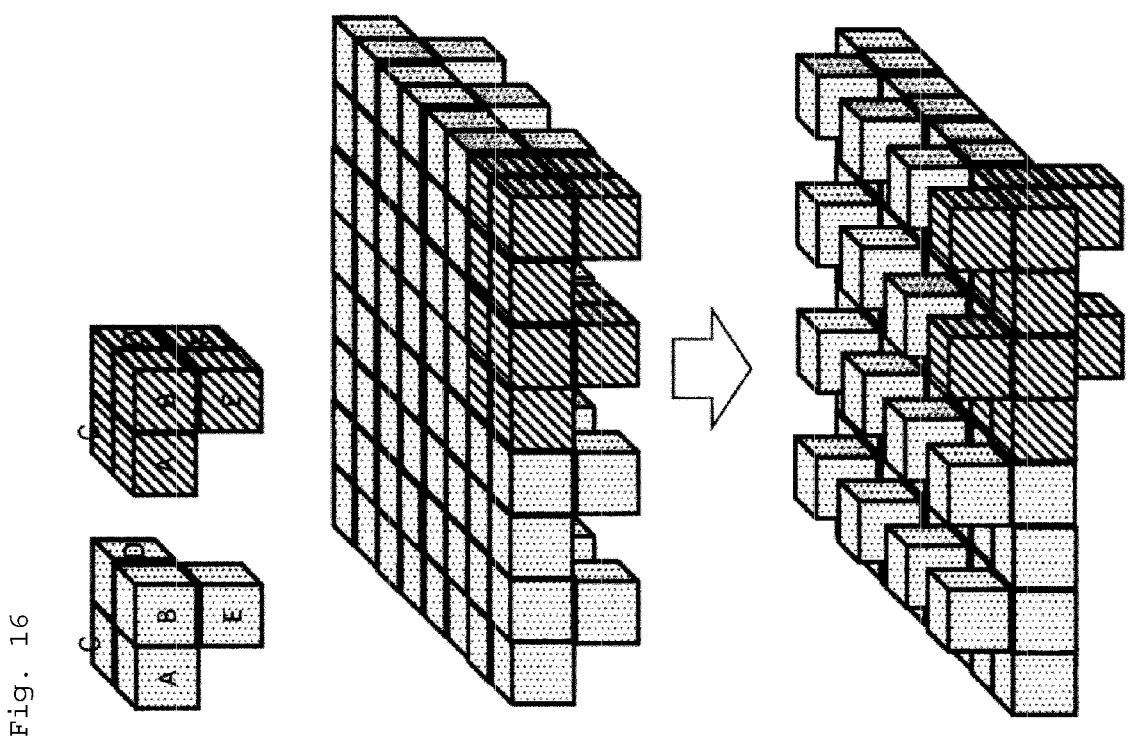
FIG. 16 is a view illustrating a process for pushing out a mobile robot from inside the ceiling onto the ceiling from each square unit during the [Permutation] processing, and a unicursal trajectory traced by the mobile robot.

Hence, in Transformation_M2_to_M2, first, an operation is performed to move one of the robots requiring position switching onto the ceiling from each square unit (see FIG. 16). As a result of this operation, a maximum of p/5 robots are placed on the ceiling. Note that when p is not a multiple of 5, square units having two foot robots exist in a number corresponding to the remainder of dividing p by 5. Here, the reason why a maximum is mentioned is that there may be cases where square units including only robots that do not require switching exist or cases where the square unit has 6 robots.

Thereafter, each of the robots on the ceiling is moved by parallel operations along a unicursal trajectory passing through all of the square units on the ceiling while passing through each square unit only once (FIG. 16) until the robots arrive at the square units including the respective target positions thereof. Then, when robots A', for example, on the ceiling arrive at a square unit K including the respective target positions thereof, an operation is performed to switch the robots A' with the robots in the square unit K so that the robots A' reach the target positions. Here, if a robot A that has not yet been moved to the target position exists in the square unit K, the robot A is pushed out onto the ceiling at the same time as being switched with the robot A'. Then, movement of the robot A over the ceiling to the square unit that includes the target position of the robot A is started. Conversely, when there are no robots that have not yet been moved to their target positions within the square unit K, the robot A' is stored in the target position within the square unit K, after which none of the robots in the square unit K are pushed out onto the ceiling. By performing this operation repeatedly, movement of all of the robots to their target positions is completed.

Note, however, that here, in a state where the robots A' have been switched with the robots in the square unit K and the robot A in the square unit K has been pushed out onto the ceiling, there must not be any voids in the ceiling of the square unit. If a void exists, a robot non-contact state may occur when one of the robots in the robot group moved over the ceiling passes over the square unit K. When considering this problem, it is necessary to take into consideration the following cases.

[Robot Switching Condition Branching]

---

If the robot A is in the target position of the robot A'. Then{
   If the robot A has not yet started movement toward the target position of the robot A. Then{
      If the robot A is a foot robot. Then{
         CASE 1
         → The robot A' and the robot A are switched, whereupon the robot A is pushed out onto the ceiling. (Fig. 11)
      ]
      Else{
         CASE 2
         → The robot A' and the robot A are switched, whereupon the robot A is pushed out onto the ceiling. (Fig. 10)
      }
   }
   Else{

-continued

Figure 10:
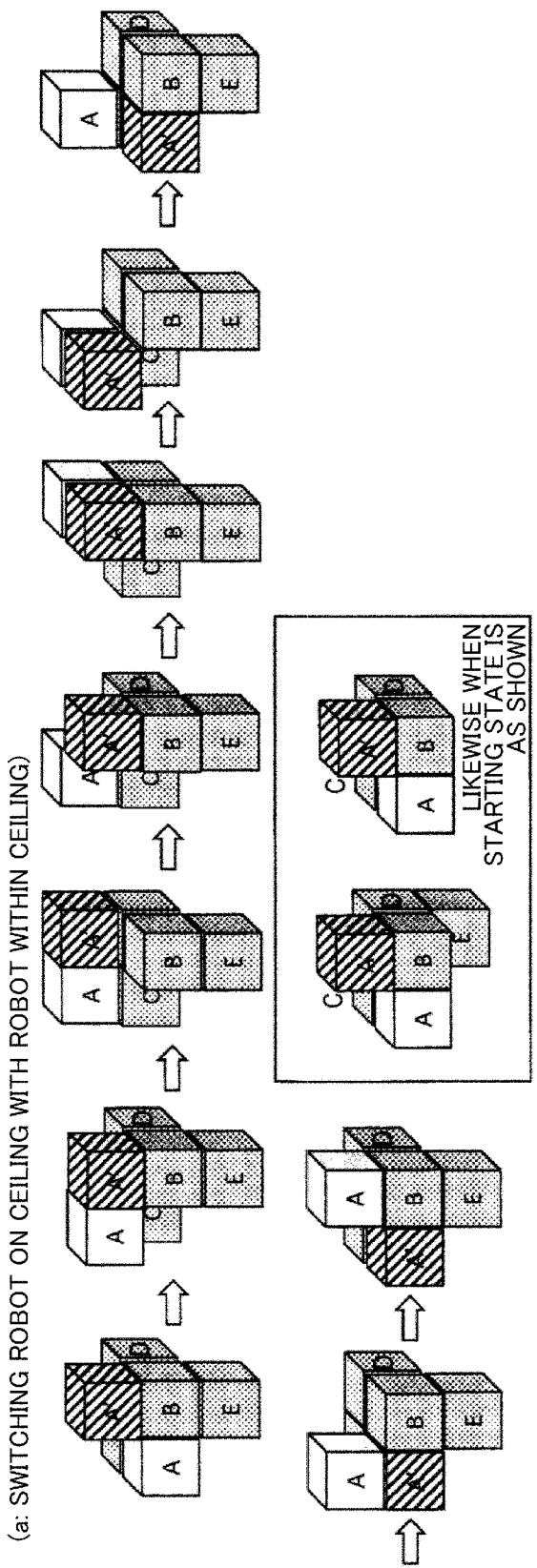
FIG. 10 is a view illustrating an example of motions performed in a process for switching a robot positioned in the ceiling of a square unit with a robot positioned on the ceiling during the [Permutation] processing.
Figure 11:
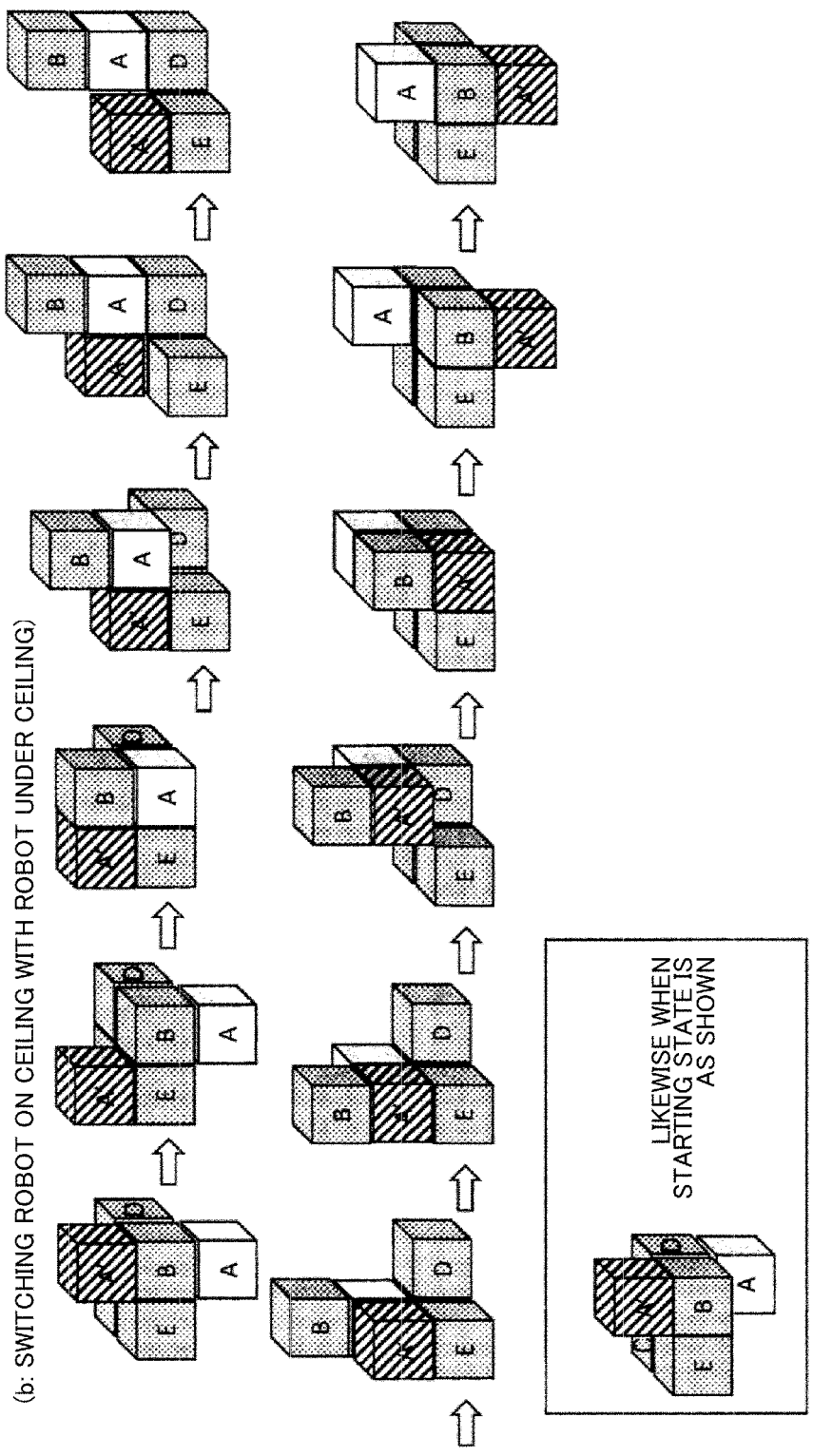
FIG. 11 is a view illustrating an example of motions performed in a process for switching a robot positioned under the ceiling of a square unit with a robot positioned on the ceiling during the [Permutation] processing.
Figure 12:
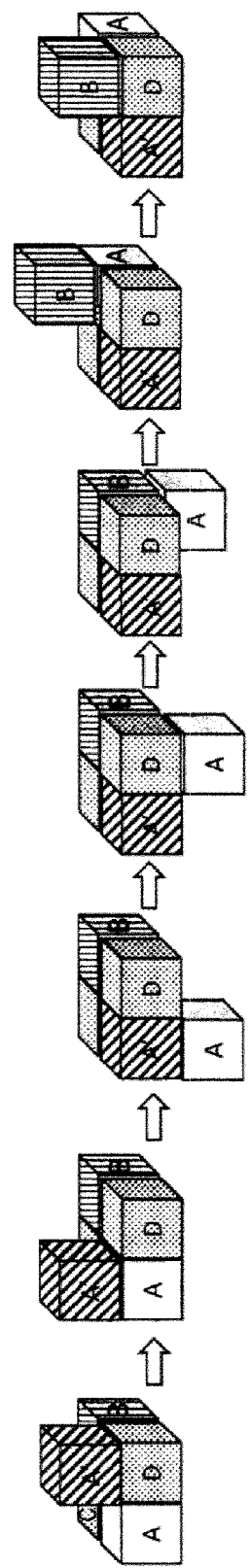
FIG. 12 is a view illustrating an example of motions performed in a process for switching a robot positioned in the ceiling of a square unit with a robot positioned on the ceiling during the [Permutation] processing.
Figure 13:
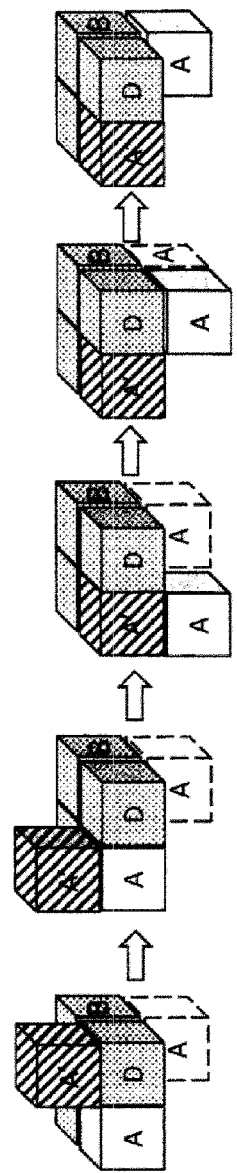
FIG. 13 is a view illustrating an example of motions performed in a process for inserting a robot positioned on the ceiling into the ceiling and pushing out a robot positioned in the ceiling under the ceiling during the [Permutation] processing.
Figure 14:
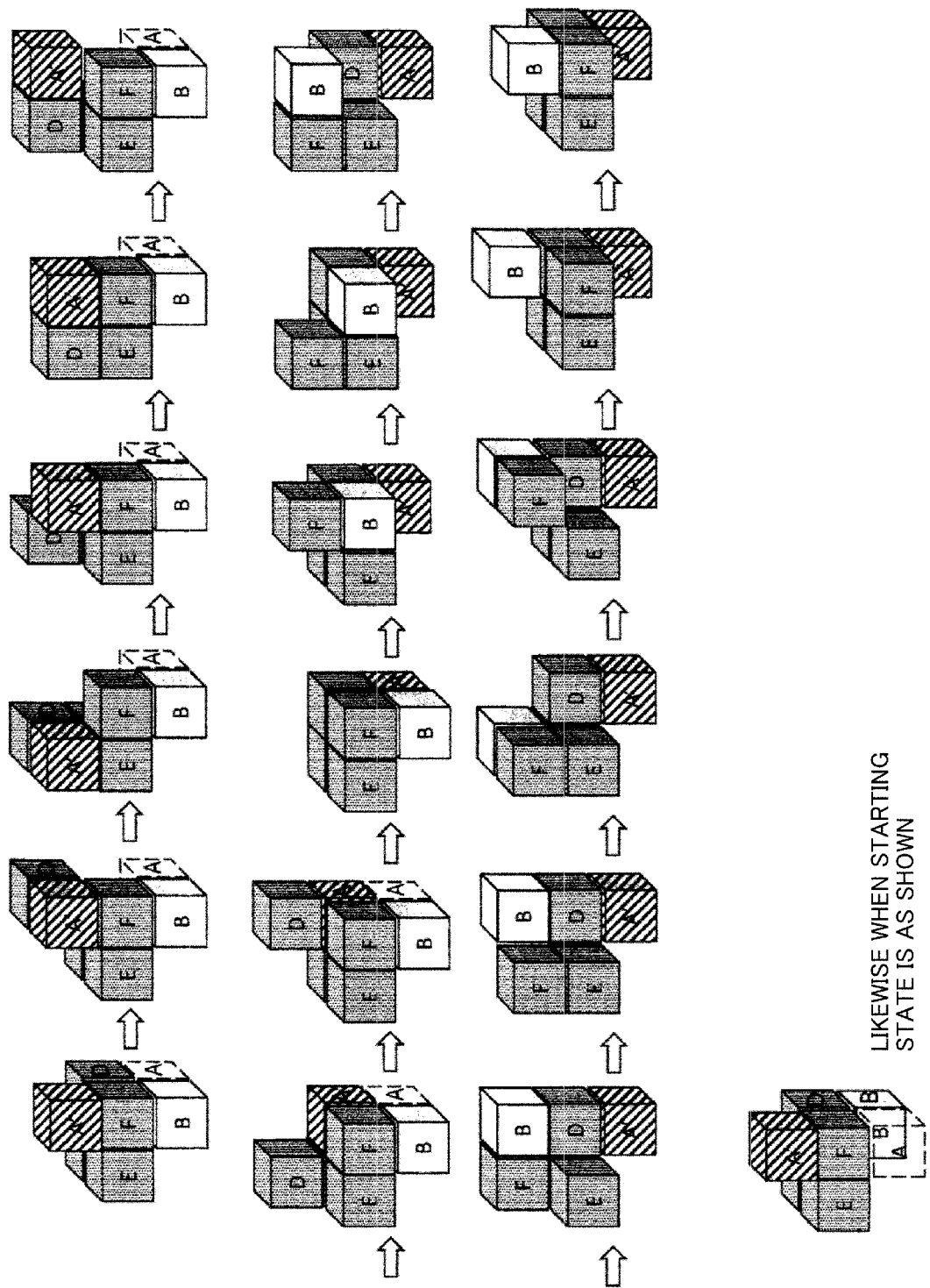
FIG. 14 is a view illustrating an example of motions performed in a process for moving a robot positioned on the ceiling of a square unit under the ceiling and moving a different robot positioned under the ceiling onto the ceiling during the [Permutation] processing.
Figure 15:
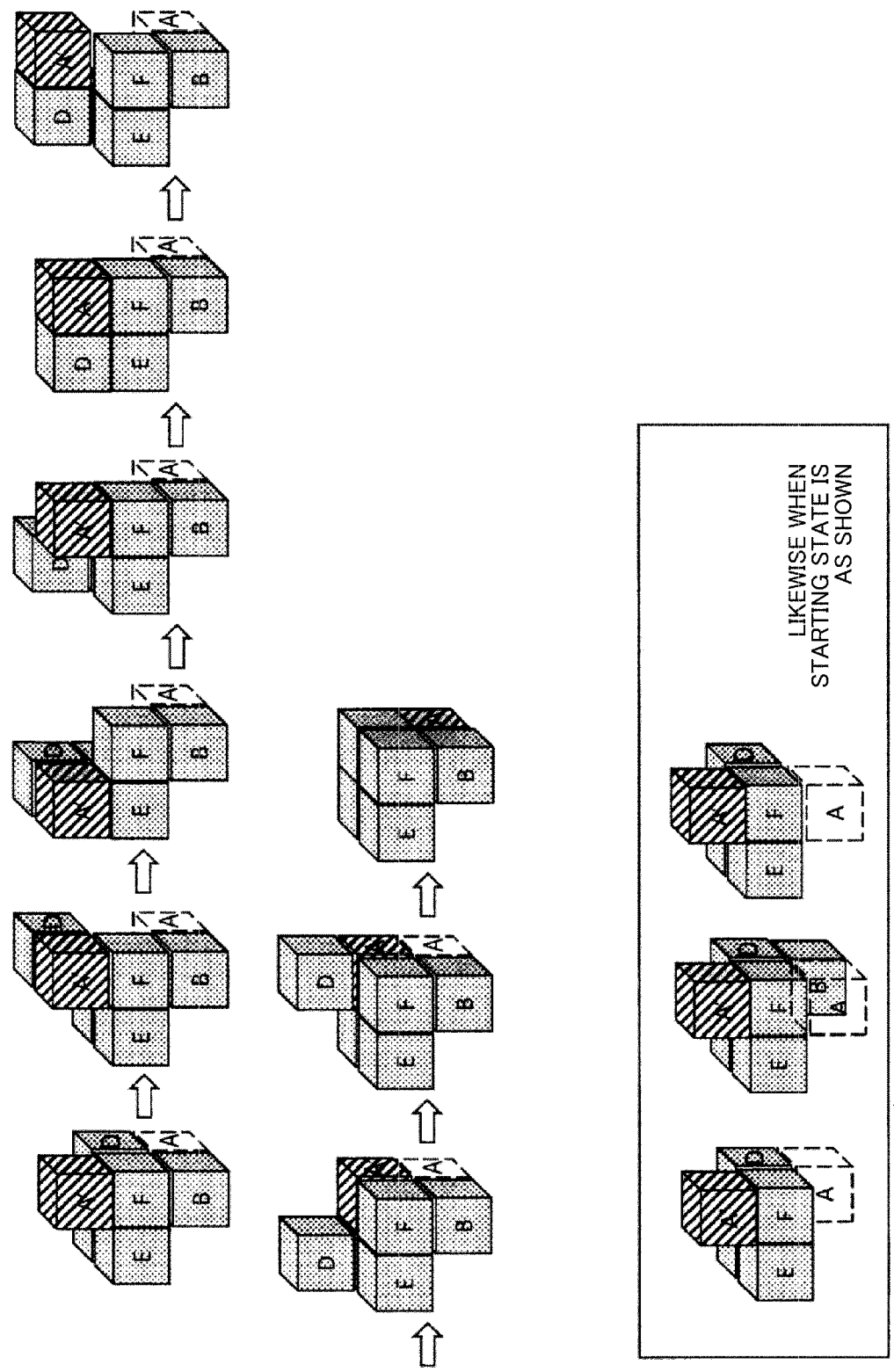
FIG. 15 is a view illustrating an example of motions performed in a process for inserting a robot positioned on the ceiling under the ceiling during the [Permutation] processing.

If a robot B that has not yet started movement toward the target position exists in the square unit K. Then{
   If a foot robots exists in the square unit K. Then{
      CASE 3
      → The robot A' is moved to the position of the robot A, the robot A and the robot B are switched, then the robot B is pushed out onto the ceiling.
        • When the robot A is a foot robot and the robot B is not a foot robot, Fig. 11 is executed, whereupon the operation shown in Fig. 10 for replacing A' with A and A with B is executed.
        • When the robot A is not a foot robot and the robot B is a foot robot, Fig. 10 is executed, whereupon the operation shown in Fig. 11 for replacing A' with A and A with B is executed.
        • When the robot A is not a foot robot and the robot B is also not a foot robot, Fig. 10 is executed, whereupon the operation shown in Fig. 10 for replacing A' with A and A with B is executed.
   }
   Else{
      CASE 4
      → The robot A' is moved to the position of the robot A, the robot A and the robot B are switched, then the robot B is pushed out onto the ceiling. (Fig. 12)
   }
}
Else{
   If a foot robot exists in the square unit K. Then{
      CASE 5
      → The robot A' is moved to the position of the robot A, then the robot A is moved to the target position of the robot A.
        • When the robot A is a foot robot, Fig. 11 is executed, whereupon the operation shown in Fig. 15 for replacing A' with A is executed.
        • When the robot A is not a foot robot, Fig. 10 is executed, whereupon the operation shown in Fig. 15 for replacing A' with A is executed.
   }
   Else{
      CASE 6
      → The robot A' is moved to the target position, whereupon the robot A is moved to the target position within the square unit K. (Fig. 13)
   }
}
}
Else{
   If a robot B that has not yet started movement toward the target position exists within the square unit K.
Then{
   If the robot B is a foot robot. Then{
      CASE 7
      → The robot A' is moved to the target position, whereupon the robot B is pushed out onto the ceiling. (Fig. 14)
   }
   Else{
      CASE 8
      → The robot A' and the robot B are switched, whereupon the robot B is pushed out onto the ceiling. The operation shown in Fig. 10 for switching A with B is executed.
   }
}
Else{
   CASE 8
   → The robot A' is moved to the target position. (Fig. 15)
}
}

---

By separating the above cases, it is possible to ensure that a void does not occur within a square unit constituting the ceiling as a result of the switching operation.

[Transformation_M2_to_M2]

(1) For all of the robots i, the variable perm[i] is set as perm[i]=0.

(2) For all of the robots i, if match[i]=i, perm[i]=1 is set. The variable perm[i] is a variable indicating whether or not the robot i is in the position where the robot i should be within the set of intermediate positions M2'. In this example, perm[i]=1 indicates that the robot i is in the position where the robot i should be, and perm[i]=0 indicates that the robot i is not in the position where the robot i should be and needs to be switched.
(3) [Extend_Foot] is executed.
(4) [Generate_Unicursal] is executed.
(5) [Permutation] is executed.
(6) [Compress_Foot] is executed.
[Permutation]
(1) In each square unit j, the robots in which perm[i]=0 are pushed out onto the ceiling by the operation shown in FIG. 9. Among the robots to be pushed out, robots within the ceiling are pushed out preferentially by an operation shown in FIG. 9(b). When there are no robots in which perm[i]=0 in the ceiling, a foot robot under the ceiling is pushed out by an operation shown in FIG. 9(a). Here, the robots i that have been pushed out onto the ceiling in the square units j are set as moving robots j, and a variable Navi_Robot[j] is set as Navi_Robot[j]←i. The motion histories of the robots performing motions at this time are stored in variables (motion_x_m2_$m2$[$t$][$i$], motion_y_m2_$m2$[$t$][$i$], motion_z_m2_$m2$[$t$][$i$]). The start time of the motion is set as t=t_extend+1, and the time at which the motion of the robot that takes the longest time to perform the motion is completed is set as t_push. Further, the maximum possible number of time steps within the robot motion time required to complete [Permutation] is set as t_max. Here, the positions of the robots i from the motion end time t_end[i] of each of the robots i that perform motions to the time t_max are set as the positions of the robots i at the time t_end[1]. In other words,
(t=t_end[i] to t_max)
(motion_x_m2_$m2$[$t$][$i$], motion_y_m2_$m2$[$t$][$i$], motion_z_m2_$m2$[$t$][$i$])(motion_x_m2_$m2$[$t$_end[i]][i], motion_y_m2_$m2$[$t$_end[i]][i], motion_z_m2_$m2$[$t$_end[i]][i])
(2) t_perm=t_push is set. (3) to (5) are then executed repeatedly until all of the values of the variable Navi_Robot[j] reach −1.
(3) In each square unit, a determination is made as to whether or not the target position of the moving robot j on the ceiling of each square unit is within the square unit. When the target position of the moving robot j is within the ceiling of the square unit on top of which the moving robot j is positioned, robot switching is performed in accordance with [Switching condition branching], whereupon perm [Navi_Robot[j]]←1 is set. Note that in [Switching condition branching], when the "robot B that has not yet started movement toward the target position" is a robot iB, it is assumed that perm[iB]=0. Next, a robot i' in which perm[i']=0 is pushed out from within the square unit onto the ceiling as a new moving robot j, whereupon the variable [Navi_Robot[j] is set at [Navi_Robot [j]←i'. When no robots are pushed out from within the square unit, the variable [Navi_Robot[j] is set at [Navi_Robot [j]←−1. The motions of all of the robots that perform motions at this time are stored in (motion_x_m2_$m2$[$t$][$i$], motion_y_m2_$m2$[$t$][$i$], motion_z_m2_$m2$[$t$][$i$]) of t=t_perm+1 to. The motion end time of each of the robots i that perform motions at this time is set as t_end[i]. The maximum value of t_end[i] at this time (the motion end time of the last robot to complete the motion) is set as t exchange. Here, the positions of the robots i that have performed motions from the motion end time t_end[i] of each of the robots i to the time t_max are set as the positions of the robots i at the time t_end[1]. In other words, (t=t_end[i]~t max) (motion_x_m2_$m2$[$t$][$i$], motion_y_m2_$m2$[$t$][$i$], motion_z_m2_$m2$[$t$][$i$])←(motion_x_m2_$m2$[$t$_end[i]][i], motion_y_m2_$m2$[$t$_end[i]][i], motion_z_m2_$m2$[$t$_end[i]][i])

(4) All of the moving robots on the ceiling (not the robots in which Navi_Robot[j] is −1) are moved two steps along a unicursal path (perm_path_x[(X_thresh−X)/2][(Y_thresh−Y)/2], perm_path_y[(X_thresh−X)/2][(Y_thresh−Y)/2]) calculated by [Generate_Unicursal]. Here, (X, Y) is set as the current position of each moving robot. The motions of all of the robots i performing motions at this time are completed in two steps, and the motions are stored in (motion_x_m2_$m2$[$t$][$i$], motion_y_m2_$m2$[$t$][$i$], motion_z_m2_$m2$[$t$][$i$]) of t=t_exchange+1 to t_exchange+2.

The positions of the robots i performing motions at this time from the motion end time t_exchange+2 of each of the robots i to the time t_max are set as the positions of the robots i at the time t_exchange+2. In other words,
(t=t_exchange+2~t_max)
(motion_x_m2_$m2$[$t$][$i$], motion_y_m2_$m2$[$t$][$i$], motion_z_m2_$m2$[$t$][$i$])←(motion_x_m2_$m2$[$t$_exchange+2][i], motion_y_m2_$m2$[$t$_exchange+2][i], motion_z_m2_$m2$[$t$_exchange+2][i])
(5) t_perm=t_exchange+2 is set.
[Modified Example of Permutation]
Note that when the switching process in the form of M2 progresses to a certain extent, the number of robots moving over the ceiling decreases. In this case, it is inefficient to move the robots moving over the ceiling one at a time along a unicursal trajectory to the square unit including the target position. Hence, section (4) of [Permutation] may be modified as follows.
(4) With respect to all of the moving robots on the ceiling (not the robots in which Navi_Robot [j] is −1), when, among the square units other than the square unit onto which the moving robot climbed in the previous step and adjacent to the square unit on which the moving robot has climbed, there is a square unit L to which no moving robot is to be moved in the next time step, the required time can be reduced by having the moving robot reach the square unit that includes the target position by tracing a unicursal trajectory from the square unit L rather than having the moving robot reach the square unit that includes the target position by tracing a unicursal trajectory from the current square unit. In this case, the moving robot performs a two-step shortcut in the direction of the square unit L. When this type of square unit L does not exist, all of the moving robots on the ceiling (not the robots in which Navi_Robot[j] is −1) are moved two steps along the unicursal path (perm_path_x[(X_thresh−X)/2][(Y_thresh−Y)/2], perm_path_y [(X_thresh−X)/2][(Y_thresh−Y)/2]) calculated by [Generate_Unicursal] (where (X, Y) denotes the current position of each moving robot). The motions of all of the robots i performing motions at this time are completed in two steps, and the motions are stored in (motion_x_m2_$m2$[$t$][$i$], motion_y_m2_$m2$[$t$][$i$], motion_z_m2_$m2$[$t$][$i$]) of t=t_exchange+1 to t_exchange+2.

The positions of the robots i performing motions at this time from the motion end time t_exchange+2 of each of the robots i to the time t_max are set as the positions of the robots i at the time t_exchange+2. In other words,
(t=t_exchange+2~t_max)
(motion_x_m2_$m2$[$t$][$i$], motion_y_m2_$m2$[$t$][$i$], motion_z_m2_$m2$[$t$][$i$])←(motion_x_m2_$m2$[$t$_exchange+2][i], motion_y_m2_*m*2[*t*_exchange+2][i],
motion_z_m2_*m*2[*t*_exchange+2][i])

[Extend_Foot]

(1) The robots under the ceiling are dispersed so that one or two remain within each square unit. For example, [Extension_Process] is executed on the robots in which z=Z_thresh. Here, when the length of the sides of the ceiling of M2 is set as Lx in the X direction and Ly in the Y direction, as an arrangement of robots under the ceiling of M2, under-ceiling robots within a range of (X_thresh>=X>X_thresh−Lx/2) and (Y_thresh>=Y>Y_thresh−Ly/2) are prioritized, and as for the remainder of dividing the total number of robots by the number of square units, the robots are disposed in positions where Y=Y_thresh−Ly/2 so as to contact the range of (X_thresh>=X>X_thresh−Lx/2) and (Y_thresh>=Y>Y_thresh−Ly/2). The robot target positions of the under-ceiling robots in positions (x, y, Z_thresh) within the range of (X_thresh>=X>X_thresh−Lx/2) and (Y_thresh>=Y>Y_thresh−Ly/2) are set as (X_thresh−2× (X_thresh−x), Y_thresh−2× (Y_thresh−y), Z_thresh), and when the positions of the robots disposed in positions where Y=Y thresh−Ly/2 so as to contact the range of (X_thresh>=X>X_thresh−Lx/2) and (Y_thresh>=Y>Y thresh−Ly/2) are set as (x, y, Z_thresh), the target positions thereof are set as (X_thresh−2× (X_thresh−x), Y_thresh−2× (Y_thresh−Ly/2)−1).

The motioned time is set as t extend. t_m2_*m*2←t extend is set. The motion histories of the robots performing motions at this time are stored in (motion_x_m2_*m*2[*t*][*i*], motion_y_m2_*m*2[*t*][*i*], motion_z_m2_*m*2[*t*][*i*]) of t=0 to t_extend. At this time, the positions of the robots i from the motion end time t_end[i] of each of the robots i to the time t_max are set as the positions of the robots i at the time t_end[i]. In other words,
(t=t_end[i]~t_max)
(motion_x_m2_*m*2[*t*][*i*], motion_y_m2_*m*2[*t*][*i*],
motion_z_m2_*m*2[*t*][*i*])←(motion_x_m2_*m*2[*t*_end[i]][i],
motion_y_m2_*m*2[*t*_end[i]][i], motion_z_m2_*m*2[*t*_end[i]][i])

[Generate Unicursal]

The following unicursal path is calculated.
(1) perm_path_x[0][0]←0, perm path y[0][0]←−1 is set.
(2) The M2 ceiling side length in the X direction is set as MIDDLE_X, and the M2 ceiling side length in the Y direction is set as MIDDLE_Y.
(3) For all of (x, y) (0<=x<MIDDLE_X/2, 0<=y<MIDDLE_Y/2),

```
if (x%2==0&&y<MIDDLE_Y-1&&y>0) {
    perm_path_x [x] [y] ←0
    perm_path_y [x] [y] ←-1
}
if (x%2==0&&y==MIDDLE_Y-1) {
    perm_path_x [x] [y] ←-1
    perm_path_y [x] [y] ←0
}
if (x>0&&y==0 ) {
    perm_path_x [x] [y] ←1
    perm_path_y [x] [y] ←0
}
if (x%2==1&&y>1&&x<MIDDLE_X-1) {
    perm_path_x [x] [y] ←0
    perm_path_y [x] [y] ←1
}
if (y>=1&&x==MIDDLE_X-1) {
    perm_path_x [x] [y] ←0
    perm_path_y [x] [y] ←1
}
```

-continued

```
if (x%2==1&&y==1&&x<MIDDLE_X-1) {
    perm_path_x [x] [y] ←-1
    perm_path_y [x] [y] ←0
}
``` is set.

[Compress_Foot]

The motions recorded in [Extend_Foot] are regenerated in reverse. More specifically, the motions of the robots i' in the positions (motion_x_m2_*m*2[*t*_extend][i], motion_y_m2_*m*2[*t*_extend][i], motion_z_m2_*m*2[*t*_extend][i]) are set as follows.
(t=t_perm+1~t_perm+1+t_extend)
(motion_x_m2_*m*2[*t*][i'], motion_y_m2_*m*2[*t*][i'],
motion_z_m2_*m*2[*t*][i'])←(motion_x_m2_*m*2[*t*_extend−(t−t_perm)][i],
motion_y_m2_*m*2[*t*_extend−(t−t_perm)][i],
motion_z_m2_*m*2[*t*_extend−(t−t_perm)][i])

At this time, the positions of the robots i' from the motion end time t end[i'] of each of the robots i' to the time t max are set as the positions of the robots i' at the time t_end[i']. In other words,
(t=t_end[i]~t_max)
(motion_x_m2_*m*2[*t*][i'], motion_y_m2_*m*2[*t*][i'],
motion_z_m2_*m*2[*t*][i'])←(motion_x_m2_*m*2[*t*_end[i']][i'],
motion_y_m2_*m*2[*t*_end[i']][i'], motion_z_m2_*m*2[*t*_end[i']][i'])

<Action Control Device 100 According to First Embodiment>

Figure 17:
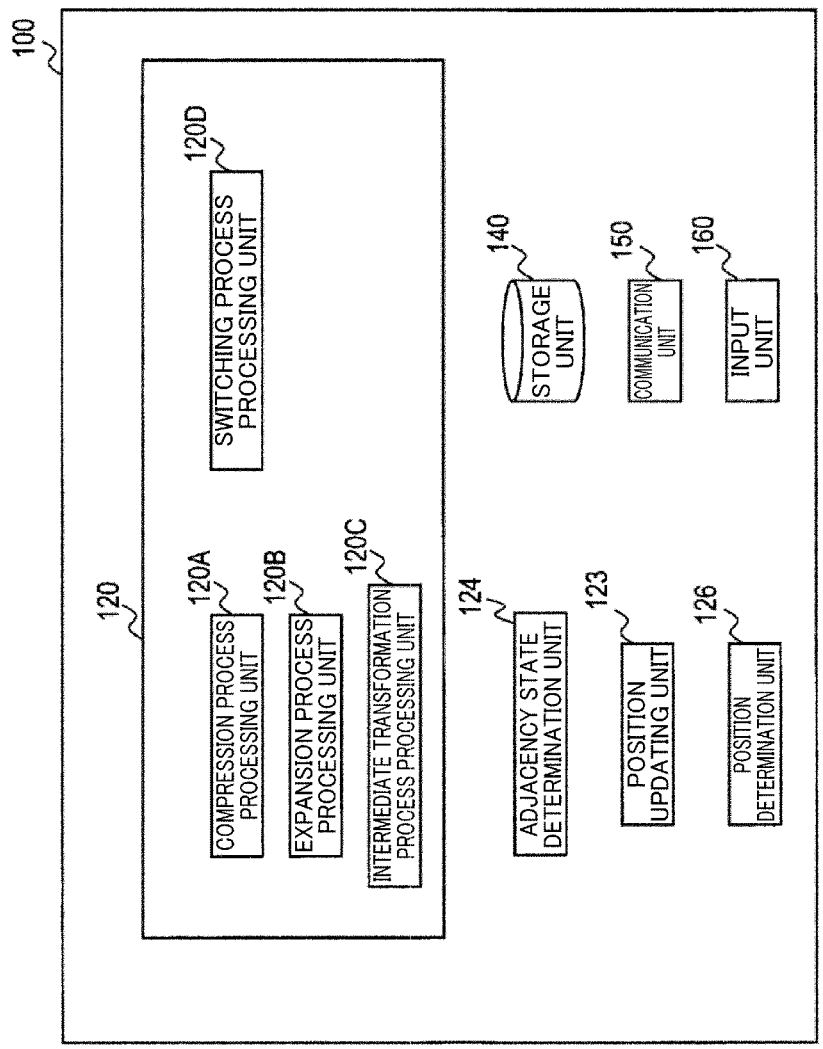
FIG. 17 is a function block diagram of an action control device according to a first embodiment.
Figure 18:
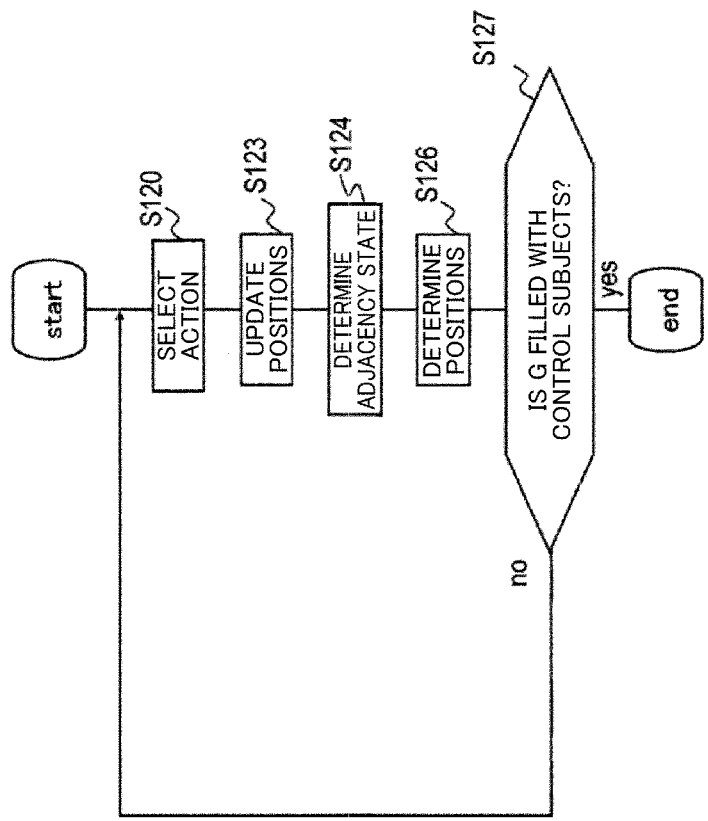
FIG. 18 is a view showing an example of a processing flow of the action control device according to the first embodiment.

FIG. 17 is a function block diagram of an action control device 100 according to a first embodiment, and FIG. 18 shows an example of a processing flow thereof. As shown in FIG. 17, the action control device 100 includes an action selection unit 120, an adjacency state determination unit 124, a position updating unit 123, a position determination unit 126, a storage unit 140, a communication unit 150, and an input unit 160. The action selection unit 120 includes a compression process processing unit 120A, an expansion process processing unit 120B, an intermediate transformation process processing unit 120C, and a switching process processing unit 120D.

A case in which the control subject to be subjected to control is a robot will be described below as an example. Needless to mention, the control subject is not limited to a robot and may be any object that can be subjected to control.

In this embodiment, the action control device 100 controls the actions of p robots and is mounted on one of the p robots. Note that the p−1 robots on which the action control device 100 is not mounted are also provided with the communication unit 150 and the adjacency state determination unit 124.

<Input Unit 160>

Values (Zmax[2], _y_num[2][_x][_z], _x_num[2][_y][_z]) of variables expressing the shape of the intermediate positions M2 and the respective starting positions of the p robots i, or in other words a set of p starting positions S={(Xrs[0], Yrs[0], Zrs[0]), (Xrs[1], Yrs[1], Zrs[1]), ..., (Xrs[p−1], Yrs[p−1], Zrs[p−1])} and a set of p target positions G={(Xrg[0], Yrg[0], Zrg[0]), (Xrg[1], Yrg[1], Zrg[1]), ..., (Xrg[p−1], Yrg[p−1], Zrg[p−1])}, are input into the input unit 160 and stored in the storage unit 140. Note that in the set of starting positions and the set of target positions, the position of each robot i within the respective sets of positions is specified. In the set of intermediate positions M2, on the other hand, the position of each robot i within the set of intermediate positions M2 is not specified at this time.

The shape and arrangement of the set of intermediate positions M2 are specified and input.

<Communication Unit 150>

All of the robots, including the robot on which the action control device 100 is mounted, are capable of communicating with other robots adjacent thereto in the upward, downward, leftward, rightward, frontward, and rearward directions (also referred to hereafter as the "six directions") of the three-dimensional space via the communication unit 150.

<Action Selection Unit 120>

The action selection unit 120 controls the p robots using the method described above (s120). Note that in the compression process processing unit 120A, the expansion process processing unit 120B, the intermediate transformation process processing unit 120C, and the switching process processing unit 120D, the motion sequences and directions of the robots are calculated in advance before the start of the robot motions and stored in the storage unit 140. Note that processing for transforming a rank so that robots or virtual robots positioned in the set of starting positions S are positioned in the set of target positions G corresponds to processing for transforming the set of starting positions S into the set of target positions G, while processing for moving robots, processing for moving virtual robots, and processing for moving (starting, target, or intermediate) positions correspond to identical processing. Further, since it is possible, with the method described above, to specify the positions of the robots at each time, the motions and directions of the robots can be calculated from the difference between the position of each of the robots at the time t and the position of the robot at a time t−1. The action selection unit 120 extracts the motion of each robot at each time from the storage unit 140 and transmits a control signal indicating the movement direction to the robot to be moved at each time, whereupon the robot performs a motion corresponding to the control signal.

(Compression Process Processing Unit 120A)

The compression process processing unit 120A envisages a first virtual plane that is perpendicular to the X axis and fixed in a position of X=Xthresh+1, and a second virtual plane on which movement is performed in the X axis positive direction from infinity in the X axis negative direction, and pushes the positions abutting the second virtual plane (positions included or positions not included in the set of starting positions S), thereby compressing the positions such that none of the positions exceeds the first virtual plane and such that the X coordinate values thereof remain at or below Xthresh. For example, in order from a position that abuts the second virtual plane, has a small X coordinate value, and is included in the set of starting positions S, when this position is adjacent to a position that is included in the set of starting positions S and has a large X coordinate value in the X axis positive direction, the position and the position adjacent thereto are moved (compressed) together in parallel in the X axis positive direction. Note that when a position being pushed by the second virtual plane is unable to move due to already being supported by the first virtual plane (due to having reached the first virtual plane), support by the first virtual plane is prioritized in relation to this position (not exceeding the first virtual plane is prioritized).

The compression process processing unit 120A envisages a third virtual plane that is perpendicular to the Y axis and fixed in a position of Y=Ythresh+1, and a fourth virtual plane on which movement is performed in the Y axis positive direction from infinity in the Y axis negative direction, and pushes the positions abutting the fourth virtual plane, among the set of positions compressed using the first and second virtual planes, as described above, thereby compressing the positions such that none of the positions exceeds the third virtual plane and such that the Y coordinate values thereof remain at or below Ythresh. For example, in order from a position that abuts the fourth virtual plane, has a small Y coordinate value, and is included in the set of starting positions S, when this position is adjacent to a position that is included in the set of starting positions S and has a large Y coordinate value in the Y axis positive direction, the position and the position adjacent thereto are moved (compressed) together in parallel in the Y axis positive direction. Note that when a position being pushed by the fourth virtual plane is unable to move due to already being supported by the third virtual plane (due to having reached the third virtual plane), support by the third virtual plane is prioritized in relation to this position (not exceeding the third virtual plane is prioritized).

By extracting the set of p starting positions S and executing [Compression_Process] as described above, the compression process processing unit 120A of the action selection unit 120 can compress the set of starting positions S into the set of intermediate positions M1.

(Expansion Process Processing Unit 120B)

The expansion process processing unit 120B envisages a first virtual plane that is perpendicular to the X axis and fixed in a position of X=Xthresh+1, and a second virtual plane on which movement is performed in the X axis positive direction from infinity in the X axis negative direction. The expansion process processing unit 120B then pushes the positions abutting the second virtual plane (positions included or positions not included in the set of target positions G), thereby compressing the positions such that none of the positions exceeds the first virtual plane and such that the X coordinate values thereof remain at or below Xthresh. For example, in order from a position that abuts the second virtual plane, has a small X coordinate value, and is included in the set of target positions G, when this position is adjacent to a position that is included in the set of target positions G and has a large X coordinate value in the X axis positive direction, the position and the position adjacent thereto are moved (compressed) together in parallel in the X axis positive direction. Note that when a position being pushed by the second virtual plane is unable to move due to already being supported by the first virtual plane (due to having reached the first virtual plane), support by the first virtual plane is prioritized in relation to this position (not exceeding the first virtual plane is prioritized).

The expansion process processing unit 120B envisages a third virtual plane that is perpendicular to the Y axis and fixed in a position of Y=Ythresh+1, and a fourth virtual plane on which movement is performed in the Y axis positive direction from infinity in the Y axis negative direction, and pushes the positions abutting the fourth virtual plane, among the set of positions compressed using the first and second virtual planes, as described above, thereby compressing the positions such that none of the positions exceeds the third virtual plane and such that the Y coordinate values thereof remain at or below Ythresh. For example, in order from a position that abuts the fourth virtual plane, has a small Y coordinate value, and is included in the set of target positions G, when this position is adjacent to a position that is included in the set of target positions G and has a large Y coordinate value in the Y axis positive direction, the position and the position adjacent thereto are moved (compressed) together in parallel in the Y axis positive direction. Note that when a position being pushed by the fourth virtual plane is unable to move due to already being supported by the third virtual plane (due to having reached the third virtual plane), support by the third virtual plane is prioritized in relation to this position (not exceeding the third virtual plane is prioritized).

By performing the processing described above, the expansion process processing unit 120B can compress the set of target positions G and determine the set of intermediate positions M3. Hence, by moving the positions in the opposite direction to the movement direction used when determining the set of intermediate positions M3 from the set of target positions G in the opposite order to the order used when determining the set of intermediate positions M3 from the set of target positions G, the set of intermediate positions M3 can be expanded into the set of target positions G.

By extracting the set of p target positions G and executing [Extension Process] as described above, the expansion process processing unit 120B of the action selection unit 120 can expand the set of intermediate positions M3 into the set of target positions G.

(Intermediate Transformation Process Processing Unit 120C)

The intermediate transformation process processing unit 120C receives the set of intermediate positions M1 and the set of intermediate positions M3 and calculates a process for transforming the set of intermediate positions M1 into the set of intermediate positions M3. Here, in the case of homogeneous rank transformation, the set of intermediate positions M1 is transformed into the set of intermediate positions M3 without passing through the set of intermediate positions M2. In the case of heterogeneous rank transformation, on the other hand, the intermediate transformation process processing unit 120C calculates a process for transforming the set of intermediate positions M1 into the set of intermediate positions M2 and a process for transforming the set of intermediate positions M2 into the set of intermediate positions M3. Here, the sets of intermediate positions M1 and M3 have shapes satisfying the following conditions (1)-(6), while M2 has a shape satisfying the following conditions (1)-(8).

(1) The X coordinate of all of the robots takes a value no larger than a certain constant value Xthresh.
(2) The Y coordinate of all of the robots takes a value no larger than a certain constant value Ythresh.
(3) The Z coordinate of all of the robots takes a value no smaller than a certain constant value Zthresh.
(4) All of the robots in which the X coordinate value is not Xthresh are contacted by a robot in the X axis positive direction.
(5) All of the robots in which the Y coordinate value is not Ythresh are contacted by a robot in the Y axis positive direction.
(6) All of the robots in which the Z coordinate value is not Zthresh, the X coordinate value is Xthresh, and the Y coordinate value is Ythresh are contacted by a robot in the Z axis negative direction.
(7) The robots having the maximum Z coordinate value form a rectangle in the X, Y plane in which, as a whole, the length is a multiple of 4 in either the X axis direction or the Y axis direction and an even number no smaller than 4 in the other of the X axis direction and the Y axis direction.
(8) The robots not having the maximum Z coordinate value each contact a square unit of the rectangle in the X, Y plane, and when a state in which the number thereof in each square unit is 1 or 2 is set as M2', M2 denotes a state in which M2' has been compressed in the X and Y directions.

The set of intermediate positions M2 may take any shape that satisfies these conditions, and the respective positions may be either input by a user or calculated by the action control device 100 on the basis of the set of starting positions S and the set of target positions G.

The intermediate transformation process processing unit 120C receives the set of intermediate positions M1, and by executing the processing of Transform_from_M1_to_M2 described above, the intermediate transformation process processing unit 120C can transform the set of intermediate positions M1 into the set of intermediate positions M2. For example, the intermediate transformation process processing unit 120C performs the following processing.

The intermediate transformation process processing unit 120C selects two positions to serve as seed positions from the positions in the set of intermediate positions M1 and moves the two positions to standby positions (Xthresh, Ythresh+1, Zthresh), (Xthresh+1, Ythresh, Zthresh) of the seed positions. The intermediate transformation process processing unit 120C can select the seed positions and move the seed positions to the standby positions by executing the processing of Seed_Generation, described above, on the basis of the set of intermediate positions M1 calculated by the compression process processing unit 120A. Note that although in this embodiment, the standby positions of the seed positions are set at (Xthresh, Ythresh+1, Zthresh), (Xthresh+1, Ythresh, Zthresh), as long as the standby positions of the two seed positions have the same Z coordinate value, Z coordinate values other than Zthresh may be set as the standby positions.

The intermediate transformation process processing unit 120C deconstructs the set of intermediate positions M1 (not including the seed robots) into the floor part, the flag part, and the pole part in that order, then constructs the set of intermediate positions M2 (not including the seed robots) in order of the pole part, the flag part, and the floor part. Note that deconstruction and construction of the pole part is performed using the seed robots described above. Also note that:

Pole part (Pole): A part constituted by the robots in the positions Xr[i]=Xthresh and Yr[i]=Ythresh.
Flag part (Flag): A part constituted by the robots in the positions Xr[i]=Xthresh and Yr[i] !=Ythresh.
Floor part (Floor): All of the other parts not belonging to the pole part and the flag part.

The intermediate transformation process processing unit 120C constructs the pole part, flag part, and floor part of the set of intermediate positions M2 from the set of intermediate positions M1 by executing Middle_Transform, described above.

The intermediate transformation process processing unit 120C incorporates the seed robots into the set of intermediate positions M2 not including the seed robots. The intermediate transformation process processing unit 120C incorporates the seed robots into the set of intermediate positions M2 by executing Seed_UnGeneration, described above.

The intermediate transformation process processing unit 120C can calculate a process for transforming the set of intermediate positions M2 into the set of intermediate positions M3 by executing Transform_from_M2_to_M3 in a similar manner.

(Switching Process Processing Unit 120D)

The switching process processing unit 120D acquires, from the intermediate transformation process processing unit 120C, the positions of the robots i in the set of intermediate positions M3 following transformation of the set of target positions G into the set of intermediate positions M2 through the set of intermediate positions M3. For example, the switching process processing unit 120D can acquire a process for transforming the set of target positions G into the set of intermediate positions M3 by executing [Extension_Process], described above, so as to move the positions in opposite directions and in the reverse order to the process for expanding the set of intermediate positions M3 into the set of target positions G.

The switching process processing unit 120D also acquires, from the intermediate transformation process processing unit 120C, the positions of the robots i in the set of intermediate positions M3 following transformation of the set of starting positions S into the set of intermediate positions M2 through the set of intermediate positions M1 and further transformation into the set of intermediate positions M3.

The switching process processing unit 120D then uses the values of the acquired positions to calculate correspondence relationships between the robot positions in order to move the robots i from the positions of the robots i in the set of intermediate positions M2 following transformation of the set of starting positions S into the set of intermediate positions M2 to the positions of the robots i in the set of intermediate positions M2 following transformation of the set of target positions G into the set of intermediate positions M2.

The switching process processing unit 120D acquires the robot positions for moving the robots i from the positions of the robots i in the set of intermediate positions M2 following transformation of the set of starting positions S into the set of intermediate positions M2 to the positions of the robots i in the set of intermediate positions M2 following transformation of the set of target positions G into the set of intermediate positions M2 by executing the processing of Transform_from_M2_to_M2. Note that in the processing of Transform_from_M2_to_M2, the switching process processing unit 120D determines, on the basis of the correspondence relationship calculation results, whether or not it is necessary to switch the robots constituting each of the square units or the robots that are adjacent to the square units and have a coordinate value below the maximum in the Z positive direction with other square units. In this embodiment, it is determined to be necessary to switch a robot i that corresponds to perm[i]=0 from the square unit in which the robot is positioned or the square unit to which the robot is adjacent to another square unit. Further, the switching process processing unit 120D moves one robot that requires switching over the ceiling for each square unit so as to move a plurality of robots corresponding to the plurality of square units simultaneously.

<Position Updating Unit 123>

The position updating unit 123 calculates, for each of i=0, 1, . . . , p−1, the position (Xr'[i], Yr'[i], Zr'[i]) following movement (following an action) of an i-th robot in a case where the action determined by the action selection unit 120 is executed in the current position (Xr[i], Yr[i], Zr[i]) of the i-th robot, and updates the position of the i-th robot, which is stored in the storage unit 140, with the calculated position (Xr'[i], Yr'[i], Zr'[i]) (S123). In other words, the position updating unit 123 calculates, on the basis of the action determined by the action selection unit 120, the position (also referred to hereafter as the "envisaged position") envisaged in a case where the robot performs the action, updates the position of the robot, and stores the updated position in the storage unit 140.

<Adjacency State Determination Unit 124>

The adjacency state determination unit 124 determines whether or not another robot exists in an adjacent position above, below, to the left, or to the right of a robot on a two-dimensional plane (S124) and stores the determination result in the storage unit 140.

As noted above, the p−1 robots on which the action control device 100 is not mounted also include the communication unit 150 and the adjacency state determination unit 124. Therefore, each robot i can determine, in the adjacency state determination unit 124, whether or not another robot exists in the upward, downward, leftward, or rightward direction of the robot i itself and output the determination result to the action control device 100 through the communication unit 150. The action control device 100 receives the determination result from each robot i through the communication unit 150 and stores the determination results in the storage unit 140 together with the determination results of the adjacency state determination unit 124 provided in the action control device 100. Note that in the p robots, another robot invariably exists in a position (the six directions) adjacent to each robot, and since a group of adjacent robots forms a block, each robot i can transmit p−1 determination results to the action control device 100 either directly or via another robot through the communication unit 150. Furthermore, the action control device 100 can transmit a control signal to each robot i either directly or via another robot through the communication unit 150 in order to cause the robot i to execute the selected action. Other information can also be exchanged between the p robots.

Note that even when the robots are controlled to move, it may not always be possible to move the robots in accordance with the control of the action selection unit 120 due to trouble of some type (device failure or the like). However, the positions of the robots that do not move stay the same as before the control. Therefore, by performing control so that at least one robot does not move, the positions (also referred to hereafter as "post-action positions") (Xr"[i], Yr"[i], Zr"[i]) of the robots that are controlled to move following the actual action can be determined on the basis of the position of the robot that does not move using the determination results acquired by the adjacency state determination unit 124. Moreover, by providing at least one of the robots with a GPS, the post-movement positions can be determined in a similar manner using the robot provided with the GPS as a reference.

<Position Determination Unit 126>

The position determination unit 126 uses the determination results acquired by the adjacency state determination unit 124 to determine the post-action positions, and determines whether or not the post-action positions (Xr"[i], Yr"[i], Zr"[i]) match the envisaged positions (Xr'[i], Yr'[i], Zr'[i]) (S126). Note that when the positions do not match, it is considered probable that the robots that were controlled to move could not move in accordance with the control due to trouble of some type. In this case, the post-action positions (Xr"[i], Yr"[i], Zr"[i]) and/or the envisaged positions (Xr'[i], Yr'[i], Zr'[i]) may be corrected. Various methods may be used as a correction method. For example, the post-action positions (Xr"[i], Yr"[i], Zr"[i]) may be corrected by instructing all of the robots to be moved to return to the pre-control positions, or the envisaged positions (Xr'[i], Yr'[i], Zr'[i]) may be corrected together with the post-action positions (Xr"[i], Yr"[i], Zr"[i]).

In each time step, a determination is made as to whether or not all of the set of target positions G are filled by robots (S127). When the positions are filled, the task is terminated, and if not, the task is continued.

For example, in a target position arrival determination unit, not shown in the figures, a determination is made for each of i=0, 1, . . . , p−1 as to whether or not all of the set of target positions G are filled by robots as a result of the post-action positions (Xr"[i], Yr"[i], Zr"[i]) output from the position determination unit 126, and when the positions are filled, the task is terminated. When at least one target position is not filled by a robot, the action selection unit 120 is controlled to execute the task again.

The processing of S120-S127, described above, is performed in each time step.

<Results>

According to this configuration, it is possible to realize rank control based on the premise that when a control subject moves, the control subject does not move around another control subject, and instead, the control subjects move while remaining in a connected state, and as a result, it is possible, without the need for complicated mechanisms, to perform a high-speed transformation operation from a rank formation state in which the control subjects are in arbitrary starting positions to a rank formation state in which the control subjects are in different arbitrary target positions while maintaining the control subjects in a state of mutual contact.

MODIFIED EXAMPLES

In this embodiment, each cell (square) is a rectangular parallelepiped, but another shape may be used. The cells are arranged continuously in a left-right direction, an up-down direction, and a front-rear direction. Further, each cell is adjacent to two other cells in the left-right direction, adjacent to two other cells in the up-down direction, and adjacent to two other cells in the front-rear direction. In other words, each cell is adjacent to another cell only in the same directions as the directions in which the robots can move. As long as this condition is satisfied, the cells may take any shape. Moreover, "orthogonal" does not have to mean precisely "intersecting perpendicularly", and instead, for example, the cells may be parallelepipeds so that one of the directions in which each cell is adjacent to two other cells is set as the up-down direction and the other is set as the left-right direction, and the direction that is not parallel to a plane constituted by the up-down direction and the left-right direction is set as the front-rear direction.

To put it another way, the control subjects are capable of moving on a three-dimensional space in a first direction (the rightward direction, for example), a second direction (the upward direction, for example) that is not parallel to the first direction, a third direction (the leftward direction, for example), which is the opposite direction to the first direction, a fourth direction (the downward direction, for example), which is the opposite direction to the second direction, a fifth direction (the frontward direction, for example) that is not parallel to a plane formed by the first direction and the second direction, and a sixth direction, which is the opposite direction to the fifth direction, and by a single action control operation, the control subjects are controlled to move from the current region (cell, square) to any adjacent region to the current region in the first direction, second direction, third direction, fourth direction, fifth direction, or sixth direction. Furthermore, in this case, an adjacent position in the first direction on the three-dimensional plane of the robots may be referred to as a first position, an adjacent position in the second direction may be referred to as a second position, an adjacent position in the third direction may be referred to as a third position, an adjacent position in the fourth direction may be referred to as a fourth position, an adjacent position in the fifth direction may be referred to as a fifth position, and an adjacent position in the sixth direction may be referred to as a sixth position.

In this embodiment, an example in which the action control device 100 is mounted on one of the p robots was described, but action control may also be performed on control subjects on a computer. In this case, as long as trouble is not caused intentionally, the control subjects move as controlled, and therefore the envisaged positions (Xr'[i], Yr'[i], Zr'[i]) and the post-movement positions (Xr"[i], Yr"[i], Zr"[i]) match. In this state, an ideal action plan may be created for each control subject i. Actual robots are caused to execute the action plans until the task acquired as a result is completed. Each actual robot includes the communication unit 150 and the adjacency state determination unit 124, and once each action is finished, the actual robot determines the adjacency state, uses the determination result to determine the post-action position, and determines whether or not the post-action position (Xr"[i], Yr"[i], Zr"[i]) and the envisaged position (Xr'[i], Yr'[i], Zr'[i]) match. Note that when the positions do not match, it is considered probable that the robots that were controlled to move could not move in accordance with the control due to trouble of some type. As regards the processing executed thereafter, similar processing to the first embodiment or other processing may be performed. As a result of this configuration, it is possible to detect at least that movement could not be performed in accordance with the control.

In this embodiment, position determination is performed once in relation to a single action control operation, but when a plurality of robots are moved during a single action control operation, position determination may be performed each time each of the robots moves.

Further, in this embodiment, the position to be taken by each robot in the set of starting positions S and the set of target positions G is determined for each robot, but the position to be taken by each robot does not have to be determined. In this case, Transformation_from_S_to_G_Homo may be executed and the robots may be controlled on the basis of (transform_S_to_G_x[t][i], transform_S_to_G_y[t][i], transform_S_to_G_z[t][i]) acquired as a result.

In this embodiment, the square unit is constituted by 2×2=4 robots, but the square unit may be constituted by M×N robots. Note that M and N are respectively integers no smaller than 2.

OTHER MODIFIED EXAMPLES

The present invention is not limited to the embodiment and modified examples described above. For example, the various types of processing described above are not limited to being executed in time series, as described, and may also be executed in parallel or individually in accordance with the processing capacity of the device that executes the processing or as required. The present invention may also be subjected to various other appropriate modifications within a scope that does not depart from the spirit thereof.

<Program and Recording Medium>

Figure 19:
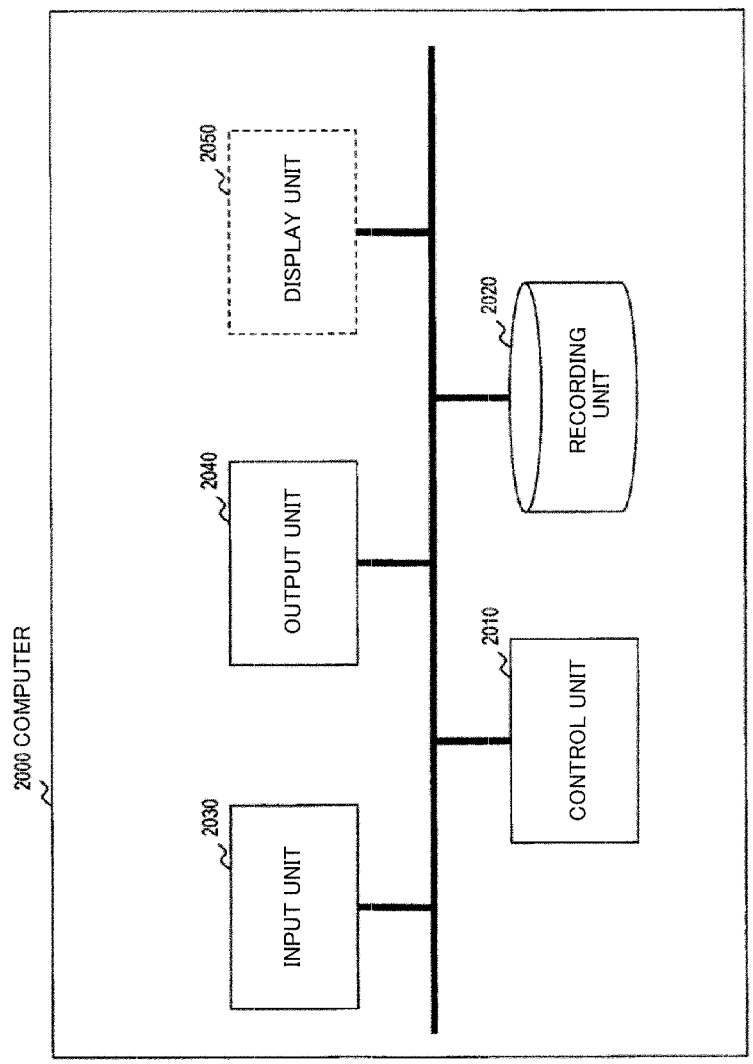
FIG. 19 is a view showing an example configuration of a computer to which the method of the present invention is applied.

The various types of processing described above can be implemented by reading a program for executing the steps of the method described above to a recording unit 2020 of a computer shown in FIG. 19 and operating a control unit 2010, an input unit 2030, an output unit 2040, and so on.

A program describing the processing content can be recorded in advance on a computer-readable recording medium. A magnetic recording device, an optical disk, a magneto-optical recording medium, a semiconductor memory, or the like, for example, may be used as the computer-readable recording medium.

Further, the program is distributed through the sale, transfer, rental, and so on of a portable recording medium, such as a DVD or a CD-ROM, on which the program is recorded, for example. Furthermore, the program may be stored on a storage device of a server computer, and the program may be distributed by transferring the program from the server computer to another computer over a network.

First, for example, the computer that executes the program stores the program recorded on the portable recording medium or the program transferred from the server computer temporarily in a storage device provided therein. Then, when executing the processing, the computer reads the program stored on a recording medium provided therein and executes processing in accordance with the read program. Alternatively, as different embodiments of the program, the computer may read the program directly from the portable recording medium and execute processing in accordance with the program, or the computer may execute processing corresponding to the program received from the server computer each time the program is transferred thereto from the server computer. Furthermore, instead of transferring the program to the computer from a server computer, the processing described above may be executed by a so-called ASP (Application Service Provider) type service, in which a processing function is realized by execution commands and result acquisition alone. Note that the program according to this embodiment is also assumed to include an equivalent to a program in the form of information used for processing by an electronic calculation device (data that are not constituted by a direct command to c computer but have a property of defining computer processing, or the like).

Moreover, in this embodiment, the device is realized by executed a predetermined program on a computer, but at least some of the processing content may be realized by hardware.

The invention claimed is:

1. An action control device that performs action control for moving p control subjects,
wherein p is set as any integer of 20 or more, from a set of p starting positions to a set of p target positions, a direction that is not parallel to a first direction being set as a second direction, an opposite direction to the first direction being set as a third direction, an opposite direction to the second direction being set as a fourth direction, a direction that is not parallel to a plane formed by the first direction and the second direction being set as a fifth direction, and an opposite direction to the fifth direction being set as a sixth direction, each starting position and each target position being adjacent to another starting position or another target position in at least one of the first to sixth directions, and the p control subjects arranged in the set of target positions and the p control subjects arranged in the set of starting positions respectively forming blocks of arbitrary shapes,
the control subjects being controlled so as to either remain stationary or to move to any one of a first position to a sixth position on a three-dimensional space of the control subjects, the first position being set as an adjacent position in the first direction, a second position being set as an adjacent position in the second direction, a third position being set as an adjacent position in the third direction, a fourth position being set as an adjacent position in the fourth direction, a fifth position being set as an adjacent position in the fifth direction, and the sixth position being set as an adjacent position in the sixth direction, and
among the positions included in the set of starting positions and the set of target positions, the maximum coordinate value in the first direction being set as Xthresh, the maximum coordinate value in the second direction being set as Ythresh, and the minimum coordinate value in the fifth direction being set as Zthresh,
the action control device comprising a processor configured to execute operations comprising:
determining a first virtual plane that is perpendicular to the first direction and fixed at a coordinate value of Xthresh+1 in the first direction, and a second virtual plane on which movement is performed in the first direction from infinity in the third direction, pushing control subjects that are arranged or control subjects that were arranged in the set of starting positions and that abut the second virtual plane in a movement direction of the second virtual plane, thereby compressing the control subjects such that none of the control subjects exceeds the first virtual plane and such that the coordinate values thereof in the first direction remain at or below Xthresh, envisaging a third virtual plane that is perpendicular to the second direction and fixed at a coordinate value of Ythresh+1 in the second direction, and a fourth virtual plane on which movement is performed in the second direction from infinity in the fourth direction, pushing the control subjects that are included in the compressed shaped acquired using the first and second virtual planes and that abut the fourth virtual plane in a movement direction of the fourth virtual plane, thereby compressing the control subjects such that none of the control subjects exceeds the third virtual plane and such that the coordinate values thereof in the second direction remain at or below Ythresh, and determining the positions of the control subjects included in the compressed shape as a set of intermediate positions M1;
pushing virtual control subjects that are arranged or virtual control subjects that were arranged in the set of target positions and that abut the second virtual plane, thereby compressing the virtual control subjects such that none of the virtual control subjects exceeds the first virtual plane and such that the coordinate values thereof in the first direction remain at or below Xthresh, pushing the virtual control subjects that are included in the compressed shaped acquired using the first and second virtual planes and that abut the fourth virtual plane in the movement direction of the fourth virtual plane, thereby compressing the virtual control subjects such that none of the virtual control subjects exceeds the third virtual plane and such that the coordinate values thereof in the second direction remain at or below Ythresh, determining the positions of the virtual control subjects included in the compressed shape as a set of intermediate positions M3, and determining a process for moving each control subject in an opposite direction to the movement direction used when determining the set of intermediate positions M3 from the virtual control subjects arranged in the set of target positions in reverse order to the order used when determining the set of intermediate positions M3 from the set of target positions; and determining a process Middle_Transform for transforming the shape formed by the control subjects arranged in the set of intermediate positions M1 into the shape formed by the control subjects arranged in the set of intermediate positions M3, wherein, in the process Middle_Transform, a plurality of control subjects extracted by deconstruction are moved simultaneously to respective locations to which the plurality of control subjects is to be added during construction.

2. The action control device according to claim 1, wherein (1) the first direction coordinate value of all of the control subjects arranged in a set of intermediate positions M2 does not exceed Xthresh, (2) the second direction coordinate value of all of the control subjects arranged in the set of intermediate positions M2 does not exceed Ythresh, (3) the fifth direction coordinate value of all of the control subjects arranged in the set of intermediate positions M2 is no smaller than Zthresh, (4) among all of the control subjects arranged in the set of intermediate positions M2, all of the control subjects having a first direction coordinate value that is not Xthresh contact another control subject in the first direction, (5) among all of the control subjects arranged in the set of intermediate positions M2, all of the control subjects having a second direction coordinate value that is not Ythresh contact another control subject in the second direction, (6) among all of the control subjects arranged in the set of intermediate positions M2, all of the control subjects having a fifth direction coordinate value that is not Zthresh, a first direction coordinate value of Xthresh, and a second direction coordinate value of Ythresh contact another control subject in the sixth direction, (7) among the control subjects arranged in the set of intermediate positions M2, the control subjects having the maximum fifth direction coordinate value form a predetermined shape R, and (8) when M and N are respectively set as integers no smaller than 2, when a control subject unit is set to be constituted by M×N control subjects, when the predetermined shape R is formed from a plurality of control subject units, and when a state in which, among the control subjects arranged in the set of intermediate positions M2, one or two control subjects not having the maximum fifth direction coordinate value are adjacent to each of the control subject units of the predetermined shape R in a plane that includes the first direction and the second direction is set as M2', the set of intermediate positions M2 is realized by compressing the state M2' in the first direction and the second direction, and the determining the process Middle_Transform further includes (A) selecting two seed control subjects from the control subjects arranged in the set of intermediate positions M1, moving one of the seed control subjects to a standby position in which an X coordinate is Xthresh and a Y coordinate is Ythresh+1, moving the other seed control subject to a standby position in which the X coordinate is Xthresh+1 and the Y coordinate is Ythresh, the standby positions of the two seed control subjects having identical Z coordinate values, and determining the set of intermediate positions M1 so as not to include the positions of the seed control subjects, (B) among the control subjects arranged in the sets of intermediate positions M1 and M2, setting the control subjects at Xthresh and Ythresh as a pole part, setting the control subjects at Xthresh but not at Ythresh as a flag part, setting the control subjects not belonging to either the pole part or the flag part as a floor part, and, using the seed control subjects, deconstructing the control subjects arranged in the set of intermediate positions M1 not including the positions of the seed control subjects into the pole part, the flag part, and the floor part and constructing the pole part, the flag part, and the floor part of the control subjects arranged in the set of intermediate positions M2 not including the positions of the seed control subjects, and (C) incorporating the positions of the seed control subjects in the standby positions into the set of intermediate positions M2 not including the positions of the seed control subjects, thereby determining the set of intermediate positions M2 so as to include the positions of the seed control subjects, (D) selecting two seed control subjects from the control subjects arranged in the set of intermediate positions M2, moving one of the seed control subjects to a standby position in which the X coordinate is Xthresh and the Y coordinate is Ythresh+1, moving the other seed control subject to a standby position in which the X coordinate is Xthresh+1 and the Y coordinate is Ythresh, the standby positions of the two seed control subjects having identical Z coordinate values, and determining the set of intermediate positions M2 so as not to include the positions of the seed control subject, (E) using the seed control subjects, deconstructing the control subjects arranged in the set of intermediate positions M2 not including the positions of the seed control subjects into the pole part, the flag part, and the floor part and constructing the pole part, the flag part, and the floor part of the control subjects arranged in the set of intermediate positions M3 not including the positions of the seed control subjects, (F) incorporating the positions of the seed control subjects in the standby positions into the control subjects arranged in the set of intermediate positions M3 not including the positions of the seed control subjects, thereby determining the set of intermediate positions M3 so as to include the positions of the seed control subjects, (G) calculating correspondence relationships between the respective control subjects in order to move the control subjects in the set of intermediate positions M2 following movement of the p control subjects arranged in the set of starting positions to the set of intermediate positions M2 to the positions of the control subjects in the set of intermediate positions M2 following movement of the p virtual control subjects arranged in the set of target positions G to the set of intermediate positions M2, and determining, on the basis of the result of calculating the correspondence relationships, whether or not the control subjects constituting the respective control subject units or control subjects that are adjacent to the control subject units and do not have the maximum coordinate value in the fifth direction need to be switched with other control subject units, and moves one of the control subjects that need to be switched onto the predetermined shape R in each control subject unit so as to move a plurality of control subjects corresponding to a plurality of control subject units simultaneously, and paths along which the plurality of control subjects are moved simultaneously are set so that a control subject can pass over all of the control subject units from a certain position S on the path and return to the position S without duplication and crossing.

3. An action control method for performing action control in order to move p control subjects, wherein p is set as any integer of 20 or more, from a set of p starting positions to a set of p target positions, a direction that is not parallel to a first direction being set as a second direction, an opposite direction to the first direction being set as a third direction, an opposite direction to the second direction being set as a fourth direction, a direction that is not parallel to a plane formed by the first direction and the second direction being set as a fifth direction, and an opposite direction to the fifth direction being set as a sixth direction, each starting position and each target position being adjacent to another starting position or another target position in at least one of the first to sixth directions, and the p control subjects arranged in the set of target positions and the p control subjects arranged in the set of starting positions respectively forming blocks of arbitrary shapes, the control subjects being controlled so as to either remain stationary or to move to any one of a first position to a sixth position on a three-dimensional space of the control subjects, the first position being set as an adjacent position in the first direction, a second position being set as an adjacent position in the second direction, a third position being set as an adjacent position in the third direction, a fourth position being set as an adjacent position in the fourth direction, a fifth position being set as an adjacent position in the fifth direction, and the sixth position being set as an adjacent position in the sixth direction, and among the positions included in the set of starting positions and the set of target positions, the maximum coordinate value in the first direction being set as Xthresh, the maximum coordinate value in the second direction being set as Ythresh, and the minimum coordinate value in the fifth direction being set as Zthresh, the action control method comprising:

determining a first virtual plane that is perpendicular to the first direction and fixed at a coordinate value of Xthresh+1 in the first direction, and a second virtual plane on which movement is performed in the first direction from infinity in the third direction, pushing control subjects that are arranged or control subjects that were arranged in the set of starting positions and that abut the second virtual plane in a movement direction of the second virtual plane, thereby compressing the control subjects such that none of the control subjects exceeds the first virtual plane and such that the coordinate values thereof in the first direction remain at or below Xthresh, envisaging a third virtual plane that is perpendicular to the second direction and fixed at a coordinate value of Ythresh+1 in the second direction, and a fourth virtual plane on which movement is performed in the second direction from infinity in the fourth direction, pushing the control subjects that are included in the compressed shaped acquired using the first and second virtual planes and that abut the fourth virtual plane in a movement direction of the fourth virtual plane, thereby compressing the control subjects such that none of the control subjects exceeds the third virtual plane and such that the coordinate values thereof in the second direction remain at or below Ythresh, and determining the positions of the control subjects included in the compressed shape as a set of intermediate positions M1;

pushing virtual control subjects that are arranged or virtual control subjects that were arranged in the set of target positions and that abut the second virtual plane, thereby compressing the virtual control subjects such that none of the virtual control subjects exceeds the first virtual plane and such that the coordinate values thereof in the first direction remain at or below Xthresh, pushing the virtual control subjects that are included in the compressed shaped acquired using the first and second virtual planes and that abut the fourth virtual plane in the movement direction of the fourth virtual plane, thereby compressing the virtual control subjects such that none of the virtual control subjects exceeds the third virtual plane and such that the coordinate values thereof in the second direction remain at or below Ythresh, determining the positions of the virtual control subjects included in the compressed shape as a set of intermediate positions M3, and determining a process for moving each control subject in an opposite direction to the movement direction used when determining the set of intermediate positions M3 from the virtual control subjects arranged in the set of target positions in reverse order to the order used when determining the set of intermediate positions M3 from the set of target positions; and determining a process Middle_Transform for transforming the shape formed by the control subjects arranged in the set of intermediate positions M1 into the shape formed by the control subjects arranged in the set of intermediate positions M3, wherein, in the process Middle_Transform, a plurality of control subjects extracted by deconstruction are moved simultaneously to respective locations to which the plurality of control subjects is to be added during construction.

4. The action control method according to claim 3, wherein (1) the first direction coordinate value of all of the control subjects arranged in a set of intermediate positions M2 does not exceed Xthresh, (2) the second direction coordinate value of all of the control subjects arranged in the set of intermediate positions M2 does not exceed Ythresh, (3) the fifth direction coordinate value of all of the control subjects arranged in the set of intermediate positions M2 is no smaller than Zthresh, (4) among all of the control subjects arranged in the set of intermediate positions M2, all of the control subjects having a first direction coordinate value that is not Xthresh contact another control subject in the first direction, (5) among all of the control subjects arranged in the set of intermediate positions M2, all of the control subjects having a second direction coordinate value that is not Ythresh contact another control subject in the second direction, (6) among all of the control subjects arranged in the set of intermediate positions M2, all of the control subjects having a fifth direction coordinate value that is not Zthresh, a first direction coordinate value of Xthresh, and a second direction coordinate value of Ythresh contact another control subject in the sixth direction, (7) among the control subjects arranged in the set of intermediate positions M2, the control subjects having the maximum fifth direction coordinate value form a predetermined shape R, and (8) M and N are respectively set as integers no smaller than 2, when a control subject unit is set to be constituted by MxN control subjects, when the predetermined shape R is formed from a plurality of control subject units, and when a state in which, among the control subjects arranged in the set of intermediate positions M2, one or two control subjects not having the maximum fifth direction coordinate value are adjacent to each of the control subject units of the predetermined shape R in a plane that includes the first direction and the second direction is set as M2', the set of intermediate positions M2 is realized by compressing the state M2' in the first direction and the second direction, and the determining a process Middle_Transform for transforming the shape:

(A) selects two seed control subjects from the control subjects arranged in the set of intermediate positions M1, moves one of the seed control subjects to a standby position in which an X coordinate is Xthresh and a Y coordinate is Ythresh+1, moves the other seed control subject to a standby position in which the X coordinate is Xthresh+1 and the Y coordinate is Ythresh, the standby positions of the two seed control subjects having identical Z coordinate values, and determines the set of intermediate positions M1 so as not to include the positions of the seed control subjects, (B) among the control subjects arranged in the sets of intermediate positions M1 and M2, sets the control subjects at Xthresh and Ythresh as a pole part, sets the control subjects at Xthresh but not at Ythresh as a flag part, sets the control subjects not belonging to either the pole part or the flag part as a floor part, and, using the seed control subjects, deconstructs the control subjects arranged in the set of intermediate positions M1 not including the positions of the seed control subjects into the pole part, the flag part, and the floor part and constructs the pole part, the flag part, and the floor part of the control subjects arranged in the set of intermediate positions M2 not including the positions of the seed control subjects, and (C) incorporates the positions of the seed control subjects in the standby positions into the set of intermediate positions M2 not including the positions of the seed control subjects, thereby determining the set of intermediate positions M2 so as to include the positions of the seed control subjects, (D) the intermediate transformation process processing unit selects two seed control subjects from the control subjects arranged in the set of intermediate positions M2, moves one of the seed control subjects to a standby position in which the X coordinate is Xthresh and the Y coordinate is Ythresh+1, moves the other seed control subject to a standby position in which the X coordinate is Xthresh+1 and the Y coordinate is Ythresh, the standby positions of the two seed control subjects having identical Z coordinate values, and determines the set of intermediate positions M2 so as not to include the positions of the seed control subjects, (E) using the seed control subjects, deconstructs the control subjects arranged in the set of intermediate positions M2 not including the positions of the seed control subjects into the pole part, the flag part, and the floor part and constructs the pole part, the flag part, and the floor part of the control subjects arranged in the set of intermediate positions M3 not including the positions of the seed control subjects, (F) incorporates the positions of the seed control subjects in the standby positions into the control subjects arranged in the set of intermediate positions M3 not including the positions of the seed control subjects, thereby determining the set of intermediate positions M3 so as to include the positions of the seed control subjects, (G) calculates correspondence relationships between the respective control subjects in order to move the control subjects in the set of intermediate positions M2 following movement of the p control subjects arranged in the set of starting positions to the set of intermediate positions M2 to the positions of the control subjects in the set of intermediate positions M2 following movement of the p virtual control subjects arranged in the set of target positions G to the set of intermediate positions M2, and determines, on the basis of the result of calculating the correspondence relationships, whether or not the control subjects constituting the respective control subject units or control subjects that are adjacent to the control subject units and do not have the maximum coordinate value in the fifth direction need to be switched with other control subject units, and moves one of the control subjects that need to be switched onto the predetermined shape R in each control subject unit so as to move a plurality of control subjects corresponding to a plurality of control subject units simultaneously, and paths along which the plurality of control subjects are moved simultaneously are set so that a control subject can pass over all of the control subject units from a certain position S on the path and return to the position S without duplication and crossing.

5. A computer-readable non-transitory recording medium storing computer-executable program instructions that when executed by a processor cause a computer system to execute operations, wherein p is set as any integer of 20 or more, from a set of p starting positions to a set of p target positions, a direction that is not parallel to a first direction being set as a second direction, an opposite direction to the first direction being set as a third direction, an opposite direction to the second direction being set as a fourth direction, a direction that is not parallel to a plane formed by the first direction and the second direction being set as a fifth direction, and an opposite direction to the fifth direction being set as a sixth direction, each starting position and each target position being adjacent to another starting position or another target position in at least one of the first to sixth directions, and the p control subjects arranged in the set of target positions and the p control subjects arranged in the set of starting positions respectively forming blocks of arbitrary shapes, the control subjects being controlled so as to either remain stationary or to move to any one of a first position to a sixth position on a three-dimensional space of the control subjects, the first position being set as an adjacent position in the first direction, a second position being set as an adjacent position in the second direction, a third position being set as an adjacent position in the third direction, a fourth position being set as an adjacent position in the fourth direction, a fifth position being set as an adjacent position in the fifth direction, and the sixth position being set as an adjacent position in the sixth direction, and among the positions included in the set of starting positions and the set of target positions, the maximum coordinate value in the first direction being set as Xthresh, the maximum coordinate value in the second direction being set as Ythresh, and the minimum coordinate value in the fifth direction being set as Zthresh, the method comprising:

determining a first virtual plane that is perpendicular to the first direction and fixed at a coordinate value of Xthresh+1 in the first direction, and a second virtual plane on which movement is performed in the first direction from infinity in the third direction, pushing control subjects that are arranged or control subjects that were arranged in the set of starting positions and that abut the second virtual plane in a movement direction of the second virtual plane, thereby compressing the control subjects such that none of the control subjects exceeds the first virtual plane and such that the coordinate values thereof in the first direction remain at or below Xthresh, envisaging a third virtual plane that is perpendicular to the second direction and fixed at a coordinate value of Ythresh+1 in the second direction, and a fourth virtual plane on which movement is performed in the second direction from infinity in the fourth direction, pushing the control subjects that are included in the compressed shaped acquired using the first and second virtual planes and that abut the fourth virtual plane in a movement direction of the fourth virtual plane, thereby compressing the control subjects such that none of the control subjects exceeds the third virtual plane and such that the coordinate values thereof in the second direction remain at or below Ythresh, and determining the positions of the control subjects included in the compressed shape as a set of intermediate positions M1;

pushing virtual control subjects that are arranged or virtual control subjects that were arranged in the set of target positions and that abut the second virtual plane, thereby compressing the virtual control subjects such that none of the virtual control subjects exceeds the first virtual plane and such that the coordinate values thereof in the first direction remain at or below Xthresh, pushing the virtual control subjects that are included in the compressed shaped acquired using the first and second virtual planes and that abut the fourth virtual plane in the movement direction of the fourth virtual plane, thereby compressing the virtual control subjects such that none of the virtual control subjects exceeds the third virtual plane and such that the coordinate values thereof in the second direction remain at or below Ythresh, determining the positions of the virtual control subjects included in the compressed shape as a set of intermediate positions M3, and determining a process for moving each control subject in an opposite direction to the movement direction used when determining the set of intermediate positions M3 from the virtual control subjects arranged in the set of target positions in reverse order to the order used when determining the set of intermediate positions M3 from the set of target positions; and determining process Middle_Transform for transforming the shape formed by the control subjects arranged in the set of intermediate positions M1 into the shape formed by the control subjects arranged in the set of intermediate positions M3, wherein, in the process Middle_Transform, a plurality of control subjects extracted by deconstruction are moved simultaneously to respective locations to which the plurality of control subjects is to be added during construction.

\* \* \* \* \*